(12) United States Patent
Kilcoin

(10) Patent No.: US 12,535,497 B2
(45) Date of Patent: Jan. 27, 2026

(54) FLUID PROCESSING DEVICE AND METHOD

(71) Applicant: Lost Arrow Bio, South Lake Tahoe, CA (US)

(72) Inventor: Christopher Kilcoin, Santa Cruz, CA (US)

(73) Assignee: LOST ARROW BIO, South Lake Tahoe, CA (US)

( * ) Notice: Subject to any disclaimer, the term of this patent is extended or adjusted under 35 U.S.C. 154(b) by 1100 days.

(21) Appl. No.: 17/612,166

(22) PCT Filed: Feb. 7, 2020

(86) PCT No.: PCT/US2020/017202
§ 371 (c)(1),
(2) Date: Nov. 17, 2021

(87) PCT Pub. No.: WO2020/242544
PCT Pub. Date: Dec. 3, 2020

(65) Prior Publication Data
US 2022/0206030 A1    Jun. 30, 2022

Related U.S. Application Data

(60) Provisional application No. 62/852,719, filed on May 24, 2019.

(51) Int. Cl.
*F16K 99/00*    (2006.01)
*B01L 3/00*    (2006.01)
(Continued)

(52) U.S. Cl.
CPC ........ *G01N 35/1097* (2013.01); *B01L 3/5025* (2013.01); *B01L 7/52* (2013.01); *F16K 99/0013* (2013.01); *F16K 99/0028* (2013.01); *F16K 99/0042* (2013.01); *B01L 2200/0668* (2013.01); *B01L 2200/16* (2013.01);
(Continued)

(58) Field of Classification Search
CPC . F16K 99/0028; B01L 3/50273; B01L 3/5025
See application file for complete search history.

(56) References Cited

U.S. PATENT DOCUMENTS

| 9,121,058 | B2 | 9/2015 | Stern et al. |
| 2010/0165784 | A1 | 7/2010 | Jovanovich et al. |

(Continued)

FOREIGN PATENT DOCUMENTS

WO    03/060056 A2    7/2003

OTHER PUBLICATIONS

International Search Report and Written Opinion dated Jun. 12, 2020 in International Application No. PCT/US2020/017202 (13 pages total).

(Continued)

*Primary Examiner* — Paul J Gray
(74) *Attorney, Agent, or Firm* — ROTHWELL, FIGG, ERNST & MANBECK, P.C.

(57) ABSTRACT

A fluid processing device comprises multiple separate fluid channels and multiple processing stations configured to perform identical and simultaneous process steps on multiple fluid samples in the fluid channels. An embodiment of the fluid processing device is contained in a compact, low-cost, scaled consumable with sample input wells, reagent input wells, and sample output wells.

9 Claims, 44 Drawing Sheets

(51) Int. Cl.
 _B01L 7/00_ (2006.01)
 _G01N 35/10_ (2006.01)

(52) U.S. Cl.
 CPC .................. _B01L 2300/0829_ (2013.01); _B01L 2300/0867_ (2013.01); _B01L 2300/1827_ (2013.01); _B01L 2400/043_ (2013.01); _B01L 2400/0487_ (2013.01); _B01L 2400/0644_ (2013.01); _F16K 2099/0084_ (2013.01)

(56) References Cited

U.S. PATENT DOCUMENTS

2017/0260567 A1 9/2017 Selden et al.
2018/0095100 A1 4/2018 Nguyen et al.

OTHER PUBLICATIONS

EP Search Report dated May 8, 2023 in corresponding EP Application No. 20813546.7 (7 pages).

Rotor Connecting Reagent Wells to Reagent Pumps

Rotor Connecting Reagent Wells to Reagent Pumps

Rotor Connecting 1st Reagent Input Well 400 to 1st Reagent Pump Chamber 85

Rotor Connecting 2nd Reagent Input Well 420 to 2nd Reagent Pump Chamber 89

Rotor Connecting 1st Reagent Pump Chamber 85 to Process Chambers

Rotor Connecting Reagent Pumps to Process Chambers

FLUID PROCESSING DEVICE AND METHOD

CROSS REFERENCE TO RELATED APPLICATION

This application is a 35 U.S.C. § 371 National Stage of International Patent Application No. PCT/US2020/017202, filed Feb. 7, 2020, which claims the benefit to U.S. provisional application No. 62/852,719, filed May 24, 2019. The above-identified applications are incorporated by reference.

BACKGROUND

Fluid processing, such as multi-step fluid processing of multiple samples of a fluid, is susceptible to issues including human error, equipment error (e.g., inconsistencies in processing volumes or timing), cross contamination, and environmental contamination. These issues can lead to errors such as errors in calculation, measurement, identification, analysis, or actuation, which can produce, for example, imprecise or inaccurate results and inconsistent sample preparations. These issues are amplified by the requirement for sophisticated fluid processing equipment in conventional fluid processing techniques and devices. Additionally, conventional fluid processing techniques and devices are time-consuming and expensive.

Therefore, a need exists for a fluid processing device and method that can perform multi-step fluid processing of multiple fluid samples (e.g., multiple samples of a single fluid) to efficiently produce precise and accurate results, prepare consistent processed fluid samples, and avoid issues of human error, equipment error, and contamination. A need also exists for such a device and method to be contained in a low-cost consumable that can replace multiple pieces of expensive conventional fluid processing equipment and can provide automated sample preparation for processes such as next generation sequencing (NGS).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass a fluid processing device comprising two or more fluid channels and at least a first processing station. The first processing station may include a first process pump assembly associated with each of the two or more fluid channels and a first process chamber associated with each of the two or more fluid channels, wherein the first process pump assemblies of the first processing station are configured to be operable in unison to simultaneously move a fluid through a portion of each associated fluid channel and into each first process chamber of the associated fluid channel. The first processing station may further include a first reagent pump assembly associated with each of the two or more fluid channels, a first reagent input well associated with each of the two or more fluid channels, and a first reagent channel associated with each first reagent input well connecting each first reagent input well to the first process chamber of the associated fluid channel. The first reagent pump assemblies of the first processing station are configured to be operable in unison to simultaneously move a reagent from each first reagent input well of the associated fluid channel through the associated reagent channel and into each first process chamber of the associated fluid channel.

According to further aspects of the disclosure, the fluid processing device may include a sample input well associated with each of the two or more fluid channels, wherein the first process pump assemblies of the first processing station are configured to be operable in unison to simultaneously move a fluid sample from each sample input well of the associated fluid channel through a portion of the associated fluid channel and into each first process chamber of the associated fluid channel.

According to further aspects of the disclosure, the fluid processing device may include a sample output well associated with each of the two or more fluid channels and a second processing station including a second process pump assembly associated with each of the two or more fluid channels. The second process pump assemblies of the second processing station are configured to be operable in unison to simultaneously move a fluid through a portion of each associated fluid channel and into each sample output well of the associated fluid channel.

According to further aspects of the disclosure, the fluid processing device may include one or more intermediate processing stations disposed between the first processing station and the second processing station. Each intermediate processing station may include an intermediate process pump assembly associated with each of the two or more fluid channels and an intermediate process chamber associated with each of the two or more fluid channels. The intermediate process pump assemblies of each intermediate processing station are configured to be operable in unison to simultaneously move a fluid from a process chamber of a preceding one of the processing stations through a portion of each associated fluid channel and into each intermediate process chamber of the intermediate processing station. Each intermediate processing station may further include an intermediate reagent pump assembly associated with each of the two or more fluid channels, an intermediate reagent input well associated with each of the two or more fluid channels, and an intermediate reagent channel associated with each intermediate reagent input well connecting each intermediate reagent input well to the intermediate process chamber of the associated fluid channel. The intermediate reagent pump assemblies of the intermediate processing station are configured to be operable in unison to simultaneously move a reagent from each intermediate reagent input well of the associated fluid channel through the associated intermediate reagent channel and into each intermediate process chamber of the associated fluid channel. In some examples, the fluid processing device may include five intermediate processing stations disposed between the first processing station and the second processing station.

In some examples, each of the first, second, and intermediate process pump assemblies may include a process stator defining a process pump chamber and a process chamber port in communication with the process pump chamber, a process plunger disposed within the process pump chamber and connected to a process plunger rod, and a process valve coupled to the process stator. The process plunger is movable via the process plunger rod within the process pump chamber in a first direction drawing fluid into the process pump chamber through the process chamber port or a second direction expelling fluid from the process pump chamber through the process chamber port. The process valve is movable between a first position fluidly connecting the process chamber port to an upstream portion of the associated fluid channel and a second position fluidly connecting the process chamber port to a downstream portion of the associated fluid channel, wherein the downstream portion of the associated fluid channel is in fluid communication with the associated process chamber or the associated sample output well. In some examples, the process valve may include a rotor that is rotatably mounted with respect to the process stator for rotational movement between the first position and the second position.

In some examples, each of the first and intermediate reagent pump assemblies may include a reagent stator defining a reagent pump chamber and a reagent chamber port in communication with the reagent pump chamber, a reagent plunger disposed within the reagent pump chamber and connected to a reagent plunger rod, and a reagent valve coupled to the reagent stator. The reagent plunger is movable via the reagent plunger rod within the reagent pump chamber in a first direction drawing fluid into the reagent pump chamber through the reagent chamber port or a second direction expelling fluid from the reagent pump chamber through the reagent chamber port. The reagent valve is movable between a first position fluidly connecting the reagent chamber port to the associated reagent input well and a second position fluidly connecting the reagent chamber port to the associated process chamber. In some examples, the reagent valve may include a rotor that is rotatably mounted with respect to the reagent stator for rotational movement between the first position and the second position.

In some examples, the process pump assemblies of each of the first, second, and intermediate processing stations may include a single process plunger rod, and all of the process plungers of the process pump assemblies of each processing station are attached to the single process plunger rod, so that axial movement of the single process plunger rod effects simultaneous movement of the process plungers within their respective process pump chambers in their respective first and second directions. In some examples, the reagent pump assemblies of each of the first and intermediate processing stations may include a single reagent plunger rod, and all of the reagent plungers of the reagent pump assemblies of each processing station are attached to the single reagent plunger rod, so that axial movement of the single reagent plunger rod effects simultaneous movement of the reagent plungers within their respective reagent pump chambers in their respective first and second directions.

In some examples, the process pump assemblies of each of the first, second, and intermediate processing stations may include a process valve rod, and all of the process valves of the process pump assemblies of each processing station are coupled to the process valve rod, so that movement of the process valve rod effects simultaneous movement of the process valves between their respective first and second positions. In some examples, the reagent pump assemblies of each of the first and intermediate processing stations may include a reagent valve rod, and all of the reagent valves of the reagent pump assemblies of each processing station are coupled to the reagent valve rod, so that movement of the reagent valve rod effects simultaneous movement of the reagent valves between their respective first and second positions.

Aspects of the disclosure also encompass a method for processing fluid, such as by processing a fluid via the fluid processing device. According to further aspects of the disclosure, the method may include processing multiple samples of a fluid simultaneously and in unison, wherein each of the multiple samples is processed separately in one of the two or more fluid channels of the fluid processing device.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

Figure 1:
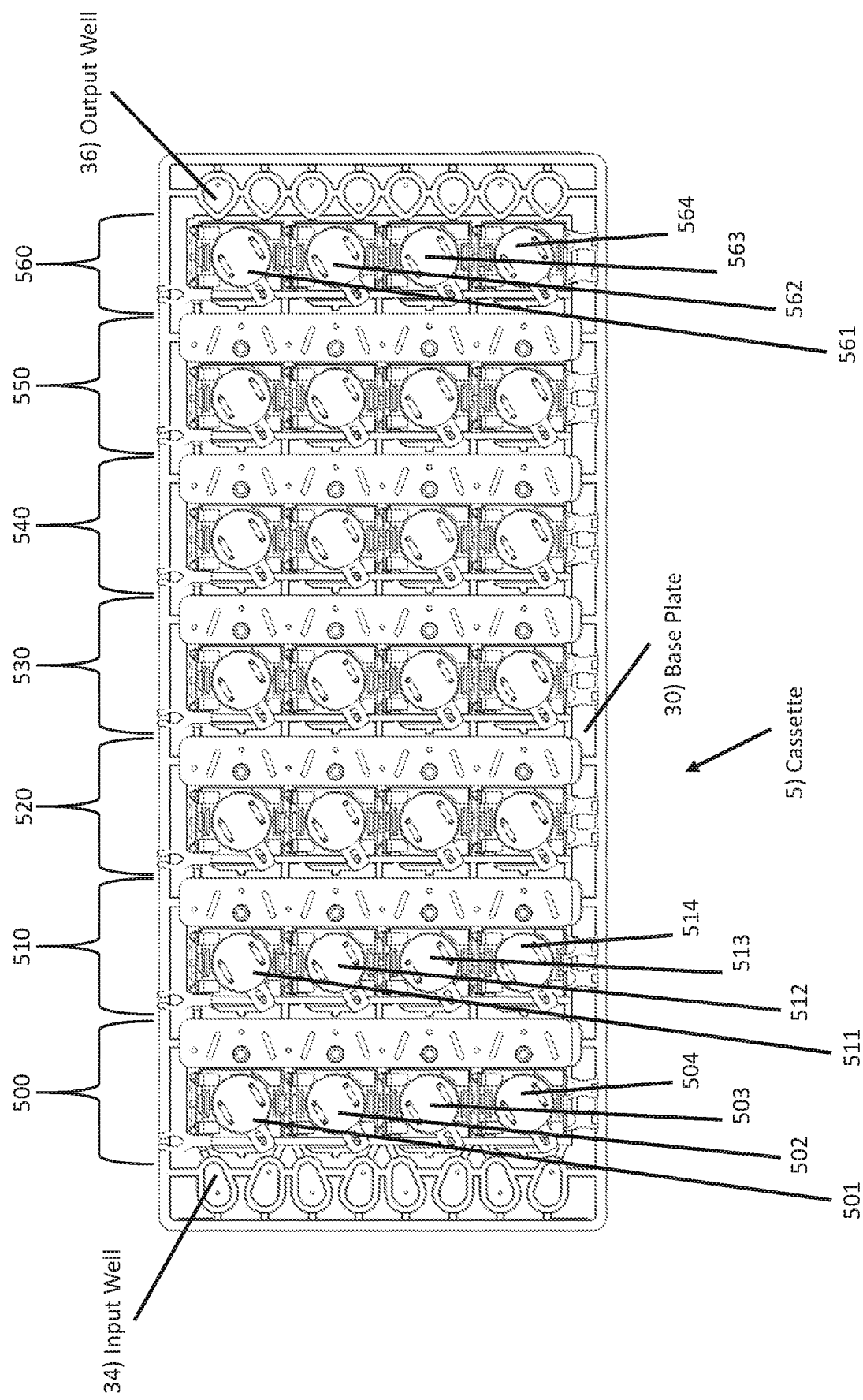
FIG. 1 is a top plan view of a fluid processing cassette embodying concepts disclosed herein, with a top plate of the fluid processing cassette removed.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the term "proximate" refers to being near, adjoining, or separated by a relatively or functionally small distance or space. For example, a first object that is proximate to a second object can be in contact with the second object or can be within a distance of the second object such that the distance or space from the first object to the second object allows for the two objects to serve their respective functions or exhibit their respective characteristics in accordance with this disclosure.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

There is a need for a fluid processing device capable of processing multiple fluid samples efficiently and with minimal human or equipment error. Fluid processing can include, for example, fluid analysis or fluid sample preparation, such as sample preparation for next generation sequencing (NGS). NGS sample preparation, for example, is an expensive, time-consuming process (e.g., 1 to 3 days) and requires sophisticated lab facilities. Moreover, NGS sample preparation and other conventional fluid processing techniques and devices are susceptible to human error, equipment error or failure, cross contamination, and environmental contamination.

Aspects of the disclosure encompass a novel fluid processing device capable of processing multiple fluid samples simultaneously in separate but similar fluid channels via identical processing steps, thereby increasing efficiency, avoiding inconsistencies, and lowering costs. The fluid processing device can be contained in a consumable, such as a single-use consumable, that replaces multiple separate pieces of expensive equipment associated with conventional fluid processing techniques. For example, the fluid processing device can automate sample preparation for NGS. The fluid processing device is suitable for fluid processing or sample fluid preparation of a variety of fluids, including initial sample preps (ISPs) of DNA samples, saliva, and Formalin-fixed paraffin-embedded (FFPE) tissue. Further, environmental contamination is avoided, for example, by sealing the fluid processing device and minimizing contact between the fluid channels of the fluid processing device and external processing equipment. Cross contamination is avoided, for example, by removing any fluid communication between the fluid channels of the fluid processing device.

The fluid processing device can comprise two or more fluid channels, such as three, four, five, six, seven, eight, nine, ten, or more than ten fluid channels. A fluid channel can be separate from all other fluid channels such that there is no fluid communication between the fluid channel and all other fluid channels, which can avoid cross contamination and obviate the need for buffer wash or waste collection. Two or more fluid channels can be associated with or comprise identical or substantially similar components, such as components with identical or similar volumes, shapes, lengths, sizes, or relative positioning. Two or more fluid channels can be associated with an identical or similar number of components, and the associated components can be in an identical or similar order in the two or more fluid channels. In some embodiments, all fluid channels of the fluid processing device are associated with corresponding components with identical volume fluid paths arranged in the same order in each fluid channel.

The fluid processing device can comprise a sample input component associated with each fluid channel, such as a sample input well, channel, chamber, port, or other fluid input element. The fluid processing device can comprise a sample output component associated with each fluid channel, such as a sample output well, channel, chamber, port, or other fluid output element. A fluid channel in the fluid processing device can comprise or be associated with fluid components such as a pathway, channel, vessel, port, receptacle, chamber, well, valve, rotor, or other fluid component.

The fluid processing device can comprise two or more processing stations. A processing station can be associated with two or more fluid channels of the fluid processing device, and each processing station can be configured to perform at least one processing step on a fluid in each of the associated fluid channels. The processing step(s) of a processing station can be performed identically and simultaneously on a fluid in each of the associated fluid channels. A processing step can comprise moving a fluid, retaining a fluid, adding one or more reagents to a fluid, removing one or more waste substances from a fluid, performing temperature control (e.g., heat) to the fluid, or performing a magnetic procedure, such as a magnetic separation procedure, to the fluid. Temperature control can be performed by air flow and/or a thin film heater, such that the temperature control can control an elevated reaction temperature or thermal cycling (e.g., for purposes of polymerase chain reaction (PCR)). Magnetic control can be performed using a permanent magnet, for example, by changing the distance between a permanent magnet and fluid in a fluid channel.

For example, a fluid processing device can comprise eight separate fluid channels and six processing stations each associated with all eight fluid channels. This fluid processing device can receive one of eight identical sample fluids into each of the eight fluid channels (e.g., via a sample input well associated with each fluid channel) and each of the six processing stations in turn can simultaneously perform processing steps identically to the sample fluid in each fluid channel, such that the sample fluids in the eight fluid channels are all subjected to the same processing steps at the same times. Once the sample fluids have been processed by all six processing stations in turn, each processed sample fluid can be removed from the fluid processing device (e.g., via a sample output well associated with each fluid channel). The separate fluid channels avoid cross contamination, and the simultaneous, identical processing of each sample fluid avoids inconsistencies between the processed sample fluids.

The fluid processing device can comprise at least a first processing station. The first processing station can be configured to process a fluid in each of two or more fluid channels. The first processing station can comprise a first process chamber or other similar component (e.g., cell, vessel, channel, compartment, or receptacle) associated with each of two or more fluid channels. The first processing station can further comprise a first process pump assembly associated with each of two or more fluid channels. The first process pump assemblies can be configured to perform one or more processing steps to a fluid in each associated fluid channel, such as move a fluid through a portion of each associated fluid channel or move a waste substance through a portion of each associated fluid channel. The first process pump assemblies can be configured to be operable in unison to simultaneously perform a processing step to a fluid in each associated fluid channel. The processing step can be, for example, moving a fluid downstream in each associated fluid channel into a first process chamber of the associated fluid channel from a portion of the associated fluid channel that is upstream from the first process chamber, such as a sample input well of the associated fluid channel. The processing step can be, for example, moving waste upstream into a sample input well, the first process chamber of the first processing station, or the first process pump assembly of the first processing station from a portion of the associated fluid channel that is downstream from the sample input well, the first process chamber of the first processing station, or the first process pump assembly of the first processing station. For example, molecules of interest in sample fluid may be held stationary, such as by binding the molecules of interest (such as DNA) to ferromagnetic particles (e.g., magnetic beads) that are held stationary by magnets in proximity to the first process chamber of the first processing station, while the first process pump assembly of the first processing station moves waste from the first process chamber upstream into a sample input well or upstream into the first process pump assembly. This allows the fluid to be washed away thus leaving the molecules of interest (bead purification). The last step is to wash the molecules off the magnetic beads and send that fluid on to the next processing step. The magnetic beads are in a fluid that is added to the reagent input well The first processing station can further comprise a first reagent input component associated with each of two or more fluid channels, such as a reagent input well, channel, chamber, port, or other reagent input element. In some embodiments, the first reagent input component can be a first reagent input well. The first processing station can comprise a first reagent channel associated with each first reagent input well. A first reagent channel can comprise one or more fluid passageway elements, such as fluid channels, ports, or valves. A first reagent input well associated with a fluid channel can be connected via an associated first reagent channel to a first process chamber of the associated fluid channel. The first processing station can further comprise a first reagent pump assembly associated with each of two or more fluid channels. The first reagent pump assemblies can be configured to perform a processing step of moving a reagent (e.g., a reagent including magnetic beads), such as from a reagent input well of an associated fluid channel to a first process chamber of the associated fluid channel, for example via a first reagent channel associated with the reagent input well. The first reagent pump assemblies can be configured to be operable in unison to simultaneously move a reagent in each associated fluid channel.

The fluid processing device can comprise one or more intermediate processing stations. An intermediate processing station can be disposed between a first processing station and an end processing station. An intermediate processing station can be configured to process a fluid in each of two or more fluid channels, such as a portion of each of the two or more fluid channels that is downstream from a first processing station but upstream from an end processing station. An intermediate processing station can comprise an intermediate process chamber or other similar component (e.g., cell, vessel, channel, compartment, or receptacle) associated with each of two or more fluid channels. An intermediate processing station can further comprise an intermediate process pump assembly associated with each of two or more fluid channels. The intermediate process pump assemblies of an intermediate processing station can be configured to perform one or more processing steps to a fluid in each associated fluid channel, such as move a fluid through a portion of each associated fluid channel or move a waste substance through a portion of each associated fluid channel. The intermediate process pump assemblies can be configured to be operable in unison to simultaneously perform a processing step to a fluid in each associated fluid channel. The processing step can be, for example, moving a fluid downstream in each associated fluid channel into an intermediate process chamber of the associated fluid channel from a portion of the associated fluid channel that is upstream from the intermediate process chamber, such as a process chamber of a preceding processing station, for example a first process chamber of the first processing station or an intermediate process chamber of a preceding intermediate processing station. The process step can be, for example, moving waste upstream into a preceding processing station (e.g., a process chamber or process pump assembly of the preceding processing station), the intermediate process chamber of the intermediate processing station, or the intermediate process pump assembly of the intermediate processing station from a portion of the associated fluid channel that is downstream from the preceding processing station, the intermediate process chamber of the intermediate processing station, or the intermediate process pump assembly of the intermediate processing station. For example, a bead purification process can be performed in the intermediate process chamber of the intermediate processing station while the intermediate process pump assembly of the intermediate processing station moves waste from the intermediate process chamber upstream into a preceding processing station or upstream into the intermediate process pump assembly.

Each intermediate processing station can further comprise an intermediate reagent input component associated with each of two or more fluid channels, such as an intermediate reagent input well, channel, chamber, port, or other reagent input element. In some embodiments, the intermediate reagent input component can be an intermediate reagent input well. An intermediate processing station can comprise an intermediate reagent channel associated with each intermediate reagent input well. An intermediate reagent channel can comprise one or more fluid passageway elements, such as fluid channels, ports, or valves. An intermediate reagent input well associated with a fluid channel can be connected via an associated intermediate reagent channel to an intermediate process chamber of the associated fluid channel. An intermediate processing station can further comprise an intermediate reagent pump assembly associated with each of two or more fluid channels. The intermediate reagent pump assemblies can be configured to perform a processing step of moving a reagent (e.g., a reagent including magnetic beads or wash buffer), such as from an intermediate reagent input well of an associated fluid channel to an intermediate process chamber of the associated fluid channel, for example via an intermediate reagent channel associated with the intermediate reagent input well. The intermediate reagent pump assemblies can be configured to be operable in unison to simultaneously move a reagent in each associated fluid channel.

The fluid processing device can comprise an end processing station. The end processing station can be configured to process a fluid in each of two or more fluid channels. The end processing station can comprise an end process chamber or other similar component (e.g., cell, vessel, channel, compartment, or receptacle) associated with each of two or more fluid channels. The end processing station can comprise a sample output component (e.g., sample output well) associated with each of two or more fluid channels, such as a sample output well, channel, chamber, port, or other fluid output element. The end processing station can comprise an end process pump assembly associated with each of two or more fluid channels. The end process pump assemblies can be configured to perform one or more processing steps to a fluid in each associated fluid channel, such as move a fluid through a portion of each associated fluid channel or move a waste substance through a portion of each associated fluid channel. The end process pump assemblies can be configured to be operable in unison to simultaneously perform a processing step to a fluid in each associated fluid channel. The processing step can be, for example, moving a fluid downstream in each associated fluid channel into a sample output well of the associated fluid channel from a portion of the associated fluid channel that is upstream from the sample output well, such as a process chamber of a preceding processing station, for example a first process chamber of the first processing station or an intermediate process chamber of a preceding intermediate processing station. The process step can be, for example, moving waste upstream into a preceding processing station (e.g., a process chamber or process pump assembly of the preceding processing station), the end process chamber of the end processing station, or the end process pump assembly of the end processing station from a portion of the associated fluid channel that is downstream from the preceding processing station, the end process chamber of the end processing station, or the end process pump assembly of the end processing station. For example, a bead purification process can be performed in the end process chamber of the end processing station while the end process pump assembly of the end processing station moves waste from the end process chamber upstream into a preceding processing station or upstream into the end process pump assembly. In some embodiments, the end processing station does not does not comprise an end process chamber or similar component associated with each of two or more fluid channels. In some embodiments, the end processing station does not comprise an end reagent input component, end reagent channel, and/or end reagent pump assembly associated with each of two or more fluid channels. In some embodiments, the end processing station can comprise an end reagent input component, end reagent channel, and/or end reagent pump assembly associated with each of two or more fluid channels. In some embodiments, end reagent-related features perform no fluid function (e.g., the end reagent-related features are vented to atmosphere) and/or serve a structural or assembly purpose.

In some examples, the fluid processing device comprises multiple intermediate processing stations, such as a first intermediate processing station and a second intermediate processing station. In some examples, the fluid processing device comprises three, four, five, six, seven, eight, nine, ten, or more than ten intermediate processing stations. Multiple intermediate processing stations can perform one or more processing steps in turn. For example, a first processing station can perform processing steps on a fluid sample in each of two or more associated fluid channels by moving the fluid samples from sample input wells to first process chambers of the first processing station via first process pump assemblies and moving reagents into the first process chambers via first reagent pump assemblies; then a first intermediate processing station can perform processing steps on the fluid samples in each of the two or more associated fluid channels by moving the fluid samples to first intermediate process chambers of the first intermediate processing station via first intermediate process pump assemblies and moving reagents into the first intermediate process chambers via first intermediate reagent pump assemblies; then a second intermediate processing station can perform processing steps on the fluid samples in each of the two or more associated fluid channels by moving the fluid samples to second intermediate process chambers of the second intermediate processing station via second intermediate process pump assemblies and moving reagents into the second intermediate process chambers via second intermediate reagent pump assemblies; and then an end processing station can perform a processing step on the fluid samples in each of the two or more associated fluid channels by moving the fluid samples to sample output wells.

In some embodiments, a first process pump assembly, an intermediate process pump assembly, and/or an end process pump assembly comprises at least one positive displacement pump, such as a reciprocating pump, for example a plunger pump. For example, each of these process pump assemblies can comprise a process stator that defines at least one process pump chamber and defines at least one process chamber port in fluid communication with the at least one process pump chamber. In some embodiments, a single stator can comprise components of two or more process pump assemblies. For example, a single process stator can define two or more process pump chambers and two or more process chamber ports, such that each of the two or more process chamber ports is in fluid communication with one of the process pump chambers, and where each process pump chamber and associated process chamber port are components of one of the two or more process pump assemblies. One or more process plungers can be disposed within a process pump chamber and can be movable within the process pump chamber. A process plunger can be connected to a process plunger rod and can be movable (e.g., axially) via the process plunger rod. For example, movement of a process plunger within a process pump chamber in a first direction can draw fluid into the process pump chamber through a process chamber port in fluid connection with the process pump chamber, and movement of the process plunger within the process pump chamber in a second direction can expel fluid from the process pump chamber through the process chamber port.

In some embodiments, two or more process pump assemblies of a processing station (e.g., two or more first process pump assemblies of a first processing station, two or more intermediate process pump assemblies of an intermediate processing station, or two or more end pump assemblies of an end processing station) comprise a single process plunger rod, and process plungers disposed within the process pump chambers of each of the two or more process pump assemblies are attached to the single process plunger rod such that axial movement of the single process plunger rod effects simultaneous movement of the process plungers within their respective process pump chambers in their respective first and second directions. Such an embodiment can perform the same processing step simultaneously to fluids in fluid channels associated with the two or more process pump assemblies, such as moving fluid into the process pump chambers or out of the process pump chambers.

In some embodiments, a first process pump assembly, an intermediate process pump assembly, and/or an end process pump assembly comprises at least one process valve. For example, the process valve can be movable between a first position fluidly connecting a process pump assembly to an upstream portion of an associated fluid channel and a second position fluidly connecting the process pump assembly to a downstream portion of the associated fluid channel. A process valve can also be closed or moveable to a closed position such that fluid is retained in or blocked from entering or leaving components, such as an associated process chamber or a fluid component (e.g., chamber, channel, or port) of the process pump assembly. A process valve can be operatively coupled to a process valve rod and can be movable (e.g., rotatable) via the process valve rod between, for example, the first position and second position. In some embodiments, the process valve is coupled to a process stator of the process pump assembly such that the first position and second position fluidly connect a process chamber port defined by the process stator to the upstream portion and downstream portion of the associated fluid channel, respectively. In some embodiments, the process valve comprises a rotor, such as a rotor with multiple rotor ports and/or rotor fluid paths, which is rotatable between the first position and the second position. For example, the process valve can comprise a rotor that is rotatably mounted with respect to a process stator for rotational movement between the first position and second position, and the process valve rod can be a process rotor rod. In some embodiments, a single process valve is a component of two or more process pump assemblies and can be moved between two or more positions for fluidly connecting a first process pump of a first process pump assembly to an upstream portion of its associated fluid channel, the first process pump of the first process pump assembly to a downstream portion of its associated fluid channel, a second process pump of a second separate process pump assembly to an upstream portion of its associated fluid channel, and/or the second process pump of the second separate process pump assembly to a downstream portion of its associated fluid channel.

In some embodiments, two or more process pump assemblies of a processing station (e.g., two or more first process pump assemblies of a first processing station, two or more intermediate process pump assemblies of an intermediate processing station, or two or more end pump assemblies of an end processing station) comprise a single process valve rod, and a process valve of each of the two or more process pump assemblies is coupled to the single process valve rod such that movement of the single process valve rod effects simultaneous movement of the process valves between their first positions and second positions. Such an embodiment can perform the same processing step simultaneously to fluids in fluid channels associated with the two or more process pump assemblies, such as directing fluid movement upstream or downstream from the process pump assemblies or blocking fluid from entering or leaving associated process chambers or fluid components of the process pump assemblies.

In some embodiments, a first reagent pump assembly and/or an intermediate reagent pump assembly comprises at least one positive displacement pump, such as a reciprocating pump, for example a plunger pump. For example, each of these reagent pump assemblies can comprise a reagent stator that defines at least one reagent pump chamber and defines at least one reagent chamber port in fluid communication with the at least one reagent pump chamber. In some embodiments, a single stator can comprise components of two or more reagent pump assemblies. For example, a single reagent stator can define two or more reagent pump chambers and two or more reagent chamber ports, such that each of the two or more reagent chamber ports is in fluid communication with one of the reagent pump chambers, and where each reagent pump chamber and associated reagent chamber port are components of one of the two or more reagent pump assemblies. One or more reagent plungers can be disposed within a reagent pump chamber and can be movable within the reagent pump chamber. A reagent plunger can be connected to a reagent plunger rod and can be movable (e.g., axially) via the reagent plunger rod. For example, movement of a reagent plunger within a reagent pump chamber in a first direction can draw fluid into the reagent pump chamber through a reagent chamber port in fluid connection with the reagent pump chamber, and movement of the reagent plunger within the reagent pump chamber in a second direction can expel fluid from the reagent pump chamber through the reagent chamber port.

In some embodiments, two or more reagent pump assemblies of a processing station (e.g., two or more first reagent pump assemblies of a first processing station or two or more intermediate reagent pump assemblies of an intermediate processing station) comprise a single reagent plunger rod, and reagent plungers disposed within the reagent pump chambers of each of the two or more reagent pump assemblies are attached to the single reagent plunger rod such that axial movement of the single reagent plunger rod effects simultaneous movement of the reagent plungers within their respective reagent pump chambers in their respective first and second directions. Such an embodiment can perform the same processing step simultaneously to fluids in fluid channels associated with the two or more reagent pump assemblies, such as moving reagent from reagent input wells into the reagent pump chambers or moving reagent out of the reagent pump chambers into process chambers.

In some embodiments, a first reagent pump assembly and/or an intermediate reagent pump assembly comprises at least one reagent valve. For example, the reagent valve can be movable between a first position fluidly connecting a reagent pump assembly to an associated reagent input well and a second position fluidly connecting the reagent pump assembly to an associated process chamber. A reagent valve can also be closed or moveable to a closed position such that reagent is retained in or blocked from entering or leaving components, such as an associated reagent input well, an associated process chamber, or a fluid component (e.g., chamber, channel, or port) of the reagent pump assembly. A reagent valve can be operatively coupled to a reagent valve rod and can be movable (e.g., rotatable) via the reagent valve rod between, for example, the first position and second position. In some embodiments, the reagent valve is coupled to a reagent stator of the reagent pump assembly such that the first position fluidly connects a reagent chamber port defined by the reagent stator to the associated reagent input well and the second position fluidly connects the reagent chamber port to the associated process chamber. In some embodiments, the reagent valve comprises a rotor, such as a rotor with multiple rotor ports and/or rotor fluid paths, which is rotatable between the first position and the second position. For example, the reagent valve can comprise a rotor that is rotatably mounted with respect to a reagent stator for rotational movement between the first position and second position, and the reagent valve rod can be a reagent rotor rod. In some embodiments, a single reagent valve is a component of two or more reagent pump assemblies and can be moved between two or more positions for fluidly connecting a first reagent pump of a first reagent pump assembly to a reagent input well of its associated fluid channel, the first reagent pump of the first reagent pump assembly to a process chamber of its associated fluid channel, a second reagent pump of a second separate reagent pump assembly to a reagent input well of its associated fluid channel, and/or the second reagent pump of the second separate reagent pump assembly to a process chamber of its associated fluid channel.

In some embodiments, two or more reagent pump assemblies of a processing station (e.g., two or more first reagent pump assemblies of a first processing station or two or more intermediate reagent pump assemblies of an intermediate processing station) comprise a single reagent valve rod, and a reagent valve of each of the two or more reagent pump assemblies is coupled to the single reagent valve rod such that movement of the single reagent valve rod effects simultaneous movement of the reagent valves between their first positions and second positions. Such an embodiment can perform the same processing step simultaneously to fluids in fluid channels associated with the two or more reagent pump assemblies, such as directing or blocking reagent movement from reagent input wells or directing or to associated process chambers.

In some examples, one or more process pump chambers and/or reagent pump chambers can be sealed with a plunger rod seal. A plunger rod seal can operate in combination with one or more plunger rods and/or one or more plungers disposed in a pump chamber to form a seal in the pump chamber. A plunger rod seal can permit one or more plunger rods to extend through and move through the plunger rod seal without breaking or unsealing the seal in the pump chamber or without allowing fluid or air to escape the sealed pump.

In some examples, a stator such as a process stator or reagent stator can be coupled to one or more stator seals, such as by welding, adhesives, or elastomeric seal. For example, a process stator and a reagent stator can be connected to a shared stator seal. A stator seal can comprise fluid paths, such as fluid paths formed into a surface of the stator seal, and such stator seal fluid paths can connect or form fluid communications with fluid ports or channels of a stator to which the stator seal is coupled.

In some embodiments, two or more process chambers of a processing station (e.g., first processing station, intermediate processing station, or end processing station) are in fluid communication with each other. For example, two or more process chambers of a processing station can be combined to form a single pooled process chamber associated with two or more fluid channels such that process fluid from the two or more fluid channels can be received into the single pooled process chamber and process pump assemblies of the processing station associated with the two or more fluid channels can each move process fluid into the single pooled process chamber from portions of the associated fluid channels that are upstream from the single pooled process chamber. In some examples, the end processing station comprises one or more pooled process chambers and each of the one or more pooled process chambers is associated with a pooled output well.

In some embodiments, a component such as a rotor valve, stator, or stator seal is a component of two or more pump assemblies of a processing station. For example, two or more pump assemblies of a processing station can comprise a single rotor valve or a single stator. For example, a single rotor valve can direct process fluids or reagents in two separate fluid channels, and a single stator can define a process pump chamber and/or reagent pump chamber for each of two separate fluid channels. In some embodiments, where a single component such as a rotor valve, stator, or stator seal is a component of two or more pump assemblies, one or more of the two or more pump assemblies can be actuated without actuating the remainder of the two or more pump assemblies. For example, where a single stator defines a process pump chamber and/or reagent pump chamber of a first pump assembly of a first fluid channel and defines a process pump chamber and/or reagent pump chamber of a second pump assembly of a second separate fluid channel, the first pump assembly of the first fluid channel can be actuated without actuating the second pump assembly of the second separate fluid channel, and vice versa.

In some embodiments, one or more intermediate sample output wells can be associated with a fluid channel. An intermediate sample output well can be disposed, for example, between two processing stations of an associated a fluid channel or between a pump assembly and a process chamber of an associated fluid channel. Intermediate sample output wells can be configured to allow for a volume of sample process fluid to be retrieved from each of two or more fluid channels of the fluid processing device before or after addition of a reagent to the sample process fluids at a processing station of the fluid processing device. Sample fluids can be retrieved from intermediate sample output wells for purposes of quality control testing, archiving, or other fluid analysis performed outside of the fluid processing device.

In some embodiments, the fluid processing device comprises a consumable cassette. The cassette can comprise fluid components encapsulated or sealed within a top plate and a base plate. The cassette can contain the following components encapsulated or sealed inside the cassette: all fluid components, or all fluid components except for sample input components, reagent input components, and/or sample output components, or all processing stations, or all pump assemblies. The cassette width can be less than about 200 mm, 150 mm, 125 mm, 100 mm, 90 mm, 80 mm, 70 mm, or 60 mm. The cassette length can be less than about 400 mm, 350 mm, 325 mm, 300 mm, 275 mm, 250 mm, 225 mm, 210 mm, 200 mm, 190 mm, 180 mm, or 170 mm. In one example, the cassette contains eight fluid channels and seven processing stations and measures 90 mm wide and 210 mm in length. In some examples, components of the cassette are stacked to decrease size and dead volumes.

In some embodiments, the fluid processing device can be designed or sized to fit inside a liquid handler. The liquid handler can transfer sample fluids to the fluid processing device, such as by depositing sample fluids into a sample input well of the device. The liquid handler can remove processed sample fluids from the fluid processing device, such as by retrieving a processed sample fluid from a sample output well of the device or an intermediate sample output well of the device. The liquid handler can transfer reagents to the fluid processing device, such as by depositing a reagent into a reagent input well of the fluid processing device. The fluid processing device can comprise sample input chambers or wells, reagent input chambers or wells, intermediate sample output chambers or wells, and sample output chambers or wells that are sized and spaced to receive fluids from or have fluids recovered by a liquid handler, such as chambers that are positioned at standard microtiter plate spacing (e.g., 9 mm).

In some embodiments, components of the fluid processing device can be manufactured and/or assembled by simple processing (e.g., laser cutting, waterjet cutting, heat sealing, or lubrication), plastic molding (e.g., injection molding, blow molding, or compression molding), welding (e.g., ultrasonic welding), adhesives, or utilizing snap joints, or some combination of two or more of the forgoing. Components of the fluid processing device can comprise plastic, such as polycarbonate, polypropylene, OPP (polypropylene) film, thermoplastic urethane, thermoplastic elastomer, nylon, or polysiloxane. The fluid processing device comprises duplicates of some components, for example, stators, plungers, plunger rods, rotor valve rods, rotor valves, stator seals, plunger rod seals, and gaskets.

Aspects of the disclosure encompass an actuator device configured to activate and control pumps and/or valves of the fluid processing device. In some embodiments, the actuator device comprises one or more valve actuators (e.g., rotor actuators) that actuate valves of the fluid processing device, such as by actuating one or more valve rods or rotor rods. For example, the actuator device can comprise one or more process valve actuators to actuate one or more process valves or one or more process valve rods. For example, the actuator device can comprise one or more reagent valve actuators to actuate one or more reagent valves or one or more reagent valve rods. In some embodiments, the actuator device comprises a number of valve actuators to actuate the valves or valve rods of one processing station at a time, and the actuation device can comprise, for example, one or more valve linear actuators to move the valve actuators between processing stations of the fluid processing device. In some embodiments, the actuator device comprises one or more pump actuators (e.g., plunger actuators) that actuate pumps of the fluid processing device, such as by actuating one or more plunger rods. For example, the actuator device can comprise one or more process pump actuators to actuate one or more process pumps or one or more process plunger rods. For example, the actuator device can comprise one or more reagent pump actuators to actuate one or more reagent pumps or one or more reagent plunger rods. In some embodiments, the actuator device comprises a number of pump actuators to actuate the pumps or pump rods of one processing station at a time, and the actuation device can comprise, for example, one or more pump linear actuators to move the pump actuators between processing stations of the fluid processing device.

In some embodiments, the actuator device can control the temperature of the process chambers of the fluid processing device. For example, the actuator device can comprise heaters or thermal elements configured to be positioned below each process chamber. The actuator device can comprise, for example, a thin flex circuit heater configured to heat process chambers individually, such that the actuator device can selectively control the temperature of all process chambers in a given processing station. The actuator device can further comprise one or more fans or blowers for cooling. Temperature control of a process chamber can comprise thermocycling (e.g., for PCR purposes).

In some embodiments, the actuator device can control the magnetic field in the process chambers of the fluid processing device. For example, the actuator device can comprise one or more permanent magnets that may be moved to different distances from the process chambers, such as a first position proximate to the process chambers that applies a magnetic field to the contents of the process chambers and a second position not proximate or less proximate to the process chambers that does not apply a magnetic field to the contents of the process chambers. In some examples, the actuator device comprises a magnet lifter configured to move one or more magnets to within close proximity of one or more process chambers, such as by lifting the one or more magnets to the bottom of the one or more process chambers. The actuator device can comprise a number of magnets equal to the number of process chambers in a processing station of the fluid processing device, and the actuator device can comprise a magnet linear actuator to move the magnets and magnet lifter between processing stations such that the actuator device can selectively control the magnetic field of all process chambers in a given processing station at a time.

In some embodiments, the actuator device can control both the temperature and the magnetic field in the process chambers of the fluid processing device, separately or at the same time. For example, the actuator device can heat or cool one or more process chambers and apply a magnetic control to the one or more process chambers at different times or at the same time. In some examples, the actuator device comprises (1) a thin flexible circuit heater configured to heat the process chambers of a processing station in the fluid processing device, where the thin flexible circuit heater is disposed proximate to the process chambers, and (2) one or more magnets coupled to a magnet lifter configured to move the one or more magnets between a first position proximate to the process chambers, in which the one or more magnetic fields of the one or more magnets are applied to the contents of the process chambers, and a second position not proximate to the process chambers, in which the one or more magnetic fields of the one or more magnets are not applied (or are applied less) to the contents of the process chambers. In some examples, the thin flexible circuit heater is disposed between the process chambers and the one or more magnets when the one or more magnets are in the first position proximate to the process chambers, and the one or more magnets can press the thin flexible circuit heater against a surface or wall or the process chambers when the one or more magnets are in the first position. For example, a temperature control can be performed in the process chambers via the thin flexible circuit heater when the one or more magnets are in the first position or second position, and a magnetic control can be performed in the process chambers via the one or more magnets when the one or more magnets are in the first position. In some embodiments, the actuator device is configured to perform thermal and/or magnetic control in the process chambers according to DNA purification protocols.

FIG. 1 is a top view of a base plate 30 of a fluid processing cassette 5 (with top plate 10 (shown in FIG. 2) removed and not shown), which is an example fluid processing device according to an embodiment. As shown in FIG. 1, cassette 5 comprises an input well 34, which is exemplary of the eight total input wells of cassette 5, and an output well 36, which is exemplary of the eight total output wells of cassette 5. Cassette 5 comprises eight separate fluid channels, and no fluid channel is in fluid communication with another fluid channel. Each of the eight input wells 34 is associated with a different fluid channel, and each of the eight output wells 36 is associated with a different fluid channel. Input well 34 and an associated output well 36 are associated with the same fluid channel, and the other input wells and output wells are likewise associated in pairs based on their positioning at proximal and distal ends of base plate 30.

As shown in FIG. 1, cassette 5 comprises first processing station 500, end processing station 560, and first, second, third, fourth, and fifth intermediate processing stations 510, 520, 530, 540, and 550, that are positioned between first processing station 500 and end processing station 560. Cassette 5 encapsulates and seals the processing stations within base plate 30 and top plate 10 (see FIG. 2) to form a sealed consumable device. First processing station 500 comprises first pump assembly column 501, second pump assembly column 502, third pump assembly column 503, and fourth pump assembly column 504, and each of these pump assembly columns is configured to be operable in unison to simultaneously perform substantially similar processing steps on fluids in all eight fluid channels at first processing station 500. First intermediate processing station 510 comprises first intermediate pump assembly column 511, second intermediate pump assembly column 512, third intermediate pump assembly column 513, and fourth intermediate pump assembly column 514, and each of these pump assembly columns is configured to be operable in unison to simultaneously perform substantially similar processing steps on fluids in all eight fluid channels at first intermediate processing station 510. Each intermediate processing station 520, 530, 540, and 550 similarly includes first, second, third, and fourth intermediate pump assembly columns. End processing station 560 comprises first end pump assembly column 561, second end pump assembly column 562, third end pump assembly column 563, and fourth end pump assembly column 564, and each of these pump assembly columns is configured to be operable in unison to simultaneously perform substantially similar processing steps on fluids in all eight fluid channels at end processing station 560.

Each pump assembly column of first processing station 500 and first intermediate processing station 510 comprises process pump assemblies and reagent pump assemblies associated with two separate fluid channels, such that the eight fluid channels of cassette 5 are processed separately at each of these processing stations. Each pump assembly column of end processing station 560 comprises process pump assemblies associated with two separate fluid channels, such that the eight fluid channels of cassette 5 are processed separately in this processing station. The pump assembly columns of end processing station 560 may not include functional reagent pump assemblies.

Figure 2:
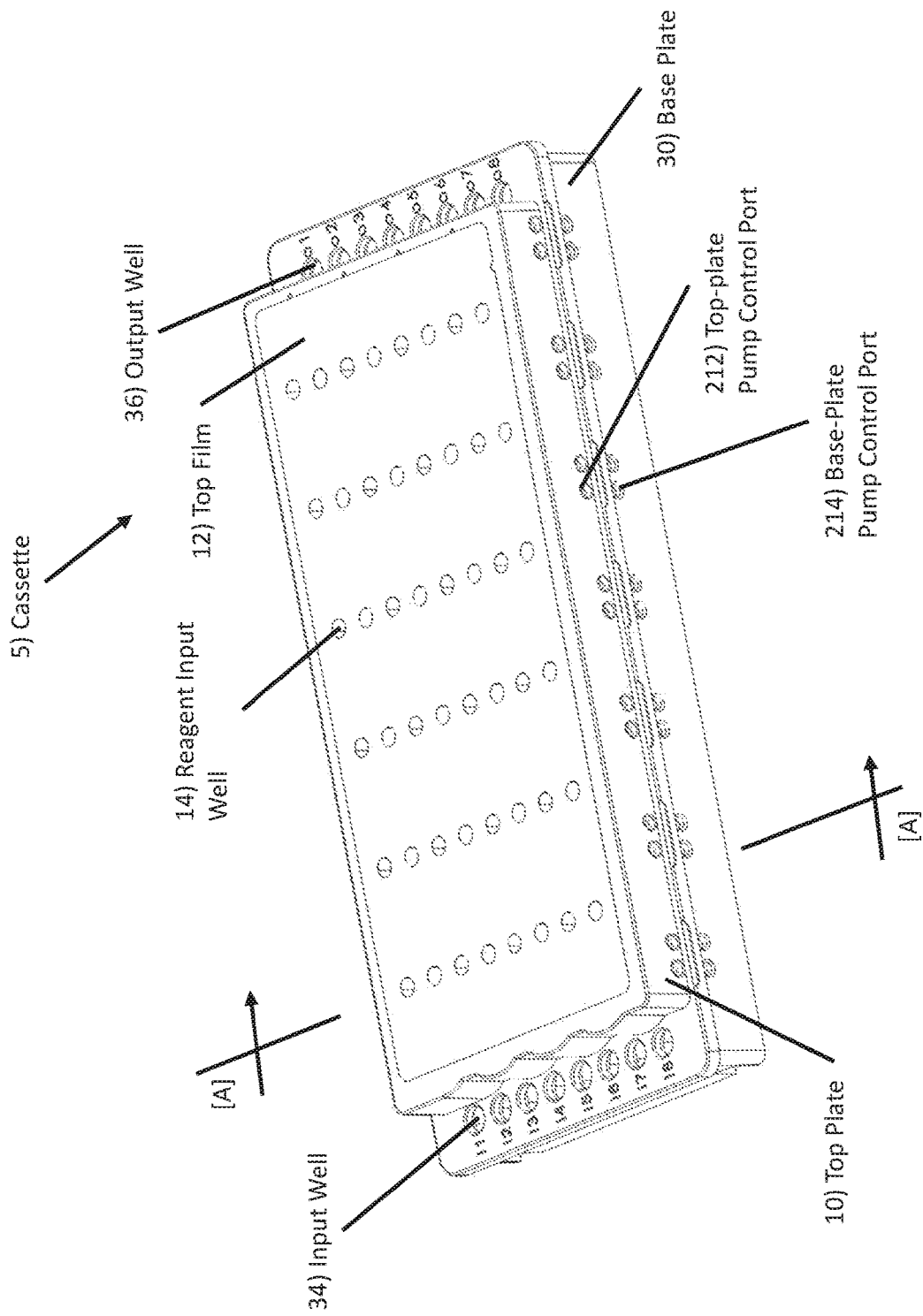
FIG. 2 is a top perspective view of the fluid processing cassette.

FIG. 2 shows a top perspective view of cassette 5. As shown in FIG. 2, cassette 5 comprises a sealed device with input wells (e.g., input well 34) on one end and output wells (e.g., output well 36) on the opposite end, in which internal fluid processing components (not shown) are disposed between the input wells and output wells and are encapsulated within the base plate 30 and a top plate 10. A top portion of top plate 10 is sealed by top film 12. A plurality of reagent input wells 14 are formed in the top of top plate 10 and are configured to receive a volume of reagent, or other process fluid, at a particular processing station for a particular fluid channel. Reagent input well 14 is exemplary of forty-eight total reagent input wells formed in top plate 10, of which eight are associated with the fluid channels (one reagent input well per fluid channel) at each of six processing stations—i.e., first processing station 500 and first, second, third, fourth, and fifth intermediate processing stations 510, 520, 530, 540, and 550 (see FIG. 1).

Figure 11:
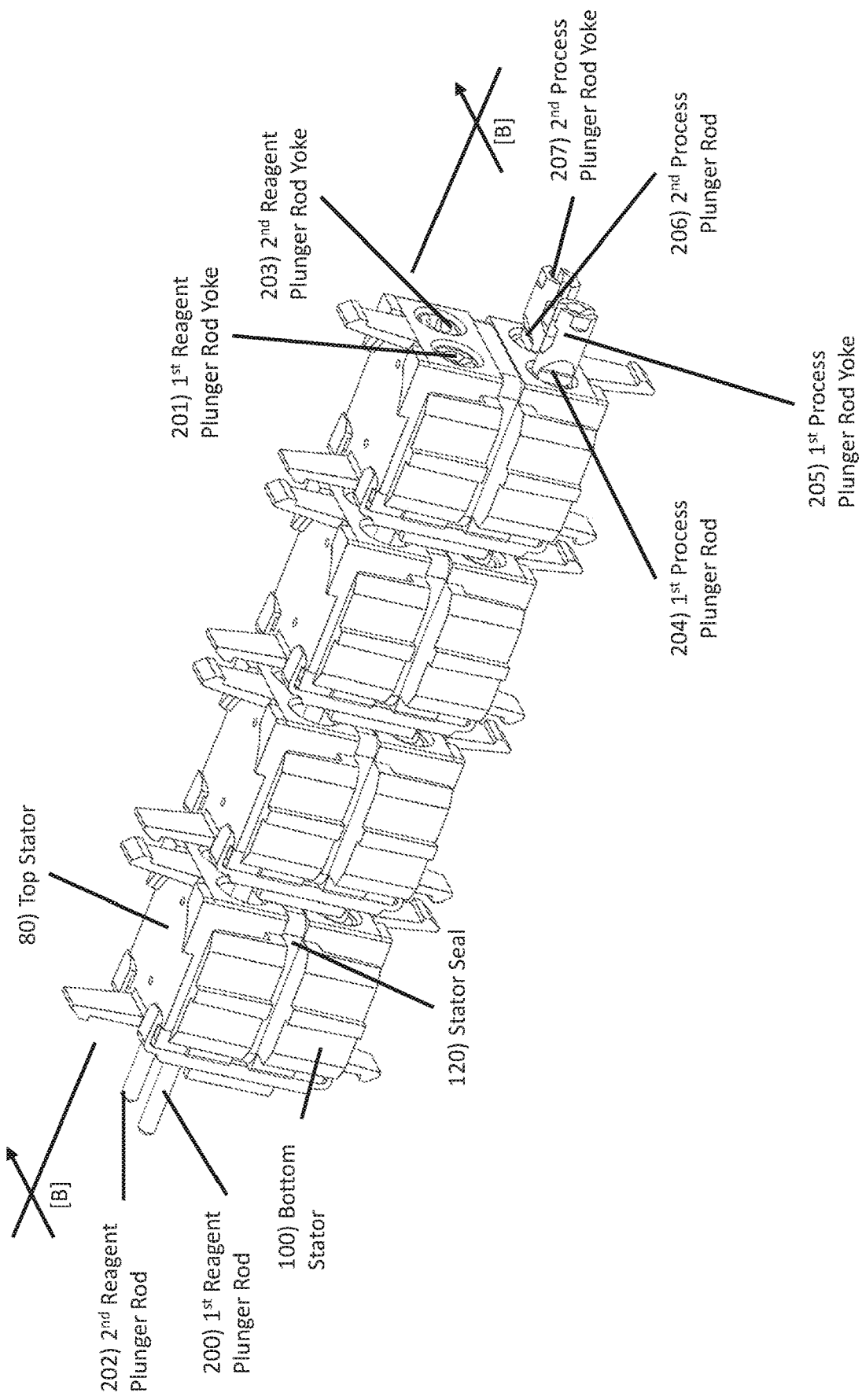
FIG. 11 is a top perspective view of pump assemblies, with rotor components removed, of the fluid processing cassette.

Top-plate pump control port 212 formed in top plate 10, which is exemplary of other top-plate pump control ports also formed in top plate 10, is configured to permit a reagent plunger rod actuator 220 (described below, see FIGS. 36, 38, 39) to actuate internal fluid components via first and second reagent plunger rods 200, 202 (see FIG. 11). Base-plate pump control port 214 formed in base plate 30, which is exemplary of other base-plate pump control ports formed in base plate 30, is configured to permit a process plunger rod actuator 222 (described below, see FIGS. 36, 38, 39) to actuate internal fluid components via first and second process plunger rods 204, 206 (see FIG. 11). If reagent plunger rod actuator 220 is coupled to first and second reagent plunger rods 200, 202, retraction of reagent plunger rod actuator 220 out of top-plate pump control ports 212 will cause reagent plunger rod actuator 220 to de-couple from first and second reagent plunger rods 200, 202 due to interference between first and second reagent plunger rods 200, 202 and top plate 10, as first and second reagent plunger rod yokes 201, 203 (see FIG. 11) each have a diameter that is larger than the diameter of top-plate pump control ports 212. If process plunger rod actuator 222 is coupled to first and second process plunger rods 204, 206, retraction of process plunger rod actuator 222 out of base-plate pump control ports 214 will cause process plunger rod actuator 222 to de-couple from first and second process plunger rods 204, 206 due to interference between first and second process plunger rods 204, 206 and base plate 30, as first and second process plunger rod yokes 205, 207 (see FIG. 11) each have a diameter that is larger than the diameter of base-plate pump control ports 214. Thus, first and second reagent plunger rods 200, 202 and first and second process plunger rods 204, 206 are configured to be retained inside top plate 10 and base plate 30 upon retraction and release of reagent plunger rod actuator 220 and process plunger rod actuator 222, respectively.

Figure 3:
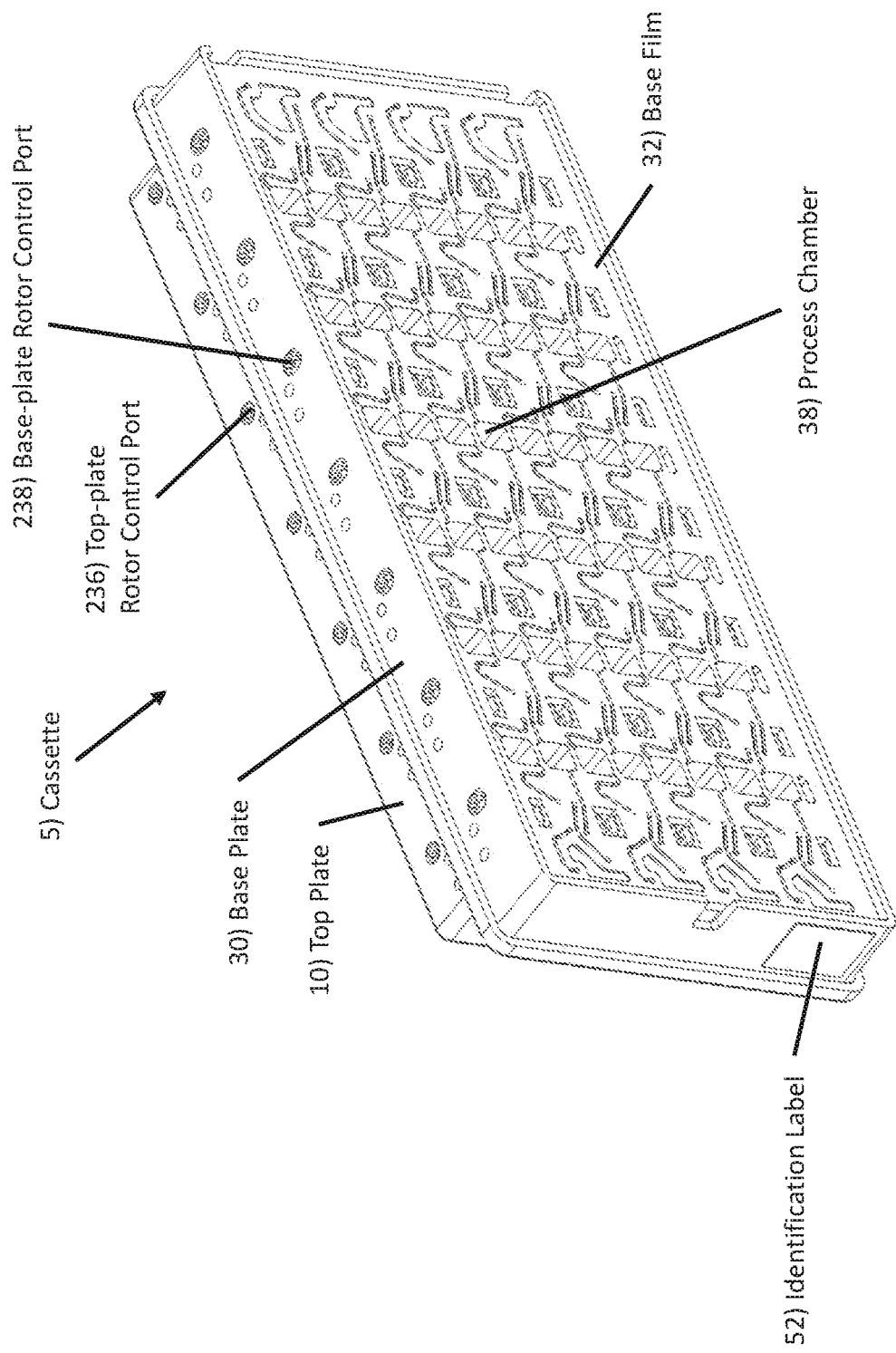
FIG. 3 is a bottom perspective view of the fluid processing cassette.

FIG. 3 shows a bottom perspective view of cassette 5. A bottom portion of base plate 30 is sealed by base film 32. Base film 32 is shown as translucent in FIG. 3 so as to show features (e.g., process chamber 38) formed in the bottom of base plate 30, where the bottom surface of such features are sealed by base film 32. A plurality of process chambers 38 are formed in the bottom of base plate 30 and are configured to receive fluid at a particular processing station for a particular fluid channel. Process chamber 38 is exemplary of forty-eight total process chambers formed in base plate 30, of which eight are associated with the eight fluid channels (one process chamber per fluid channel) at each of six processing stations—i.e., first processing station 500 and first, second, third, fourth, and fifth intermediate processing stations 510, 520, 530, 540, and 550 (see FIG. 1). Top-plate rotor control port 236 formed in top plate 10, which is exemplary of other top-plate rotor control ports also formed in top plate 10, is configured to permit a reagent rotor rod actuator 240 (see FIGS. 36, 37, 39) to actuate internal fluid components via a reagent rotor rod 230 (see FIG. 15). Base-plate rotor control port 238 formed in base plate 30, which is exemplary of other base-plate rotor control ports formed in base plate 30, is configured to permit a process rotor rod actuator 242 (see FIG. 36, 37, 39) to actuate fluid components via a process rotor rod 232 (see FIG. 15). If reagent rotor rod actuator 240 is coupled to reagent rotor rod 230, retraction of reagent rotor rod actuator 240 out of and away from top-plate rotor control ports 236 a certain distance will cause reagent rotor rod actuator 240 to de-couple from reagent rotor rod 230 due to interference between reagent rotor rod 230 and top plate 10. If process rotor rod actuator 242 is coupled to process rotor rod 232, retraction of process rotor rod actuator 242 out of and away from base-plate rotor control ports 238 a certain distance will cause process rotor rod actuator 242 to de-couple from process rotor rod 232 due to interference between process rotor rod 232 and base plate 30. Thus, reagent rotor rod 230 and process rotor rod 232 are configured to be retained inside top plate 10 and base plate 30 upon retraction and release of reagent rotor rod actuator 240 and process rotor rod actuator 242, respectively.

An identification label 52 can comprise a machine-readable identification marker, such as a barcode or RFID tag, and/or a human-readable identification marker, such that sample fluids processed or sought to be processed in cassette 5 can be identified.

Figure 4:
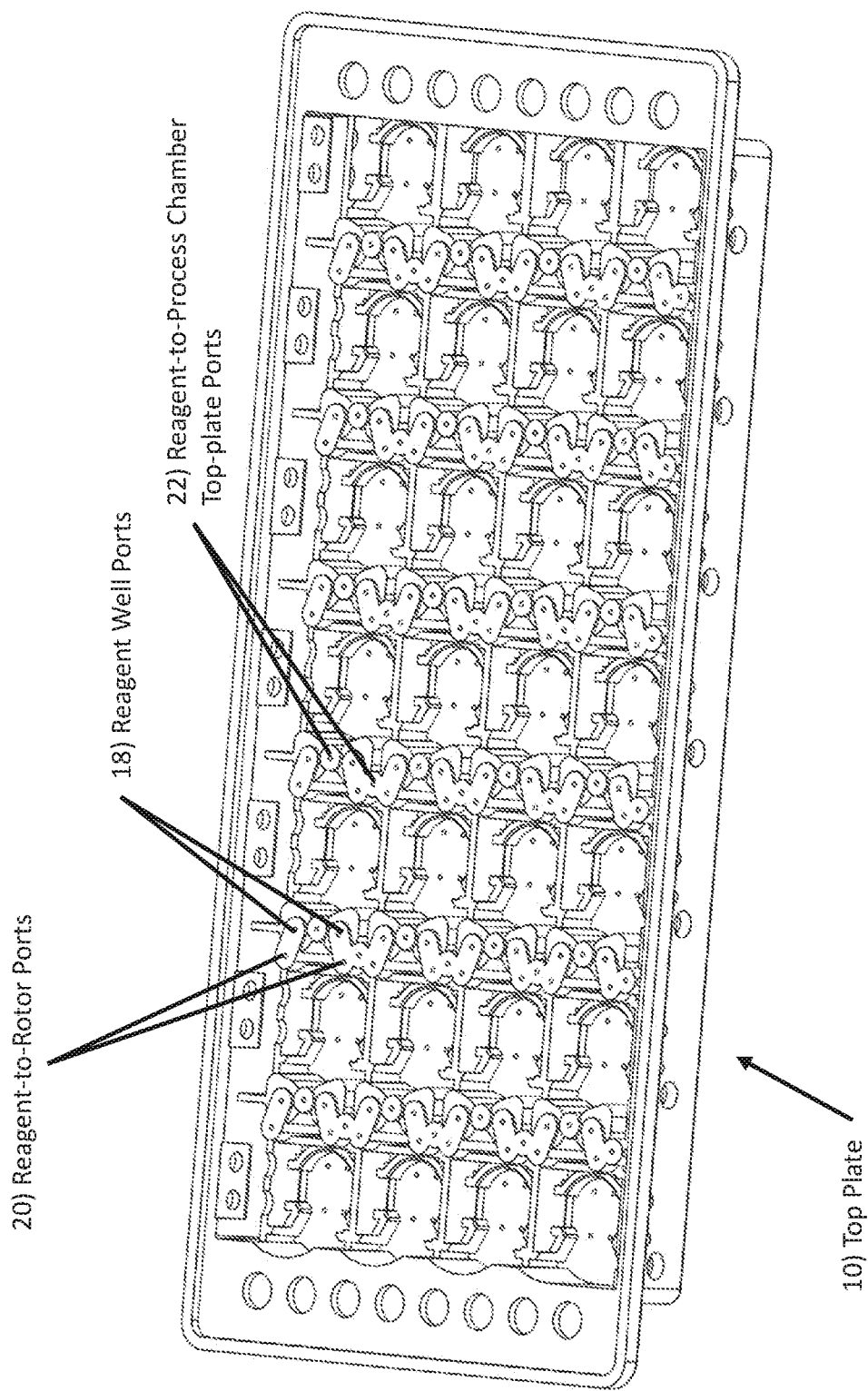
FIG. 4 is a bottom perspective view of a top plate of the fluid processing cassette.

FIG. 4 is a bottom perspective view of top plate 10. Reagent well ports 18 are ports located at the bottom of reagent input wells 14 (see FIGS. 2, 7) formed in the top of top plate 10 and which permit reagents in the reagent input wells to move to the inside of cassette 5 to where the pump assembly columns, such as pump assembly columns 511, 512, 513, and 514 (see FIGS. 1, 17), are enclosed. Reagent-to-rotor ports 20 are connected to reagent well ports 18 via gasket slots 64 (see FIGS. 6, 7) and permit reagents that enter reagent well ports 18 to move to upper rotors 150 of reagent pump assemblies (see FIG. 15). Reagent-to-process chamber top-plate ports 22 permit reagent to move from upper rotors 150 of reagent pump assemblies (see FIG. 15) to associated process chambers 38 (see FIG. 7) via reagent-to-process chamber gasket ports 66 (see FIGS. 6, 7) and then via reagent-to-process chamber base-plate ports 42 (see FIGS. 5, 7). The two reagent well ports 18, the two reagent-to-rotor ports 20, and the two reagent-to-process chamber top-plate ports 22 that are labelled in FIG. 4 are repeating features of one each is associated with each of the eight fluid channels at each of the six processing stations—i.e., first processing station 500 and first, second, third, fourth, and fifth intermediate processing stations 510, 520, 530, 540, and 550 (see FIG. 1). Regarding reagent well ports 18, reagent-to-rotor ports 20, and reagent-to-process chamber top-plate ports 22, see comparable elements 402 and 422 (first and second reagent well ports), 406 and 426 (first and second reagent-to-rotor port), and 410 and 430 (first and second reagent to process chamber top-plate ports) in FIGS. 28 and 34.

Figure 5:
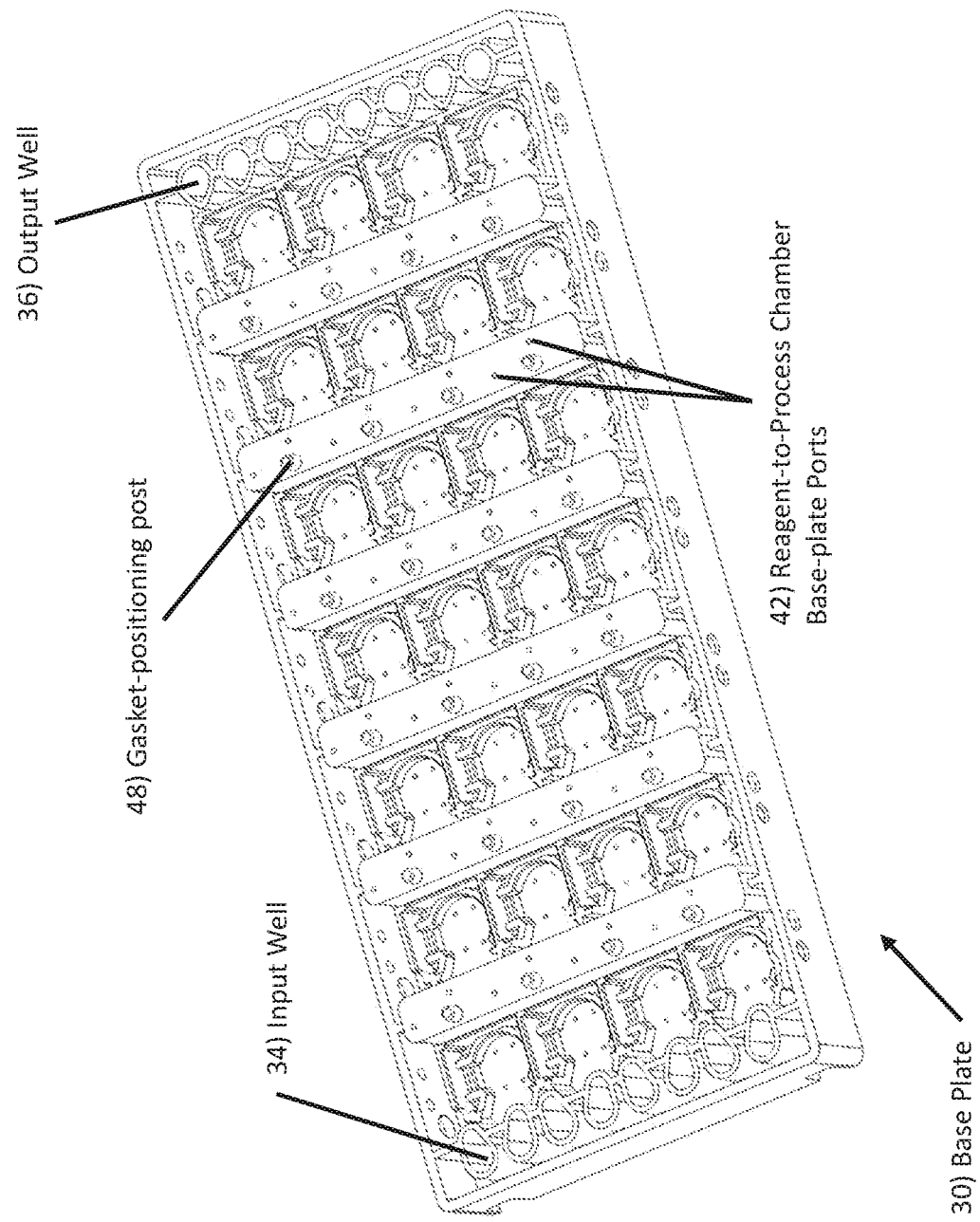
FIG. 5 is a top perspective view of a base plate of the fluid processing cassette.

FIG. 5 is a top perspective view of base plate 30. Reagent-to-process chamber base-plate ports 42 permit reagent from reagent-to-process chamber top-plate ports 22 (see FIG. 4) via reagent-to-process chamber gasket ports 66 (see FIG. 6) to move to process chambers 38 (see FIG. 3) formed in the bottom side of base plate 30. The reagent-to-process chamber base-plate ports 42 that are labelled in FIG. 5 are repeating features of which one each is associated with each of the eight fluid channels at each of the six processing stations—i.e., first processing station 500 and first, second, third, fourth, and fifth intermediate processing stations 510, 520, 530, 540, and 550 (see FIG. 1). Gasket-positioning post 48, which is exemplary of other gasket-positioning posts formed in base plate 30, is configured to fit into post hole 62 to secure and stabilize a gasket 60 (see FIG. 6).

Figure 6:
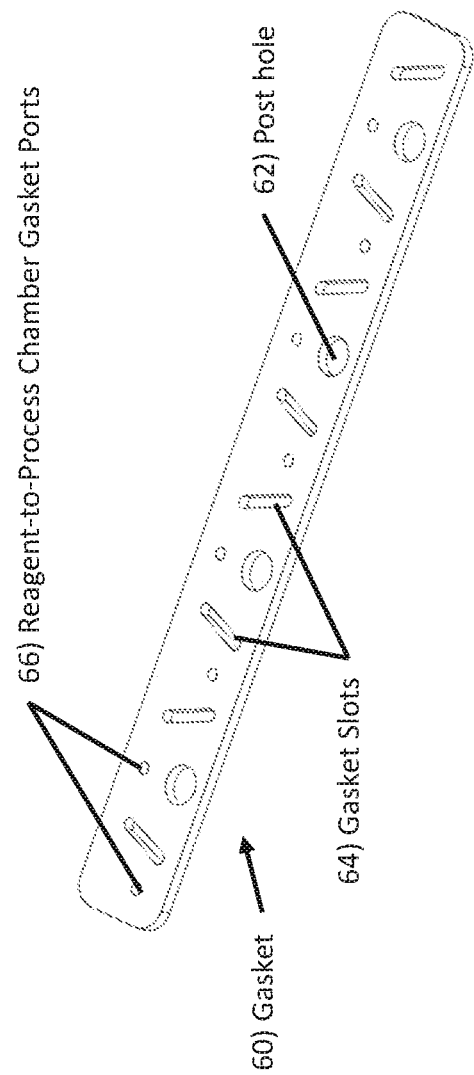
FIG. 6 is a perspective view of a gasket of the fluid processing cassette.

FIG. 6 is a perspective view of a gasket 60, which comprises gasket slots 64 that form fluid passageways between reagent well ports 18 and reagent-to-rotor ports 20 (see FIG. 4). Gasket 60 further comprises reagent-to-process chamber gasket ports 66, which permit reagents to move from reagent-to-process chamber top-plate ports 22 (see FIG. 4) to reagent-to-process chamber base-plate ports 42 (see FIG. 5). Gasket 60 further comprises post holes such as post hole 62, which are configured to receive gasket-positioning posts such as gasket-positioning post 48 (see FIG. 5).

Figure 7:
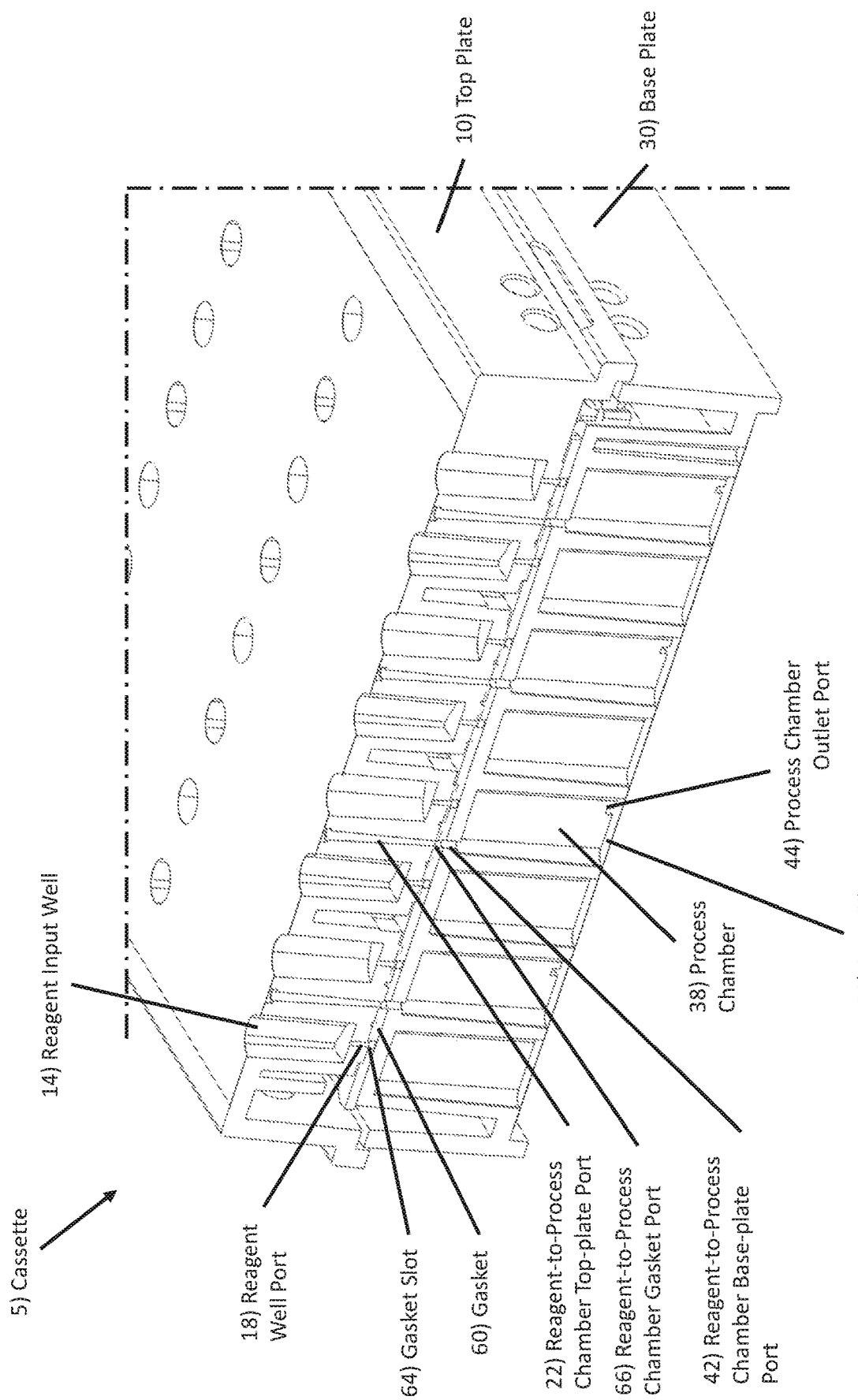
FIG. 7 is a partial perspective, cross-sectional view of the fluid processing cassette along the line A-A in FIG. 2.

FIG. 7 shows a partial perspective, cross-sectional view of fluid processing cassette 5 taken along line A-A in FIG. 2. As shown in FIG. 7, gasket 60 is positioned and secured between portions of top plate 10 and base plate 30. FIG. 7 also shows that reagent in reagent input well 14 is fluidly connected through reagent well port 18 into gasket slot 64. Also, reagent is fluidly connected from a portion on top of top plate 10 down through reagent-to-process chamber top-plate port 22, then through reagent-to-process chamber gasket port 66, then through reagent-to-process chamber base-plate port 42, and into process chamber 38. Process chamber 38 is connected to the subsequent processing station via a process chamber outlet port 44. A portion of base film 32 forms the bottom surface of process chamber 38.

Figure 8:
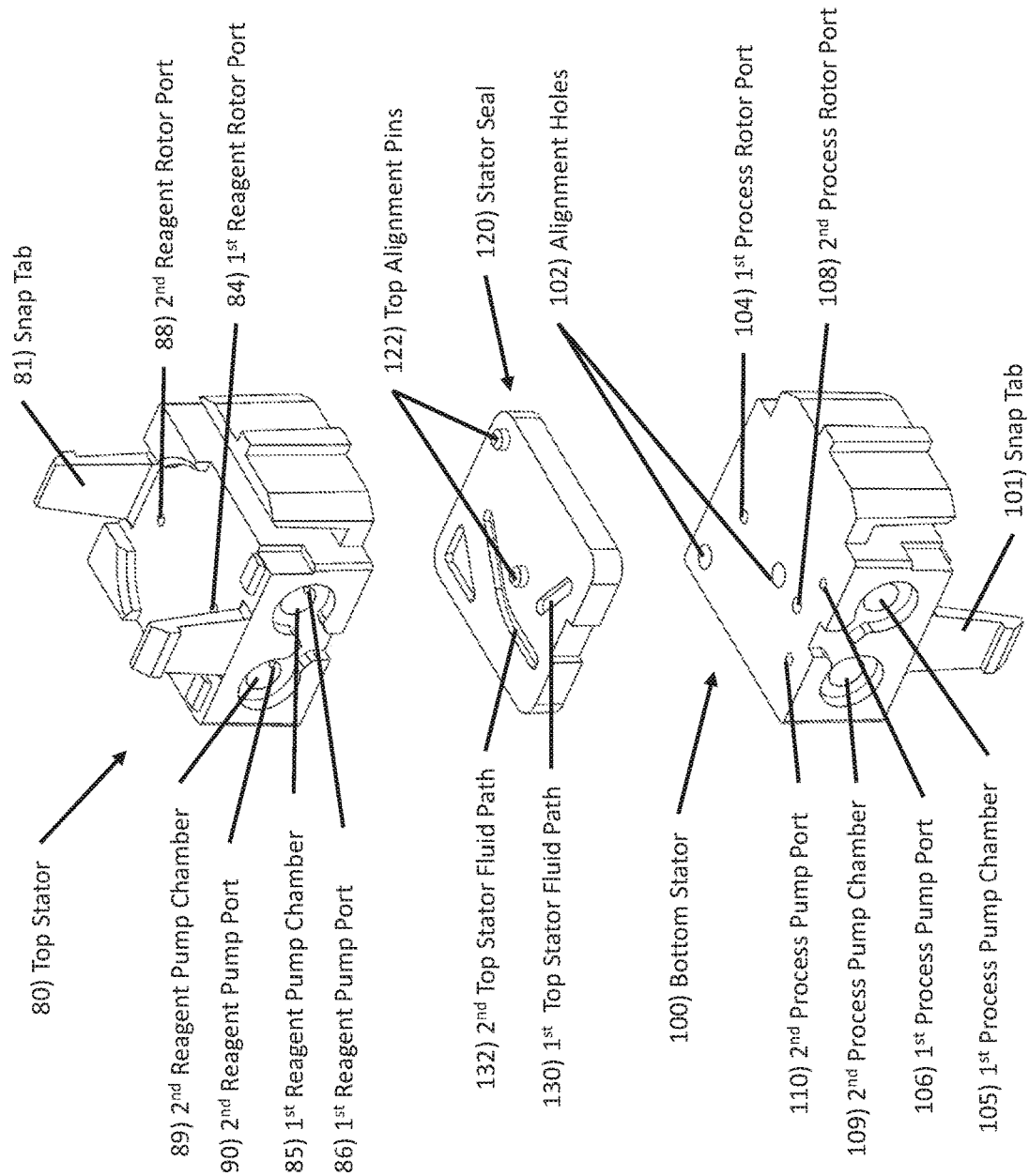
FIG. 8 is an exploded top perspective view of a stator assembly of the fluid processing cassette.

FIG. 8 shows an exploded top perspective view of a stator assembly comprising top stator 80 of a reagent pump assembly, bottom stator 100 of a process pump assembly, and stator seal 120 disposed between top stator 80 and bottom stator 100. Top stator 80 comprises a first reagent rotor port 84 that extends completely through top stator 80 and is in fluid communication with a first top stator fluid path 130 of stator seal 120, which is in fluid communication with first reagent pump port 86 that extends from the bottom of top stator 80 to first reagent pump chamber 85. Top stator 80 further comprises a second reagent rotor port 88 that extends completely through top stator 80 and is in fluid communication with a second top stator fluid path 132 of stator seal 120, which is in fluid communication with second reagent pump port 90 that extends from the bottom of top stator 80 to second reagent pump chamber 89. First and second reagent pump chambers 85, 89 are associated with separate fluid channels via their respective reagent pump ports 86, 90, top stator fluid paths 130, 132, and reagent rotor ports 84, 88.

Top stator 80 further comprises at least one snap tab 81, which is a flexible tab with a detent configured to be snapped into a corresponding hole in top plate 10, such as to form a snap joint to secure top stator 80 and top plate 10 to each other.

Bottom stator 100 comprises first process rotor port 104 and second process rotor port 108 that extend completely through bottom stator 100. Bottom stator 100 further comprises a first process pump chamber 105, which is in fluid communication with a first process pump port 106 that extends from first process pump chamber 105 to the top of bottom stator 100. Bottom stator 100 further comprises a second process pump chamber 109, which is in fluid communication with a second process pump port 110 that extends from second process pump chamber 109 to the top of bottom stator 100.

Bottom stator 100 also comprises alignment holes 102 configured to receive alignment pins 123 (see FIG. 9) of stator seal 120.

Bottom stator 100 further comprises at least one snap tab 101, which is a flexible tab with a detent configured to be snapped into a corresponding hole in base plate 30, such as to form a snap joint to secure bottom stator 100 and base plate 10 to each other.

Figure 9:
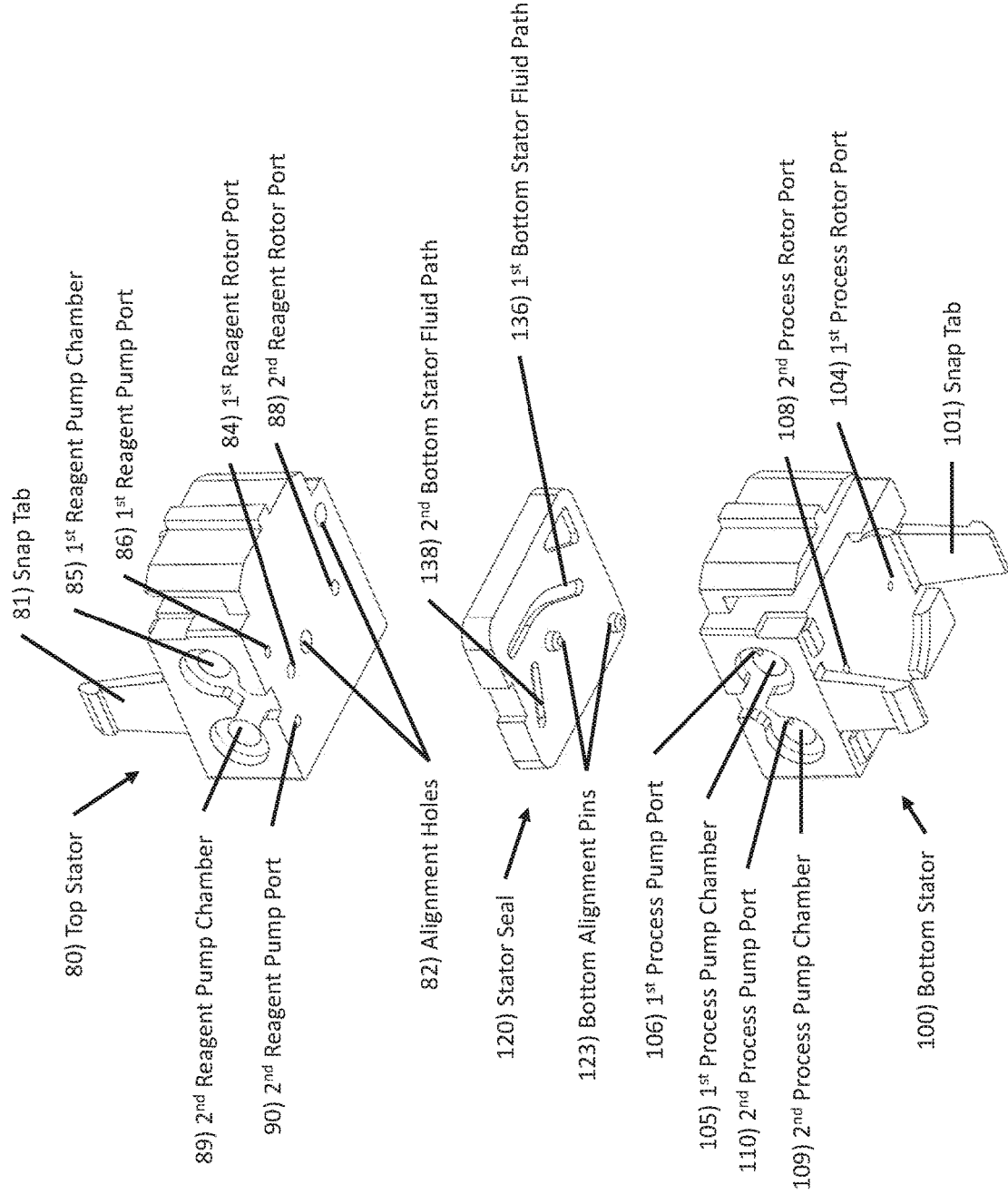
FIG. 9 is an exploded bottom perspective view of the stator assembly.

FIG. 9 shows an exploded bottom perspective view of a stator assembly comprising top stator 80 of a reagent pump assembly, bottom stator 100 of a process pump assembly, and stator seal 120 disposed between top stator 80 and bottom stator 100. Bottom stator 100 comprises first process rotor port 104 that extends completely through bottom stator 100 and is in fluid communication with a first bottom stator fluid path 136 of stator seal 120, which is in fluid communication with first process pump port 106 that extends from the top of bottom stator 100 to first process pump chamber 105. Bottom stator 100 further comprises a second process rotor port 108 that extends completely through bottom stator 100 and is in fluid communication with a second bottom stator fluid path 138 of stator seal 120, which is in fluid communication with a second process pump port 110 that extends from the top of bottom stator 100 to second process pump chamber 109. First and second process pump chambers 105, 109 are associated with separate fluid channels via their respective process pump ports 106, 110, bottom stator fluid paths 136, 138, and process rotor ports 104, 108. Top stator 80 comprises a first reagent rotor port 84 and a second reagent rotor port 88 that extend completely through top stator 80. Top stator 80 further comprises first reagent pump chamber 85, which is in fluid communication with first reagent pump port 86 that extends from first reagent pump chamber 85 to the bottom of top stator 80. Top stator 80 further comprises second reagent pump chamber 89, which is in fluid communication with second reagent pump port 90 that extends from second reagent pump chamber 89 to the bottom of top stator 80.

Top stator 80 also comprises alignment holes 82 (see FIG. 9) configured to receive alignment pins 122 (see FIGS. 8 and 10) of stator seal 120.

Figure 10:
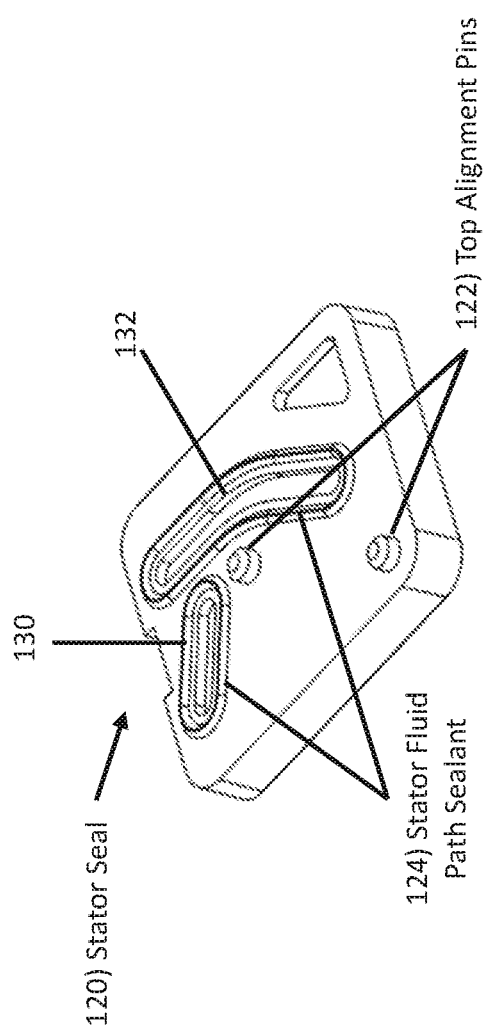
FIG. 10 is a top perspective view of a stator seal of the stator assembly.

FIG. 10 shows stator seal 120. Stator seal 120 comprises top alignment pins 122 configured to fit into alignment holes 82 of top stator 80 and bottom alignment pins 123 (see FIG. 9) configured to fit into alignment holes 102 of bottom stator 100 to align the top stator 80, bottom stator 100, and stator seal 120. Stator seal 120 further comprises a stator fluid path sealant 124 around each top stator fluid path 130, 132 and bottom stator fluid path 136, 138. The top stator 80, bottom stator 100, and stator seal 120 may be welded together (e.g., ultrasonically welded) during assembly of cassette 5, and during the welding, the stator fluid path sealants 124 of stator seal 120 are melted into top stator 80 and bottom stator 100 to secure the three components together and prevent leaks or cross contamination from around the top or bottom stator fluid paths (130, 132, 136, 138). To note, the top alignment pins 122, first top stator fluid path 130, and second top stator fluid path 132 on one surface of stator seal 120 and the bottom alignment pins 123, second bottom stator fluid path 138, and first bottom stator fluid path 136 on an opposite surface of stator seal 120 are mirrored features, respectively, on the opposite surfaces of stator seal 120. Thus, components of stator seal 120 are labelled as "top" or "bottom" for description purposes and are not so limited. For example, either opposite surface of stator seal 120 can be aligned with and secured to the bottom of top stator 80 or the top of bottom stator 100.

FIG. 11 shows a top perspective view of pump assemblies of a processing station of cassette 5, with rotor components (described below) removed. The pump assemblies shown in FIG. 11 comprise four stator assemblies, each comprising a top stator, bottom stator, and stator seal, of which top stator 80, bottom stator 100, and stator seal 120, respectively, are exemplary. The pump assemblies further comprise a first reagent plunger rod 200 that extends axially through the first reagent pump chambers of the four top stators, of which first reagent pump chamber 85 (see FIGS. 8, 9) of top stator 80 is exemplary. The pump assemblies further comprise a second reagent plunger rod 202 that extends axially through the second reagent pump chambers of the four top stators, of which second reagent pump chamber 89 (see FIGS. 8, 9, 12) of top stator 80 is exemplary. The pump assemblies further comprise a first process plunger rod 204 that extends axially through the first process pump chambers of the four bottom stators, of which first process pump chamber 105 (see FIGS. 8, 9) of bottom stator 100 is exemplary. The pump assemblies further comprise a second process plunger rod 206 that extends axially through the second process pump chambers of the four bottom stators, of which second process pump chamber 109 (see FIGS. 8, 9, 12) of bottom stator 100 is exemplary. First and second reagent plunger rods 200, 202 comprise first and second reagent plunger rod yokes 201, 203, respectively. First and second reagent plunger rod yokes 201, 203 are configured to operatively couple and de-couple first and second reagent plunger rods 200, 202 to reagent plunger rod actuator 220 (described below, see FIGS. 36, 38, 39). First and second process plunger rods 204, 206 comprise first and second plunger rod yokes 205, 207, respectively. First and second process plunger rod yokes 205, 207 are configured to operatively couple and de-couple first and second process plunger rods 204, 206 to process plunger rod actuator 222 (described below, see FIGS. 36, 38, 39).

Figure 12:
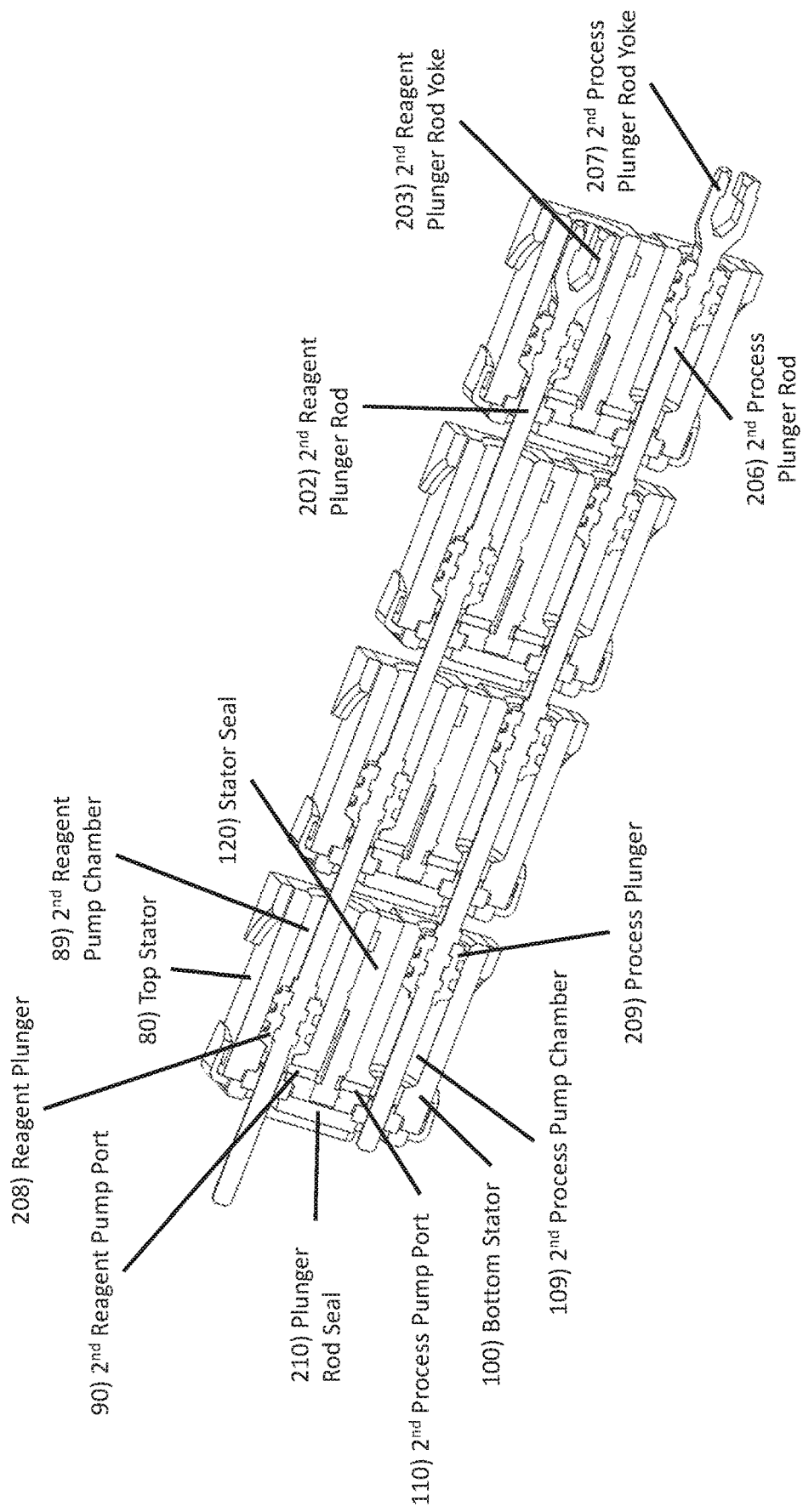
FIG. 12 is a top perspective, cross-sectional view of the pump assemblies, with rotor components removed, along the line B-B in FIG. 11.

FIG. 12 shows a top perspective, cross-sectional view of the pump assemblies in FIG. 11 with rotor components removed, taken along line B-B in FIG. 11. As shown in FIG. 12, reagent plunger 208 is disposed in second reagent pump chamber 89 of top stator 80, and similar reagent plungers are disposed in the second reagent pump chambers of each other top stator. Also, process plunger 209 is disposed in second process pump chamber 109 of bottom stator 100, and similar process plungers are disposed in the second process pump chambers of each other bottom stator. All of the reagent plungers in the second reagent pump chambers are attached to a single second reagent plunger rod 202 such that axial movement of second reagent plunger rod 202 effects simultaneous movement of the reagent plungers 208 within their respective second reagent pump chambers 89. Specifically, axial movement of second reagent plunger rod 202 in a first direction (to the right in FIG. 12) that moves reagent plungers 208 away from second reagent pump ports 90 will draw reagent into the second reagent pump chambers 89 via the second reagent pump ports 90, and axial movement of second reagent plunger rod 202 in a second direction (to the left in FIG. 12) that moves reagent plungers 208 closer to second reagent pump ports 90 will expel reagent out of the second reagent pump chambers 89 via the second reagent pump ports 90. Similarly, all of the process plungers 209 in the second process pump chambers 109 are attached to a single second process plunger rod 206 such that axial movement of second process plunger rod 206 effects simultaneous movement of the process plungers 209 within their respective second process pump chambers 109. Specifically, axial movement of second process plunger rod 206 in a first direction (to the right in FIG. 12) that moves process plungers 209 away from second process pump ports 110 will draw fluid into the second process pump chambers 109 via the second process pump ports 110, and axial movement of second process plunger rod 206 in a second direction (to the left in FIG. 12) that moves process plungers 209 closer to second process pump ports 110 will expel fluid out of the second process pump chambers 109 via the second process pump ports 110. The ends of the second reagent pump chambers (e.g., second reagent pump chamber 89) and second process pump chambers (e.g., second process pump chamber 109) that are not sealed via the reagent plungers (e.g., reagent plunger 208) or process plungers (e.g., process plunger 209), respectively, are sealed by a plunger rod seal (e.g., plunger rod seal 210). For example, plunger rod seal 210 seals second reagent pump chamber 89 and second process pump chamber 109 together with reagent plunger 208 and process plunger 209, respectively, such that second reagent plunger rod 202 and second process plunger rod 206 are permitted to extend and move through plunger rod seal 210 without unsealing the pump chambers and without allowing fluid or air to escape the sealed pump chambers.

Figure 13:
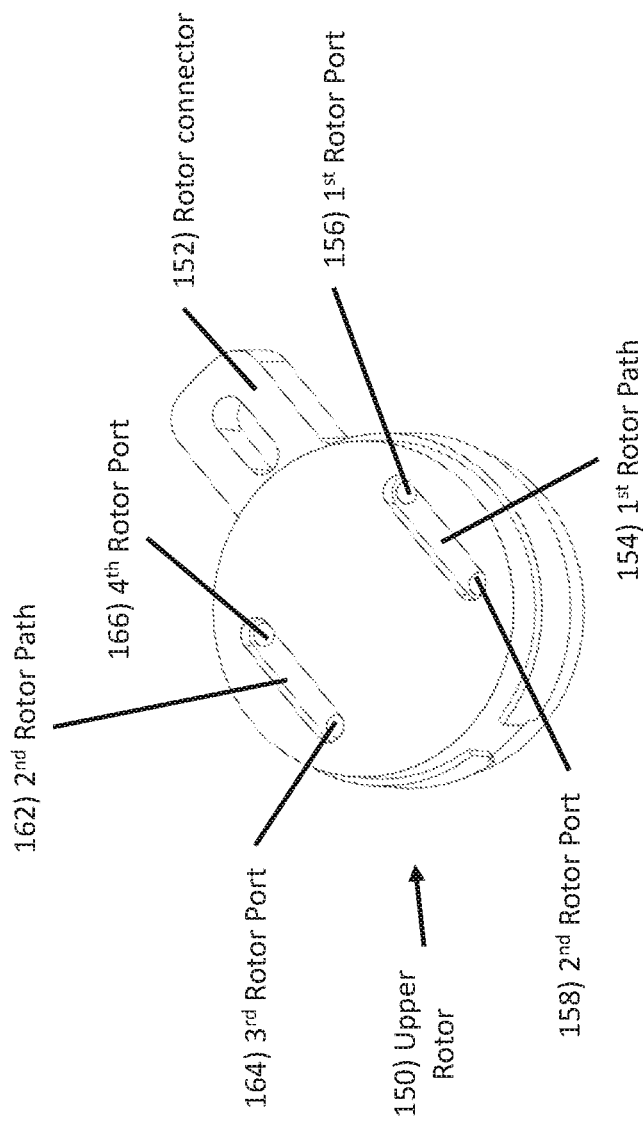
FIG. 13 is a top perspective view of an upper rotor of the fluid processing cassette.

FIG. 13 is a top perspective view of an upper rotor 150, which is a component of the reagent pump assemblies of cassette 5. Upper rotor 150 comprises first rotor port 156 and second rotor port 158 that are in fluid communication via first rotor path 154. Upper rotor 150 further comprises third rotor port 164 and fourth rotor port 166 that are in fluid communication via second rotor path 162. First, second, third, and fourth rotor ports 156, 158, 164, and 166 each extends completely through upper rotor 150. Upper rotor 150 also comprises rotor connector 152 configured to couple upper stator 150 to a reagent rotor rod 230 (see FIG. 15). Upper rotor 150 is substantially similar to lower rotor 170 (see FIG. 15), which is a component of the process pump assemblies of cassette 5, except that the top-facing portion of upper rotor 150 shown in FIG. 13 is equivalent to the bottom-facing portion of lower rotor 170.

Figure 14:
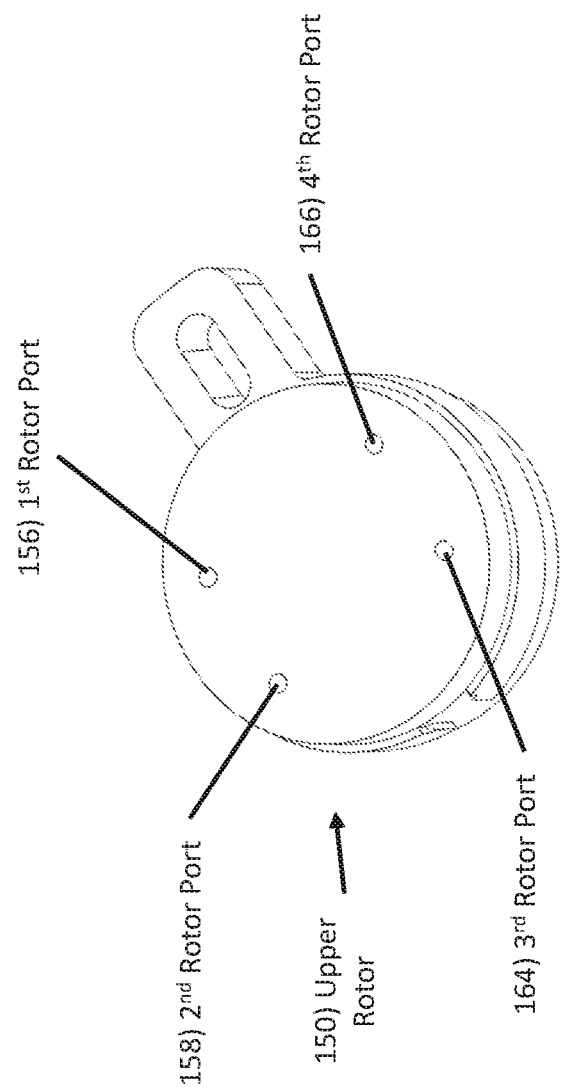
FIG. 14 is a bottom perspective view of the upper rotor.

FIG. 14 is a bottom perspective view of upper rotor 150 and shows that first, second, third, and fourth rotor ports 156, 158, 164, and 166 each extends completely through upper rotor 150. The bottom-facing portion of upper rotor 150 shown in FIG. 14 is equivalent to the top-facing portion of lower rotor 170 (see FIG. 15).

Figure 15:
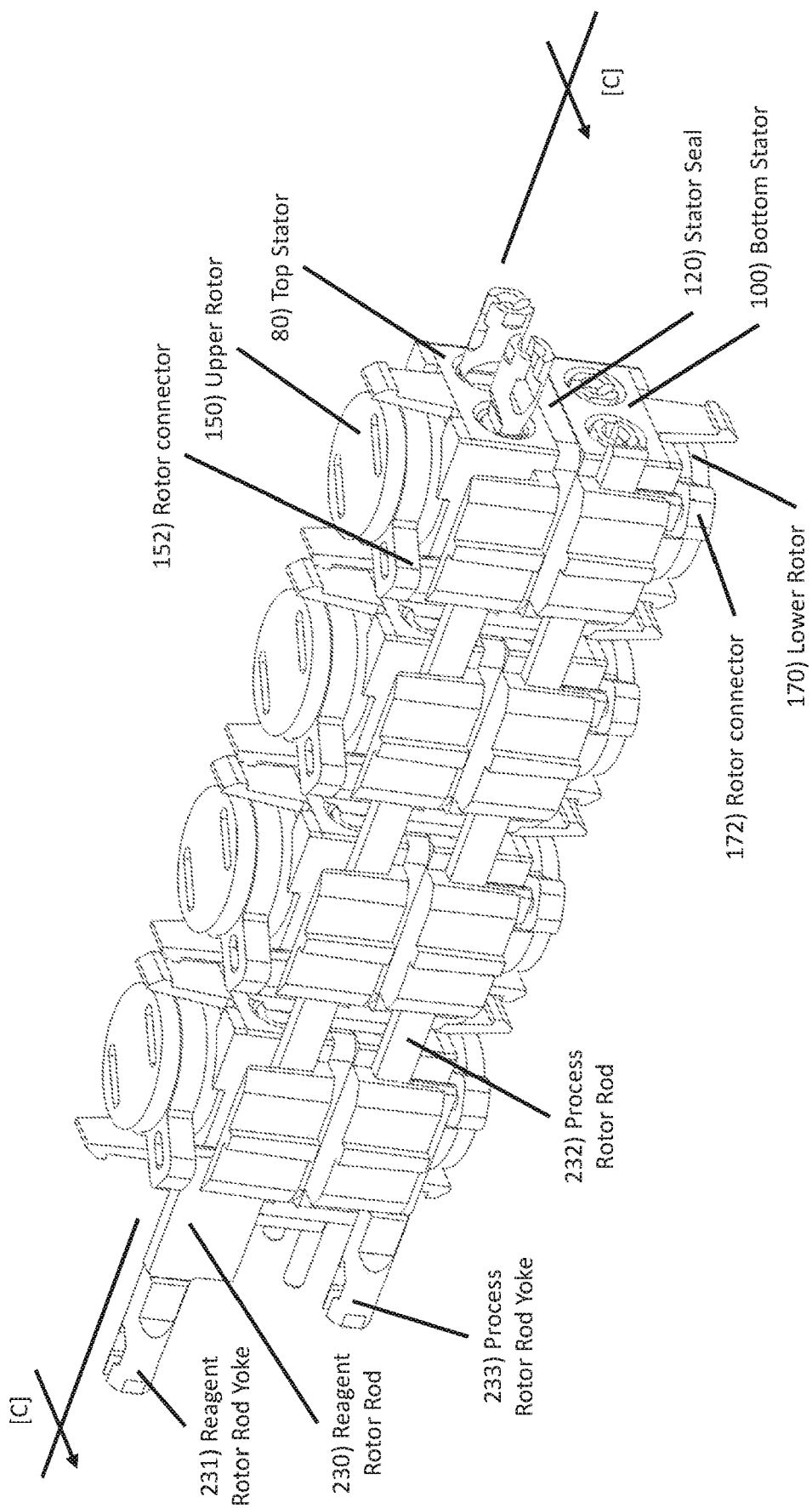
FIG. 15 is a top perspective view of the pump assemblies of the fluid processing cassette.

FIG. 15 is a top perspective view of pump assemblies of a processing station of cassette 5. The pump assemblies shown in FIG. 15 are similar to the pump assemblies as shown in FIG. 11, but the pump assemblies as shown in FIG. 15 include upper rotors (e.g., upper rotor 150), lower rotors (e.g., lower rotor 170), a reagent rotor rod 230, and process rotor rod 232. Upper rotors such as upper rotor 150 and lower rotors such as lower rotor 170 in the pump assemblies of cassette 5 are rotor valves that are coupled to top stators 80 and bottom stators 100, respectively. Upper rotors such as upper rotor 150 are movable between a first position that fluidly connects reagent input wells, such as reagent input well 14 (see FIG. 2), to first and second reagent pump chambers 85, 89 defined by the top stators 80 (see FIGS. 8, 9, 12) and a second position that fluidly connects the first and second reagent pump chambers 85, 89 to associated process chambers, such as process chamber 38 (see FIG. 3). Lower rotors, such as lower rotor 170, are movable between a first position that fluidly connects first and second process pump chambers 105, 109 defined by the bottom stators 100 (see FIGS. 8, 9, 12) to upstream portions of the fluid channels (e.g., input wells 34 (see FIG. 1) or process chambers 38 of a preceding processing station) and a second position that fluidly connects the first and second process pump chambers 105, 109 to downstream portions of the fluid channels (e.g., process chambers 38 of the instant processing station or output wells 36 (see FIG. 1)). Lower rotors 170 in the first position allow the first and second process pump chambers 105, 109 to receive sample fluid from upstream portions of the fluid channels or to expel waste fluid to upstream portions of the fluid channels depending on the direction of movement of the first and second process plunger rods 204, 206, respectively (see FIGS. 11, 12). Lower rotors 170 in the second position allow the first and second process pump chambers 105, 109 to expel sample fluid to downstream portions of the fluid channels or to receive waste fluid from downstream portions of the fluid channels, again depending on the direction of movement of the first and second process plunger rods 204, 206, respectively. The upper rotors such as upper rotor 150 are all coupled to a single reagent rotor rod 230, via rotor connectors such as rotor connector 152, such that movement of reagent rotor rod 230 effects simultaneous movement of the upper rotors 150 between their first positions and second positions. Similarly, the lower rotors such as lower rotor 170 are all coupled to a single process rotor rod 232, via rotor connectors such as rotor connector 172, such that movement of process rotor rod 232 effects simultaneous movement of the lower rotors 170 between their first positions and second positions. Reagent rotor rod 230 comprises reagent rotor rod yoke 231, which is configured to operatively couple and de-couple reagent rotor rod 230 to reagent rotor rod actuator 240 (described below, see FIGS. 36, 37, 39). Process rotor rod 232 comprises process rotor rod yoke 233, which is configured to operatively couple and de-couple process rotor rod 232 to process rotor rod actuator 242 (described below, see FIG. 36, 37, 39).

Figure 16:
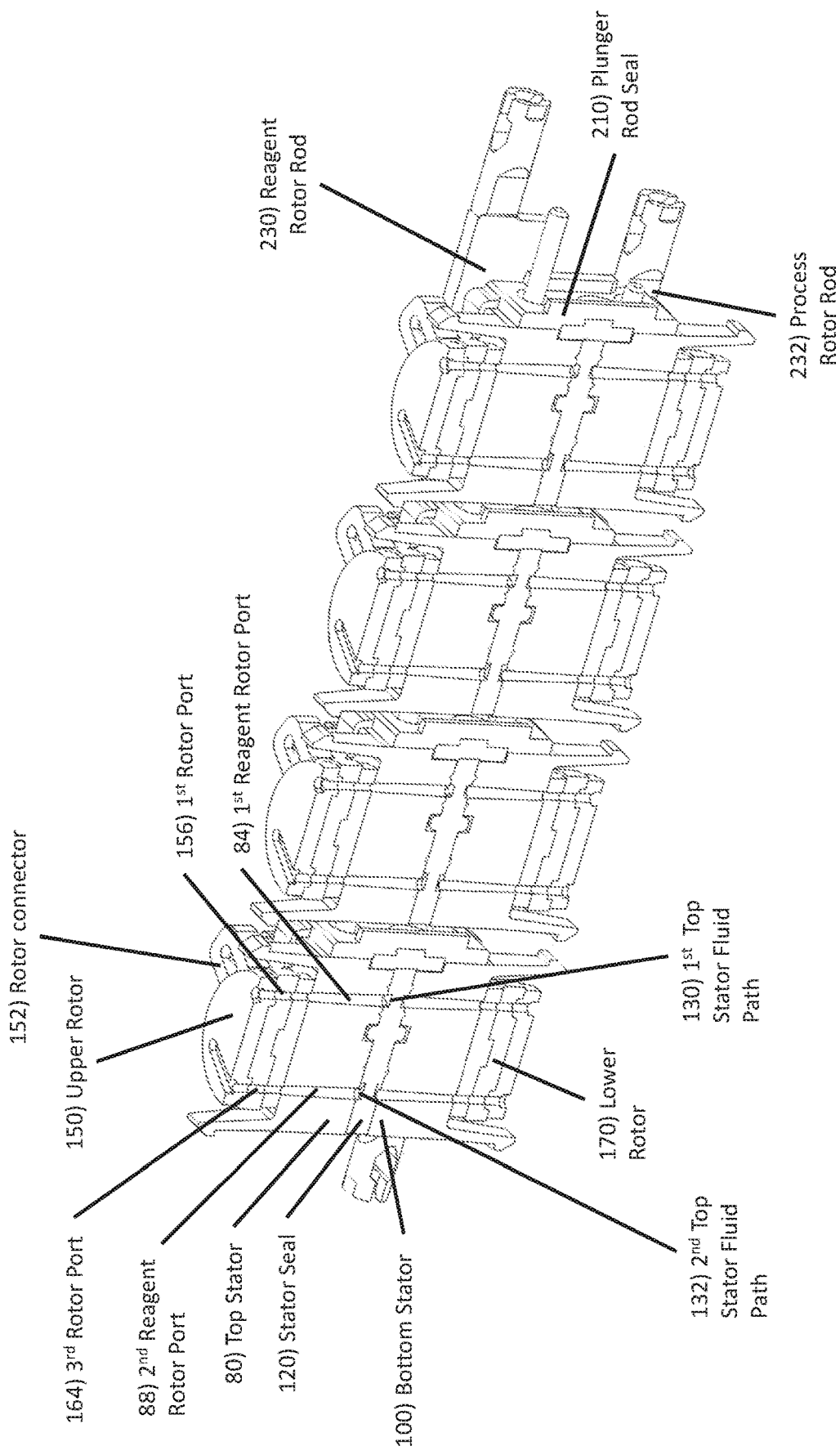
FIG. 16 is a top perspective, cross-sectional view of the pump assemblies along the line C-C in FIG. 15.

FIG. 16 shows a top perspective, cross-sectional view of the pump assemblies in FIG. 15 taken along line C-C in FIG. 15. As shown in FIG. 16, a reagent pump assembly comprising an upper rotor coupled to a top stator provides fluid pathways through the combined upper rotor and top stator via the rotor ports of the upper rotor and the reagent rotor ports of the top stator. For example, FIG. 16 shows that with upper rotor 150 coupled to top stator 80 and positioned in its first position, first rotor port 156 of upper rotor 150 is in fluid communication with first reagent rotor port 84 of top stator 80, which is in further fluid communication with first top stator fluid path 130 of stator seal 120, which connects to first reagent pump chamber 85 via first reagent pump port 86 (see FIG. 8). FIG. 16 also shows that with upper rotor 150 coupled to top stator 80 and positioned in its first position, third rotor port 164 of upper rotor 150 is in fluid communication with second reagent rotor port 88 of stator 80, which is in further fluid communication with second top stator fluid path 132 of stator seal 120, which connects to second reagent pump chamber 89 via second reagent pump port 90 (see FIG. 8).

Figure 17:
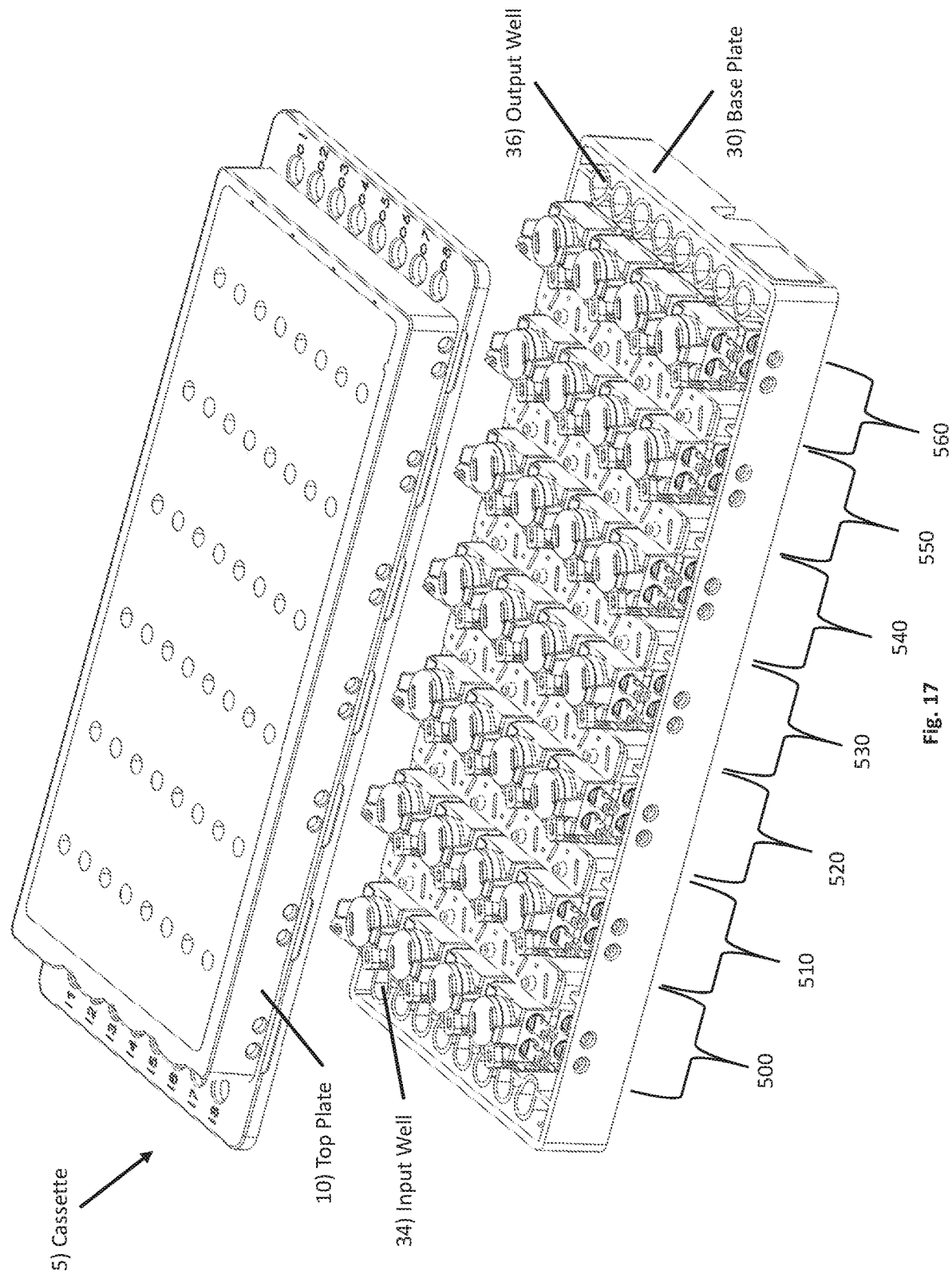
FIG. 17 is an exploded top perspective view of the fluid processing cassette.

FIG. 17 is an exploded top perspective view of the fluid processing cassette that shows the pump assemblies of each of first processing station 500, end processing station 560, and first, second, third, fourth, and fifth intermediate processing stations 510, 520, 530, 540, and 550. As shown in FIG. 17, each processing station comprises the pump assemblies shown in FIG. 15. In end processing station 560, reagent pump assemblies may be non-functional.

Figure 18:
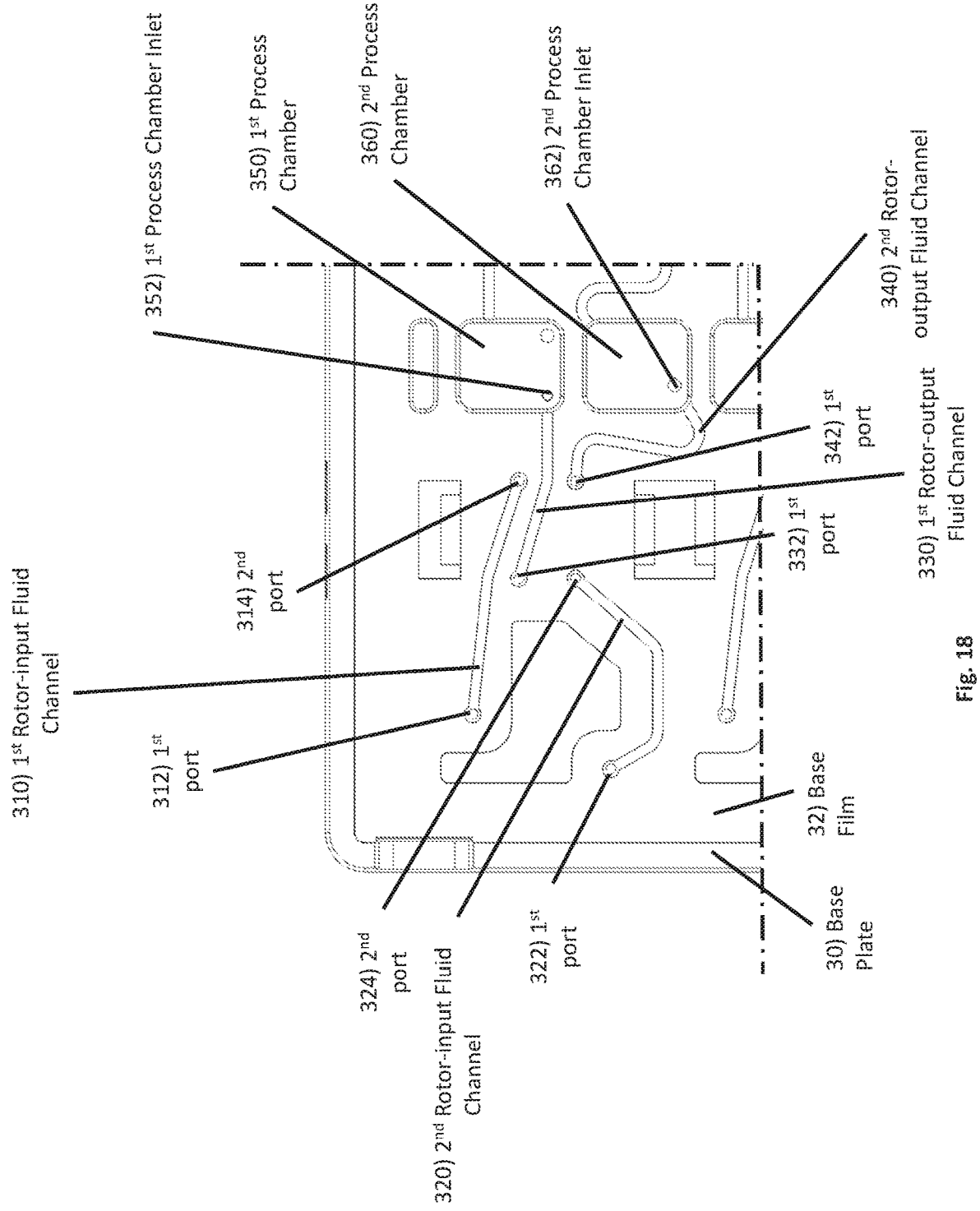
FIG. 18 shows a partial bottom plan view of a base plate, including fluid channels and ports formed in the bottom of base plate.

FIG. 18 shows a partial bottom plan view of base plate 30, including fluid channels and ports formed in the bottom of base plate 30. First rotor-input fluid channel 310 connects first port 312 and second port 314, and second rotor-input fluid channel 320 connects first port 322 to second port 324. First rotor-output fluid channel 330 connects first port 332 to first process chamber 350 via first process chamber inlet 352, and second rotor-output fluid channel 340 connects first port 342 to second process chamber 360 via second process chamber inlet 362. None of first and second rotor-input fluid channels 310, 320 and first and second rotor-output fluid channels 330, 340 are connected or in direct fluid communication with each other. First rotor-input fluid channel 310, first rotor-output fluid channel 330, and first process chamber 350 are all associated with the same fluid channel. Second rotor-input fluid channel 320, second rotor-output fluid channel 340, and second process chamber 360 are all associated with a different fluid channel. These channels, ports, inlets, and process chambers formed in the bottom of base plate 30 are sealed by base film 32, which is disposed onto a portion of the bottom of base plate 30.

FIGS. 19-20 and 25-26 are similar to FIG. 18 and additionally show lower rotor 170, specifically the bottom surface of lower rotor 170 that is disposed above the bottom surface of base plate 30.

Figure 19:
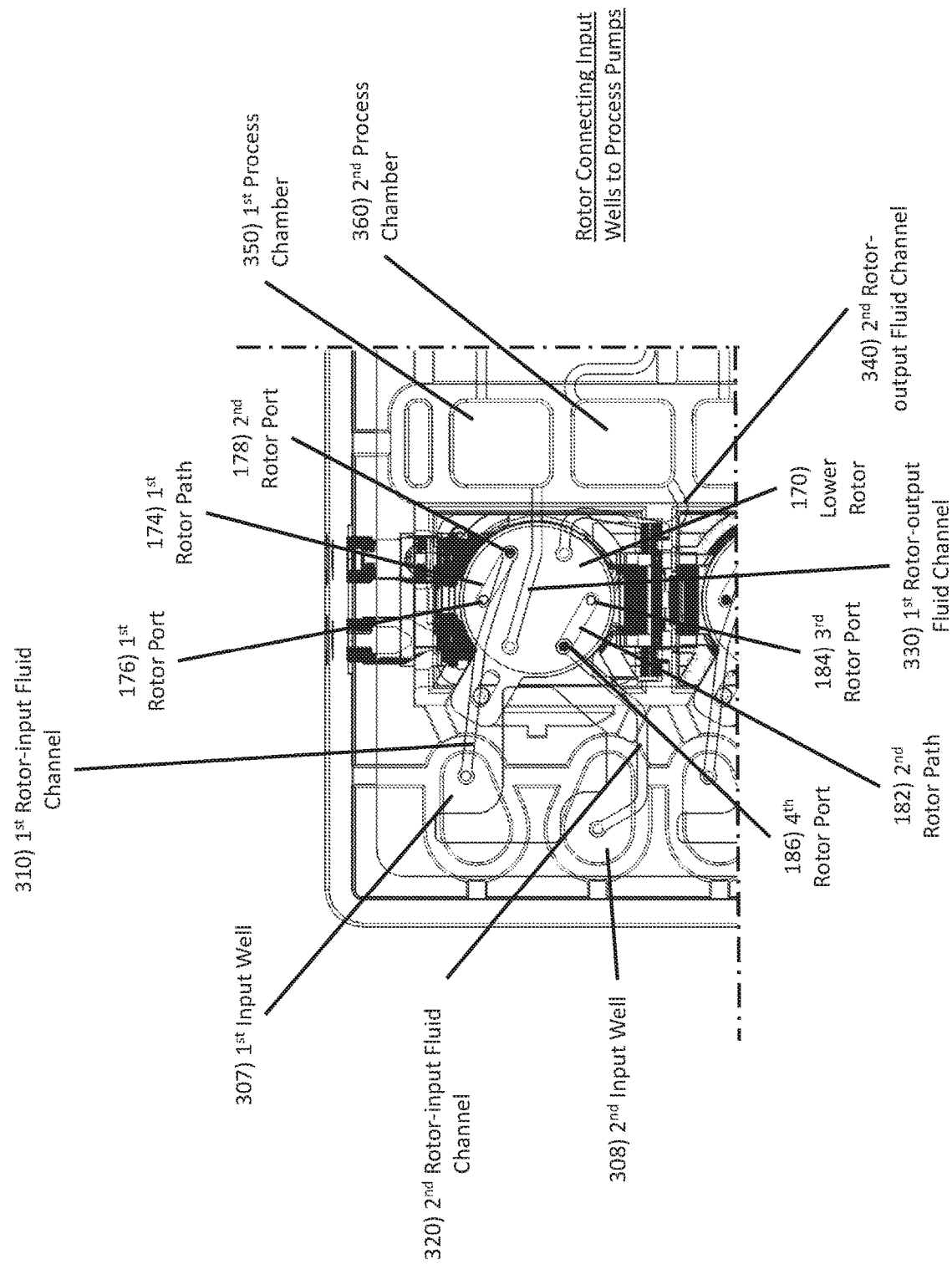
FIG. 19 shows a partial bottom plan view of a base plate with the base plate film removed and with the lower rotor in a first position.
Figure 20:
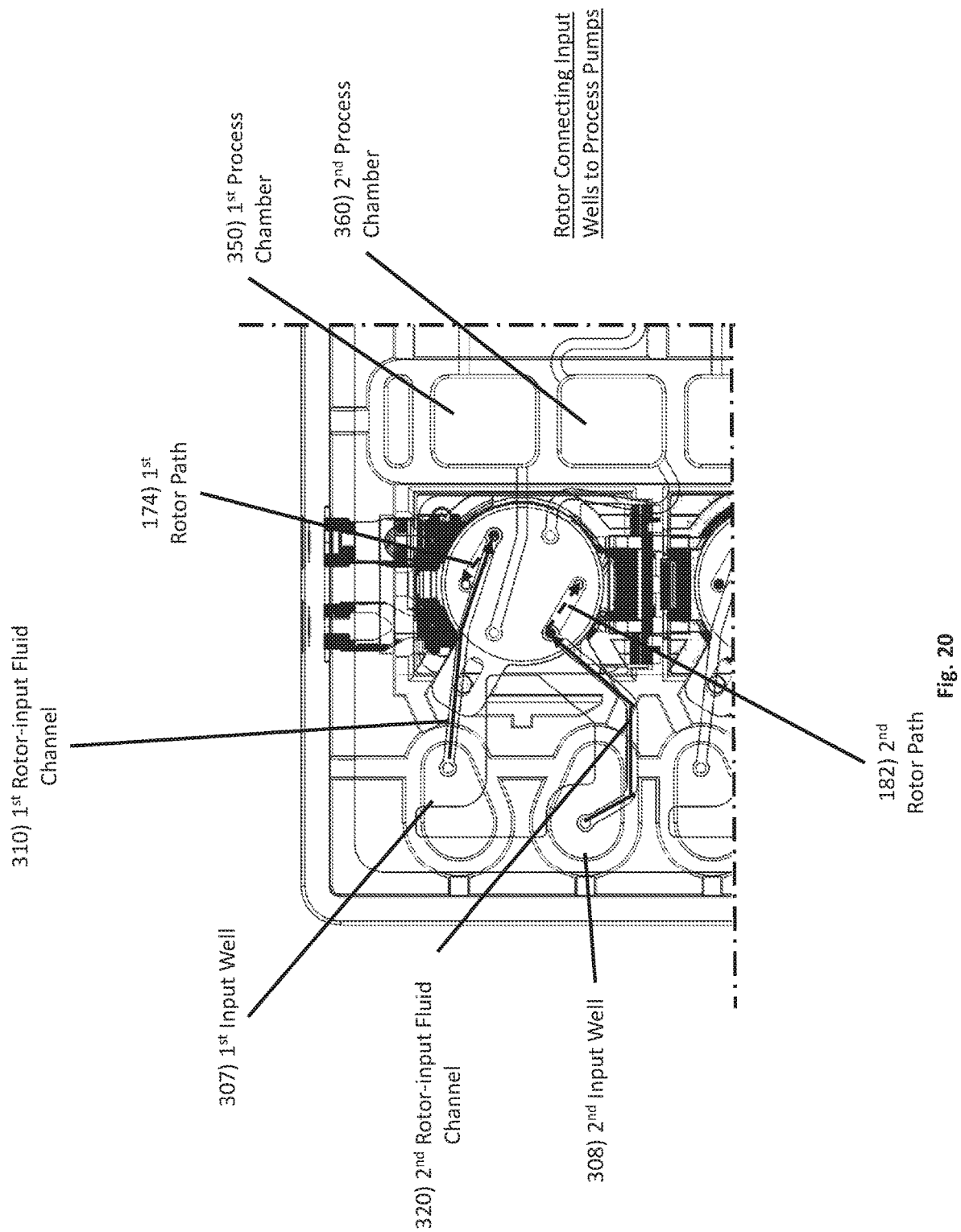
FIG. 20 shows a partial bottom plan view of a base plate with the base plate film removed and the lower rotor in the first position and showing fluid movement by solid fluid path arrows and dashed fluid path arrows.

In FIGS. 19-22, lower rotor 170 is in its first position, which fluidly connects process pump chambers defined by the bottom stator 100 to which lower rotor 170 is coupled to upstream portions of the associated fluid channels. Since the processing station shown in FIGS. 19 and 20 is the first processing station 500 of cassette 5, the upstream portions of the associated fluid channels comprise input wells, specifically first input well 307 and second input well 308, rather than process chambers of a preceding processing station.

Figure 21:
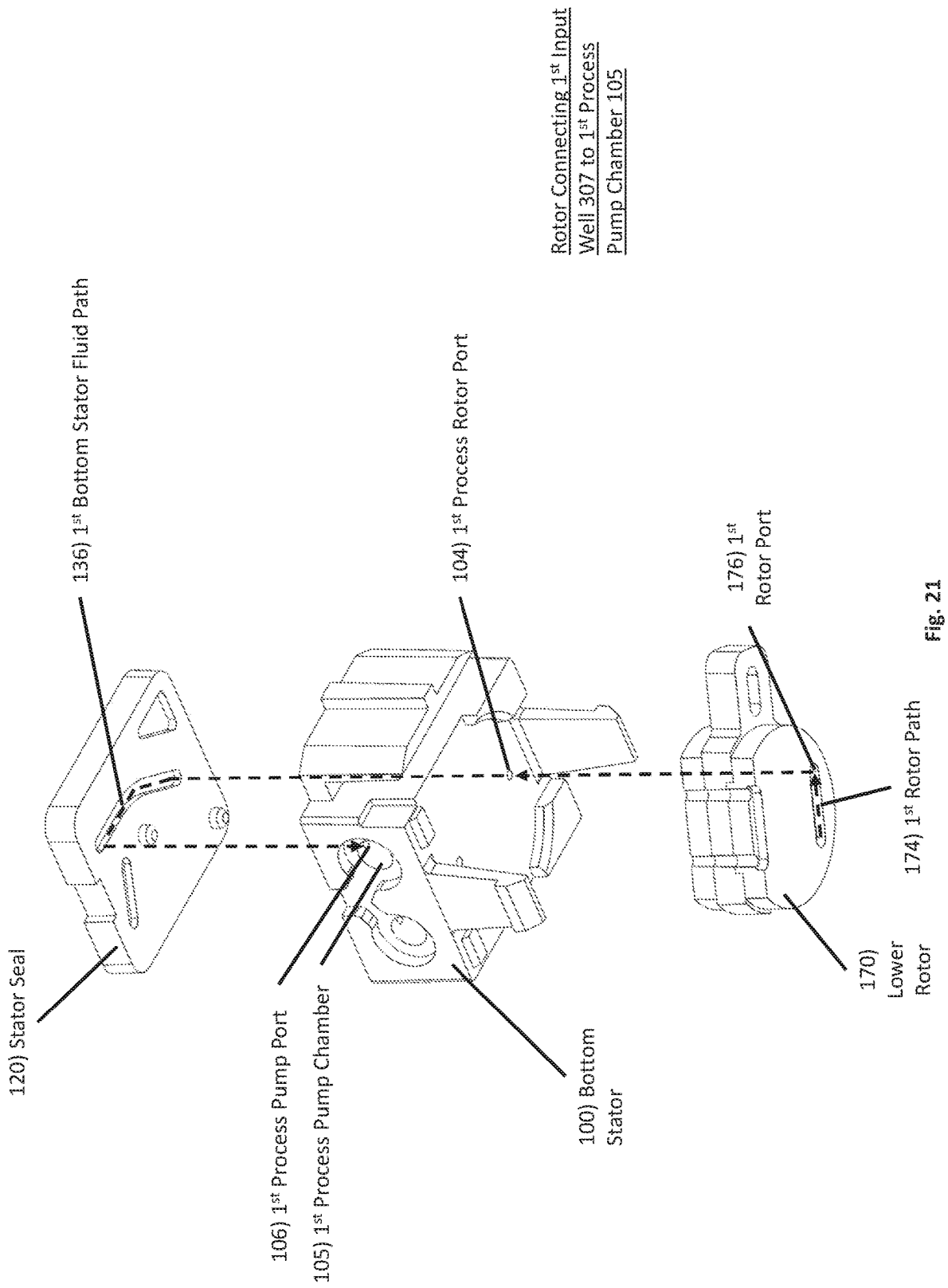
FIGS. 21-24 are exploded bottom perspective views of a bottom stator and rotor assembly of the fluid processing cassette showing different fluid movement paths through the bottom stator and the rotor assembly.

As shown by FIGS. 18-20, first input well 307 is in fluid communication with first port 312 of first rotor-input fluid channel 310, of which the second port 314 is in fluid communication with the second rotor port 178 of lower rotor 170. Thus, a fluid can move from first input well 307 to second rotor port 178 of lower rotor 170 via first rotor-input fluid channel 310, as shown by a solid fluid path arrow in FIG. 20. The fluid can then move from second rotor port 178 to first rotor port 176 via first rotor path 174 of lower rotor 170, as shown by a dashed fluid path arrow in FIG. 20. Dashed fluid path arrows in FIG. 21 show that the fluid can then move up through first rotor port 176, then through first process rotor port 104 of bottom stator 100, then along first bottom stator fluid path 136 of stator seal 120, and then through first process pump port 106 into first process pump chamber 105 of bottom stator 100. Therefore, when lower rotor 170 is in its first position, fluid can be moved along a first fluid channel from first input well 307 to first process pump chamber 105 by the process pump assembly associated with the first fluid channel. Also, when lower rotor 170 is in its first position, fluid (e.g., waste) can alternatively be moved via the same path but in a reverse direction along the first fluid channel from first process pump chamber 105 to first input well 307 by the process pump assembly associated with the first fluid channel.

Figure 22:
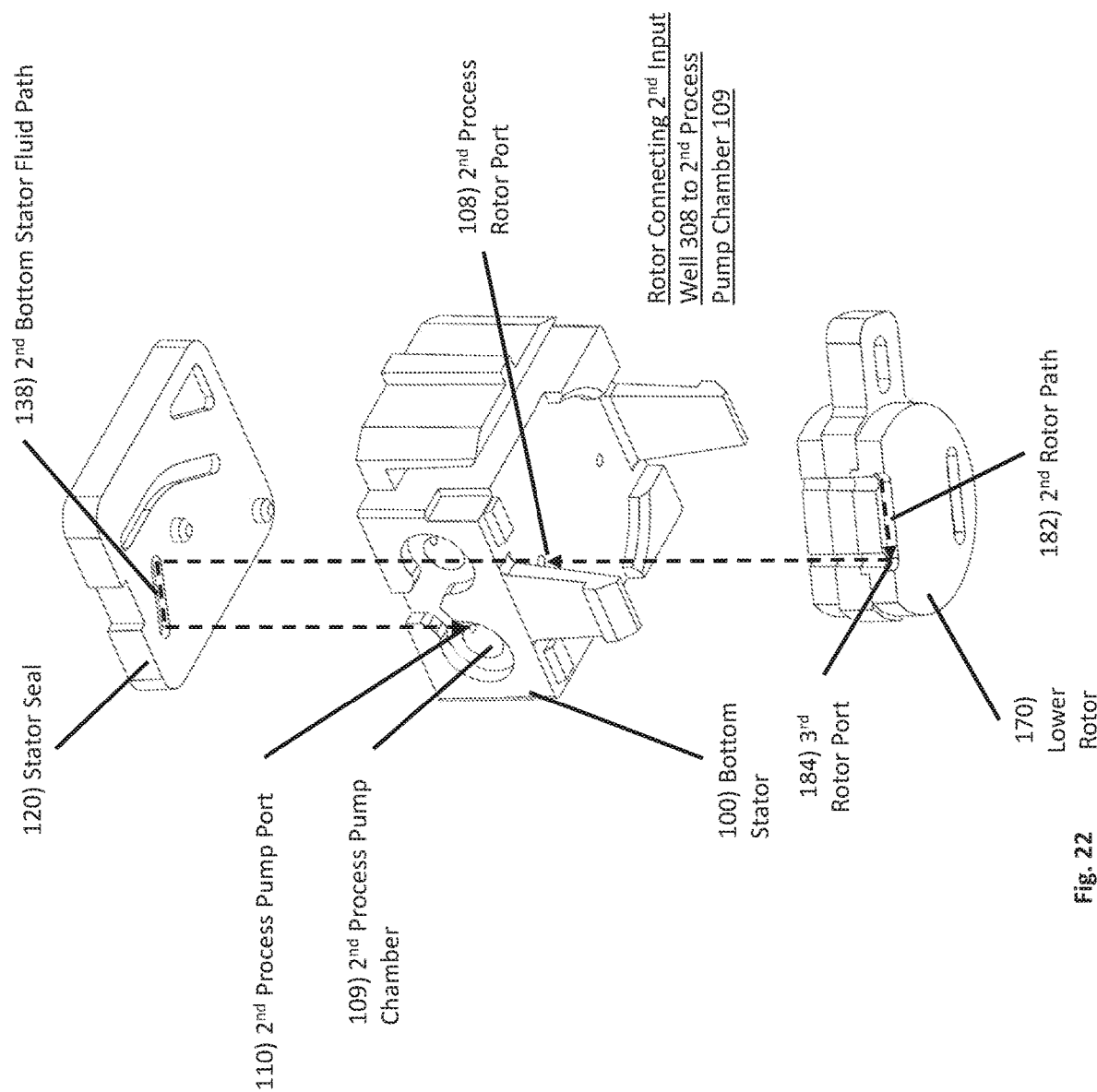

As shown in FIGS. 18-20, second input well 308 is in fluid communication with first port 322 of second rotor-input fluid channel 320, of which the second port 324 is in fluid communication with a fourth rotor port 186 of lower rotor 170. Thus, a fluid can move from second input well 308 to fourth rotor port 186 of lower rotor 170 via second rotor-input fluid channel 320, as shown by a solid fluid path arrow in FIG. 20. The fluid can then move from fourth rotor port 186 to third rotor port 184 via second rotor path 182 of lower rotor 170, as shown by a dashed fluid path arrow in FIG. 20. Dashed fluid path arrows in FIG. 22 show that the fluid can then move up through third rotor port 184, then through second process rotor port 108 of bottom stator 100, then along second bottom stator fluid path 138 of stator seal 120, and then through second process pump port 110 into second process pump chamber 109 of bottom stator 100. Therefore, when lower rotor 170 is in its first position, fluid can be moved along a second fluid channel from second input well 308 to second process pump chamber 109 by the process pump assembly associated with the second fluid channel. Also, when lower rotor 170 is in its first position, fluid (e.g., waste) can alternatively be moved via the same path but in a reverse direction along the second fluid channel from second process pump chamber 109 to second input well 308 by the process pump assembly associated with the second fluid channel.

In FIGS. 23-26, lower rotor 170 is in its second position, which fluidly connects process pump chambers defined by the bottom stator 100 to which lower rotor 170 is coupled to downstream portions of the associated fluid channels, specifically first process chamber 350 and second process chamber 360.

Figure 23:
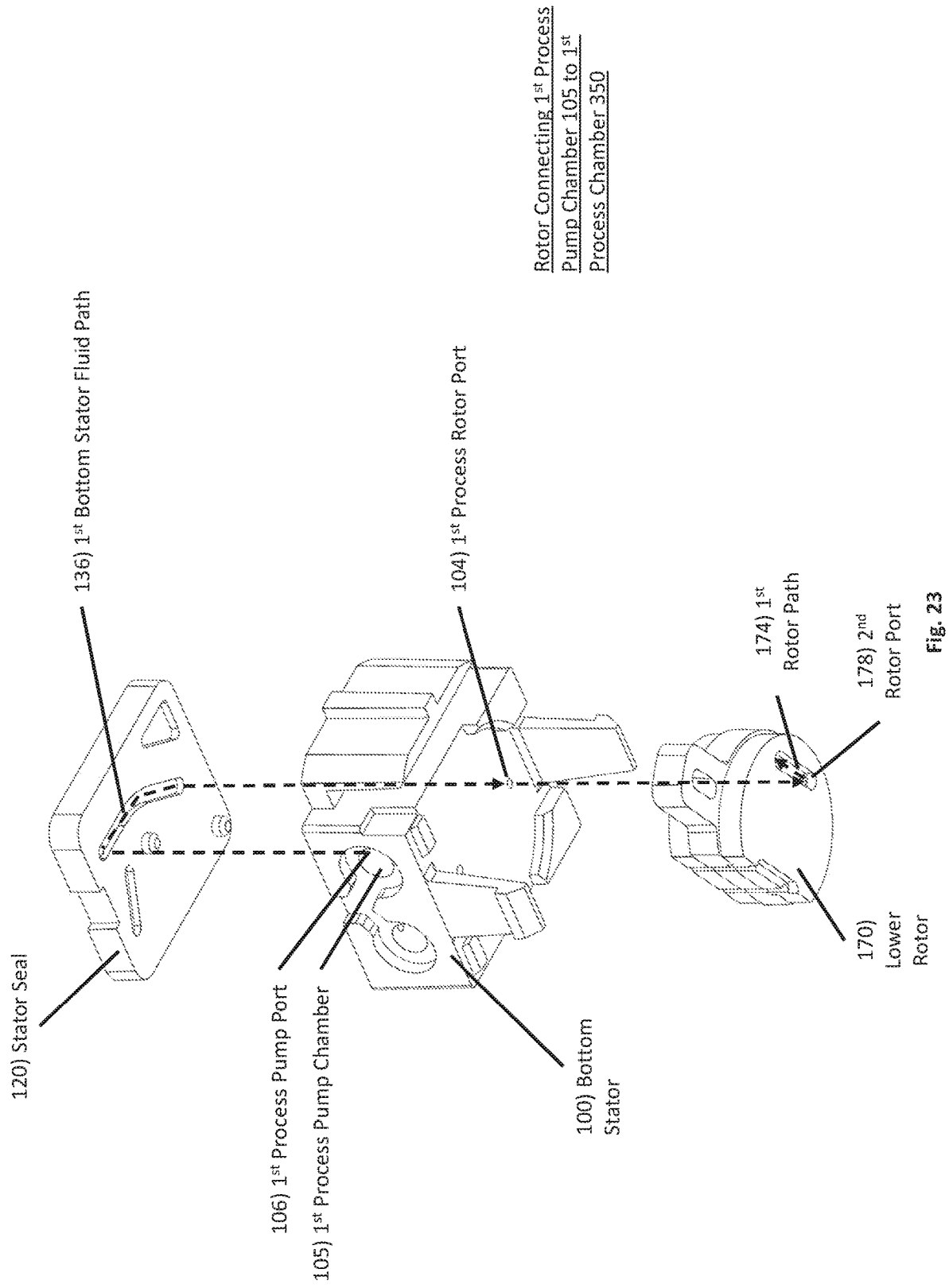
Figure 25:
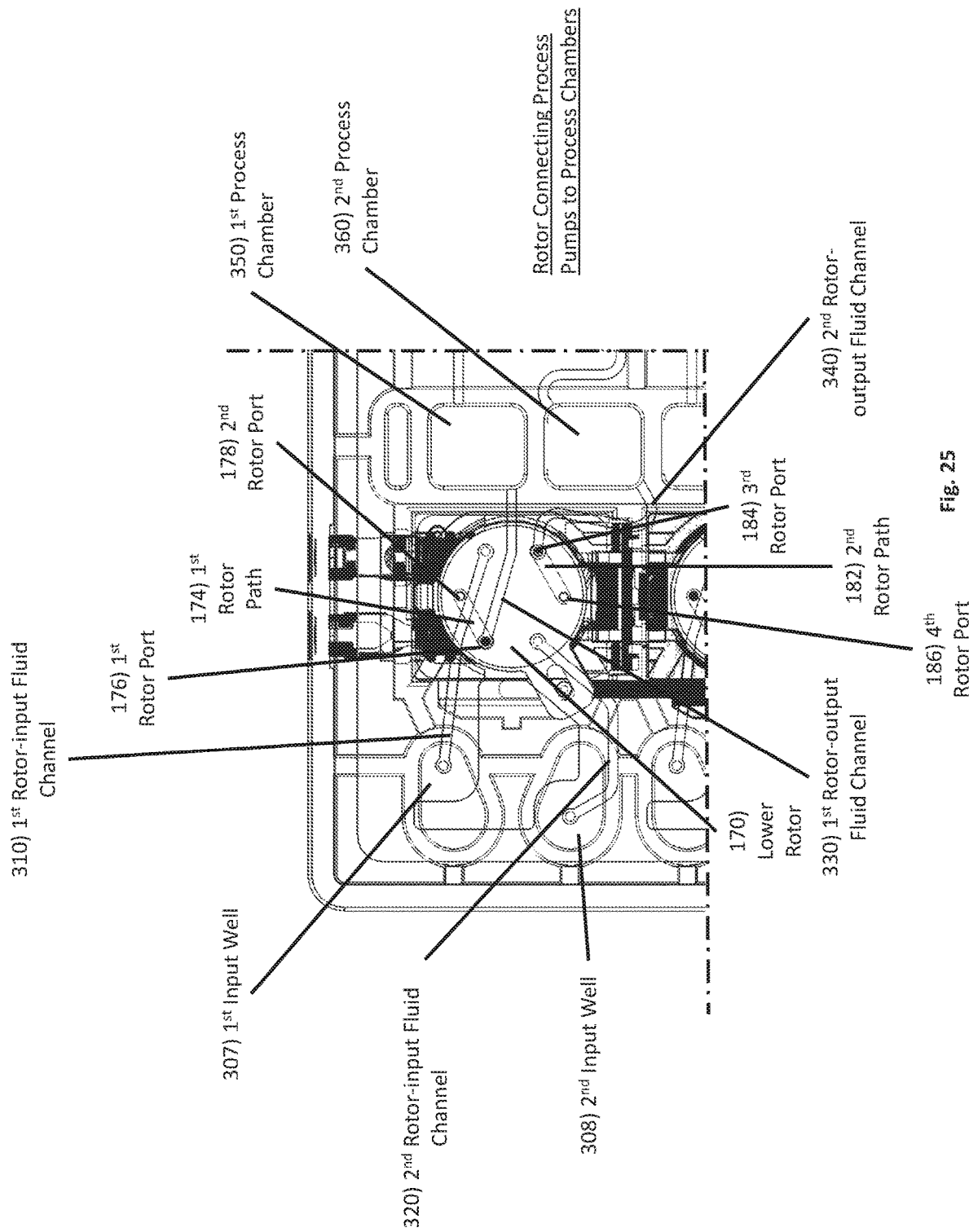
FIG. 25 shows a partial bottom plan view of a base plate with the base plate film removed and with the lower rotor in a second position.
Figure 26:
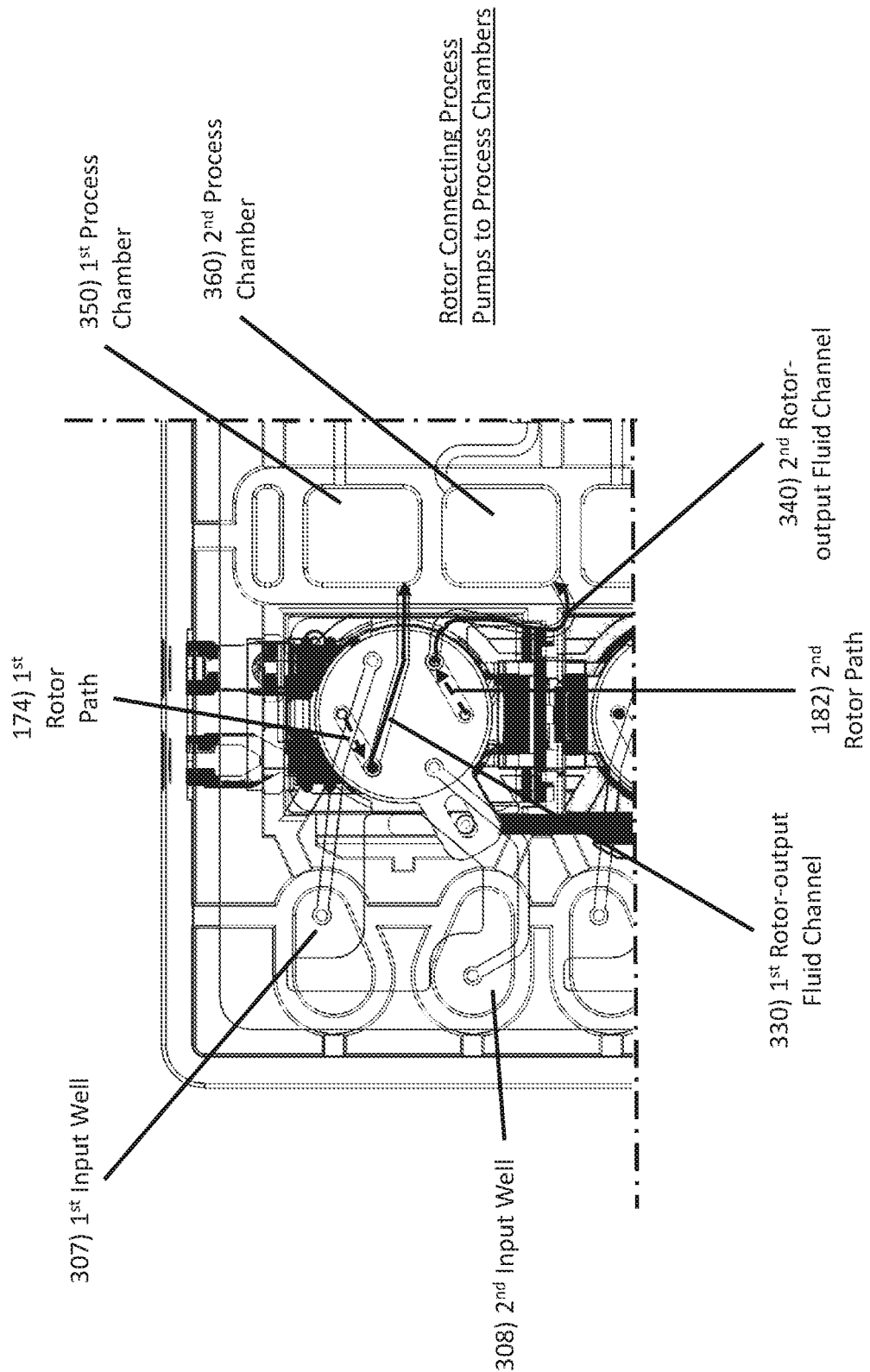
FIG. 26 shows a partial bottom plan view of a base plate with the base plate film removed and the lower rotor in the second position and showing fluid movement by solid fluid path arrows and dashed fluid path arrows.

Dashed fluid path arrows in FIG. 23 show that a fluid in first process pump chamber 105 of bottom stator 100 can move through first process pump port 106, then along first bottom stator fluid path 136 of stator seal 120, then through first process rotor port 104 of bottom stator 100, and then through second rotor port 178 of lower rotor 170. As shown by FIGS. 25-26, the fluid can then move from second rotor port 178 to first rotor port 176 via first rotor path 174 of lower rotor 170, as shown by a dashed fluid path arrow in FIG. 26. As further shown by FIGS. 18 and 25-26, first rotor port 176 is in fluid communication with first port 332 of first rotor-output fluid channel 330, of which the first process chamber inlet 352 is in fluid communication with the first process chamber 350. Thus, the fluid can move from first rotor port 176 of lower rotor 170 to first process chamber 350 via first rotor-output fluid channel 330, as shown by a solid fluid path arrow in FIG. 26. Therefore, when lower rotor 170 is in its second position, fluid can be moved along the first fluid channel from first process pump chamber 105 to first process chamber 350 by the process pump assembly associated with the first fluid channel. Also, when lower rotor 170 is in its second position, fluid (e.g., waste) can alternatively be moved via the same path but in a reverse direction along the first fluid channel from first process chamber 350 to first process pump chamber 105 by the process pump assembly associated with the first fluid channel.

Figure 24:
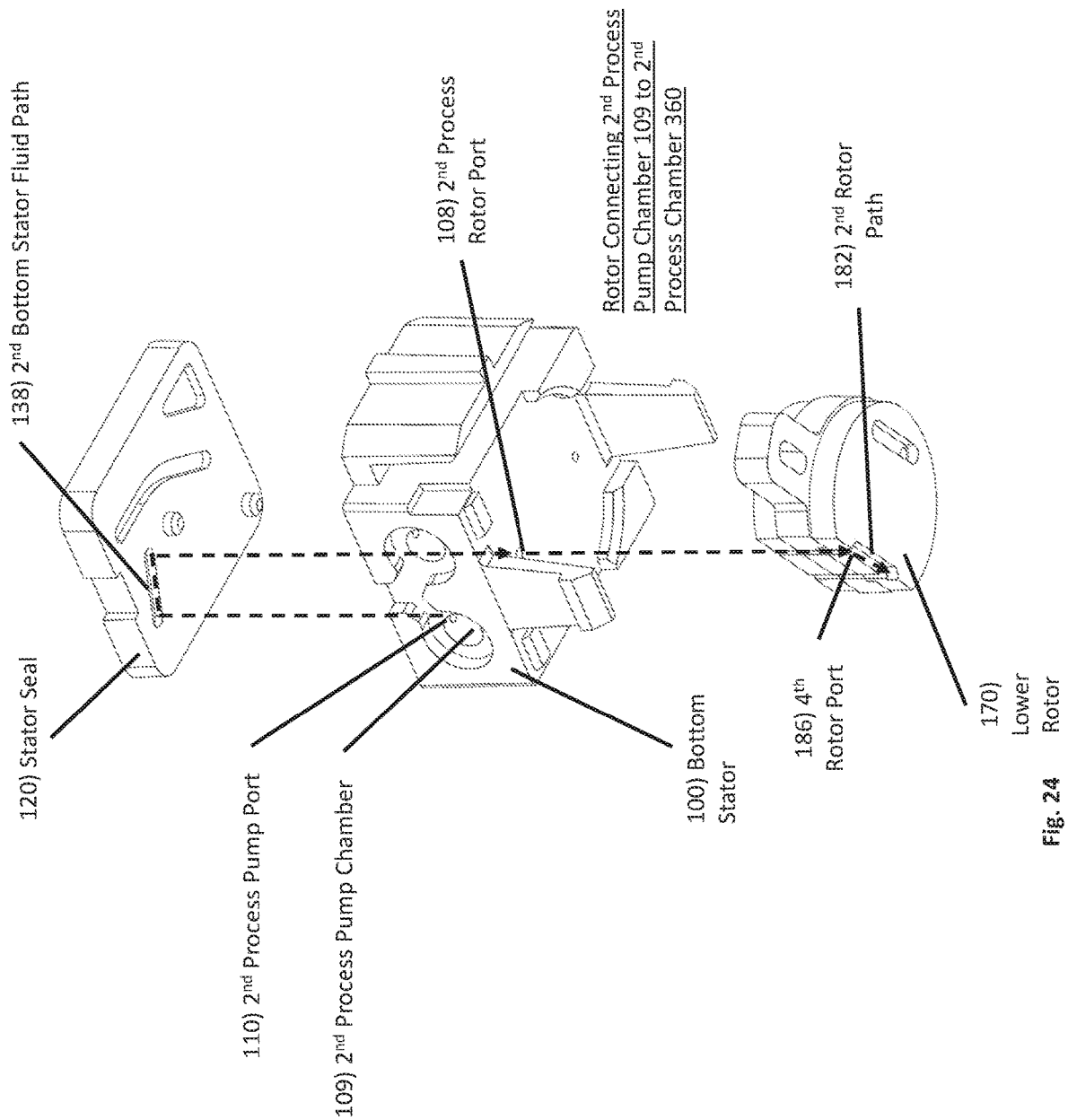

Dashed fluid path arrows in FIG. 24 show that a fluid in second process pump chamber 109 of bottom stator 100 can move through second process pump port 110, then along second bottom stator fluid path 138 of stator seal 120, then through second process rotor port 108 of bottom stator 100, and then through fourth rotor port 186 of lower rotor 170. As shown by FIGS. 25-26, the fluid can then move from fourth rotor port 186 to third rotor port 184 via second rotor path 182 of lower rotor 170, as shown by a dashed fluid path arrow in FIG. 26. As further shown by FIGS. 18 and 25-26, third rotor port 184 is in fluid communication with first port 342 of second rotor-output fluid channel 340, of which the second process chamber inlet 362 is in fluid communication with the second process chamber 360. Thus, the fluid can move from third rotor port 184 of lower rotor 170 to second process chamber 360 via second rotor-output fluid channel 340, as shown by a solid fluid path arrow in FIG. 26. Therefore, when lower rotor 170 is in its second position, fluid can be moved along the second fluid channel from second process pump chamber 109 to second process chamber 360 by the process pump assembly associated with the second fluid channel. Also, when lower rotor 170 is in its second position, fluid (e.g., waste) can alternatively be moved via the same path but in a reverse direction along the second fluid channel from second process chamber 360 to second process pump chamber 109 by the process pump assembly associated with the second fluid channel.

Figure 27:
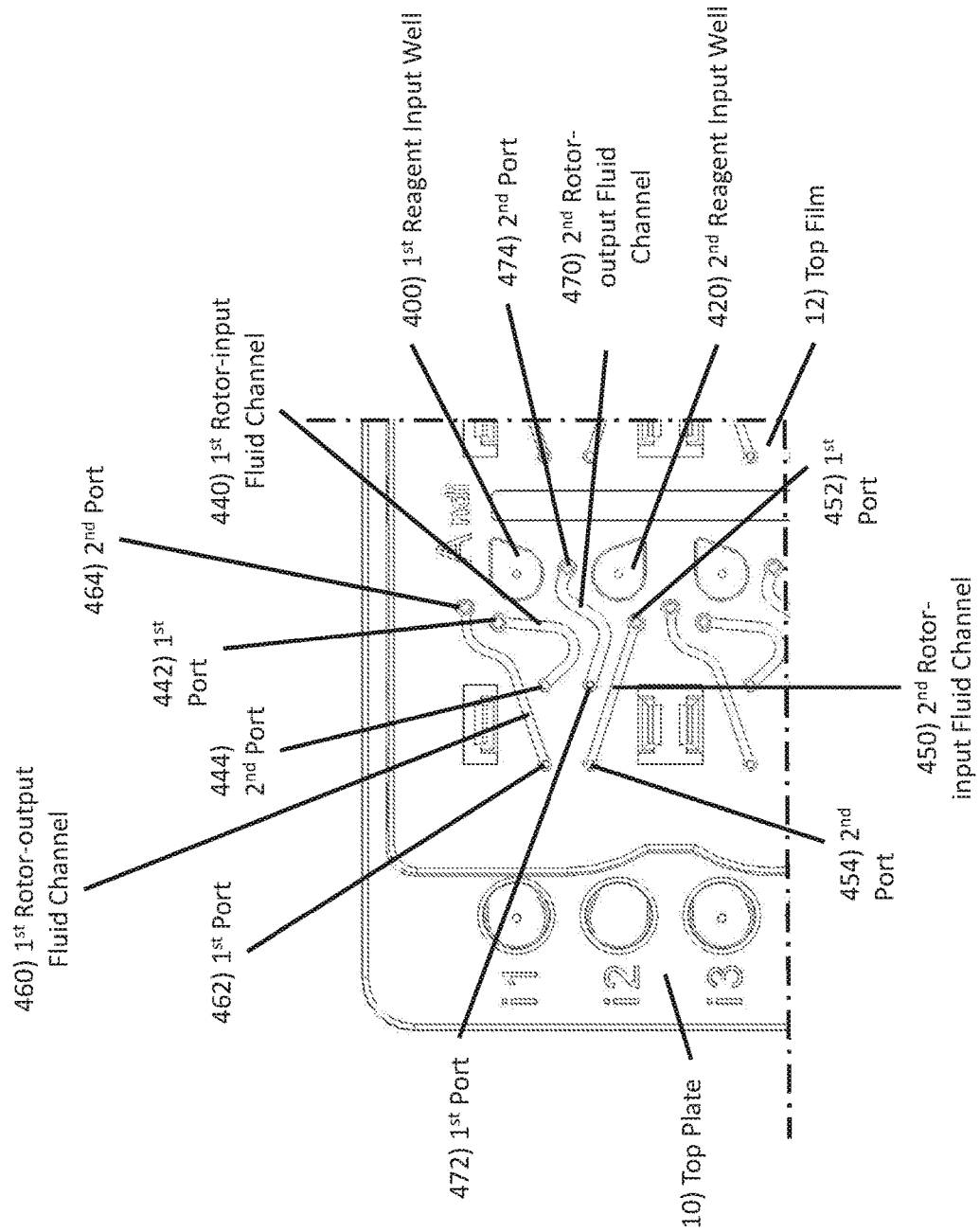
FIG. 27 shows a partial top plan view of top plate, including fluid channels and ports formed on the top of top plate

FIG. 27 shows a partial top plan view of top plate 10, including fluid channels and ports formed on the top of top plate 10. First rotor-input fluid channel 440 connects first port 442 and second port 444, and second rotor-input fluid channel 450 connects first port 452 and second port 454. First rotor-output fluid channel 460 connects first port 462 to second port 464, and second rotor-output fluid channel 470 connects first port 472 to second port 474. None of the first and second rotor-input fluid channels 440, 450 and first and second rotor-output fluid channels 460, 470 are connected or in direct fluid communication with each other. First reagent input well 400, first rotor-input fluid channel 440, and first rotor-output fluid channel 460 are all associated with the same fluid channel. Second reagent input well 420, second rotor-input fluid channel 450, and second rotor-output fluid channel 470 are all associated with a different fluid channel. These channels and ports formed in the top of top plate 10 are sealed by top film 12, which is disposed onto a portion of the top of top plate 10.

FIGS. 28-29 and 34-35 are similar to FIG. 27 and additionally show upper rotor 150, specifically the top surface of upper rotor 150 that is disposed below the top surface of top plate 10, and gasket 403, which is disposed below a portion of the top plate 10 containing first and second reagent input wells 400, 420.

In FIGS. 28-31, upper rotor 150 is in its first position, which fluidly connects reagent pump chambers defined by the top stator 80 to which upper rotor 150 is coupled to reagent input wells of the associated fluid channels, specifically first reagent input well 400 and second reagent input well 420.

Figure 28:
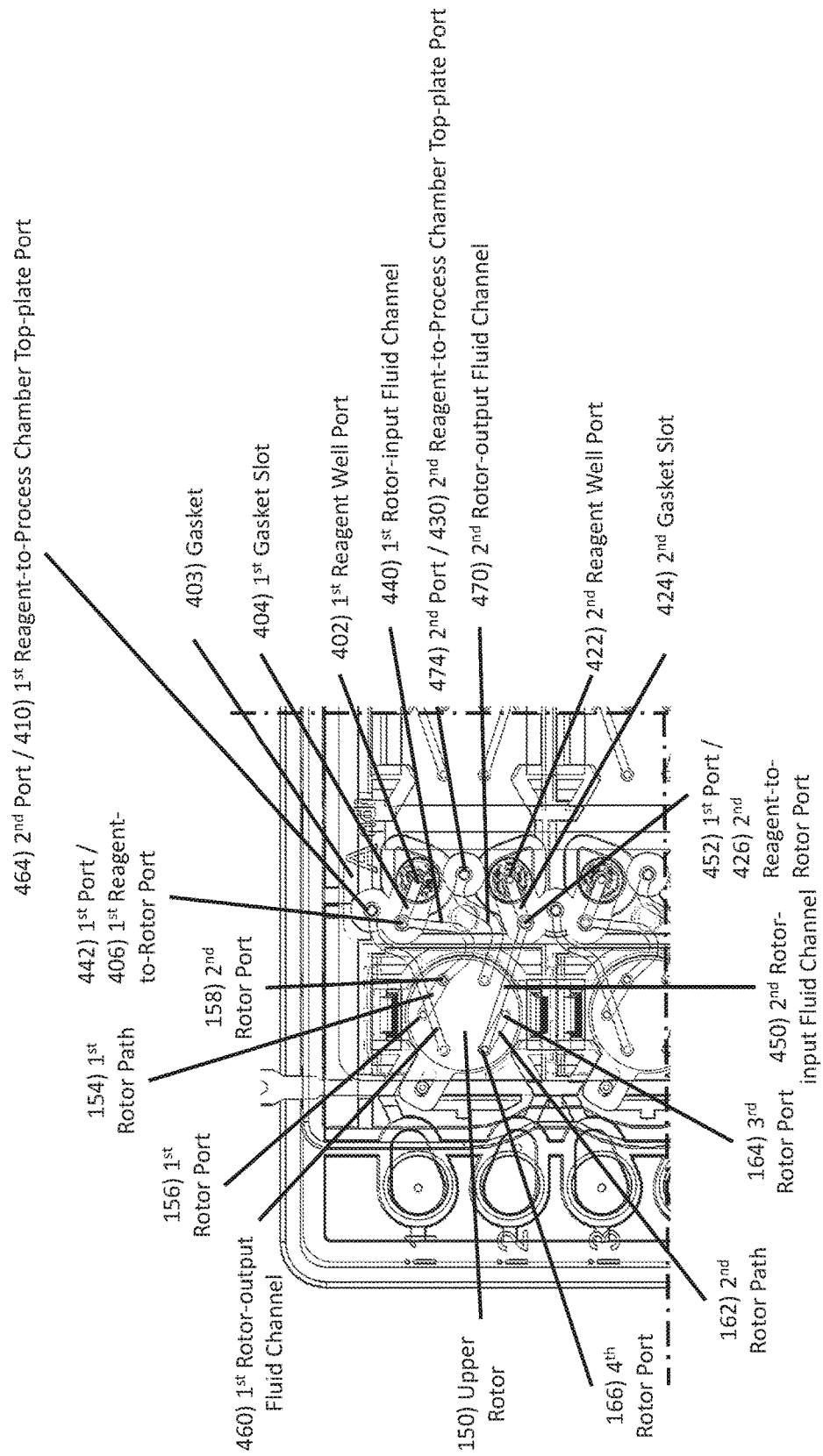
FIG. 28 shows a partial top plan view of top plate, including fluid channels and ports formed on the top of top plate with the top film removed and with the upper rotor in a first position.
Figure 29:
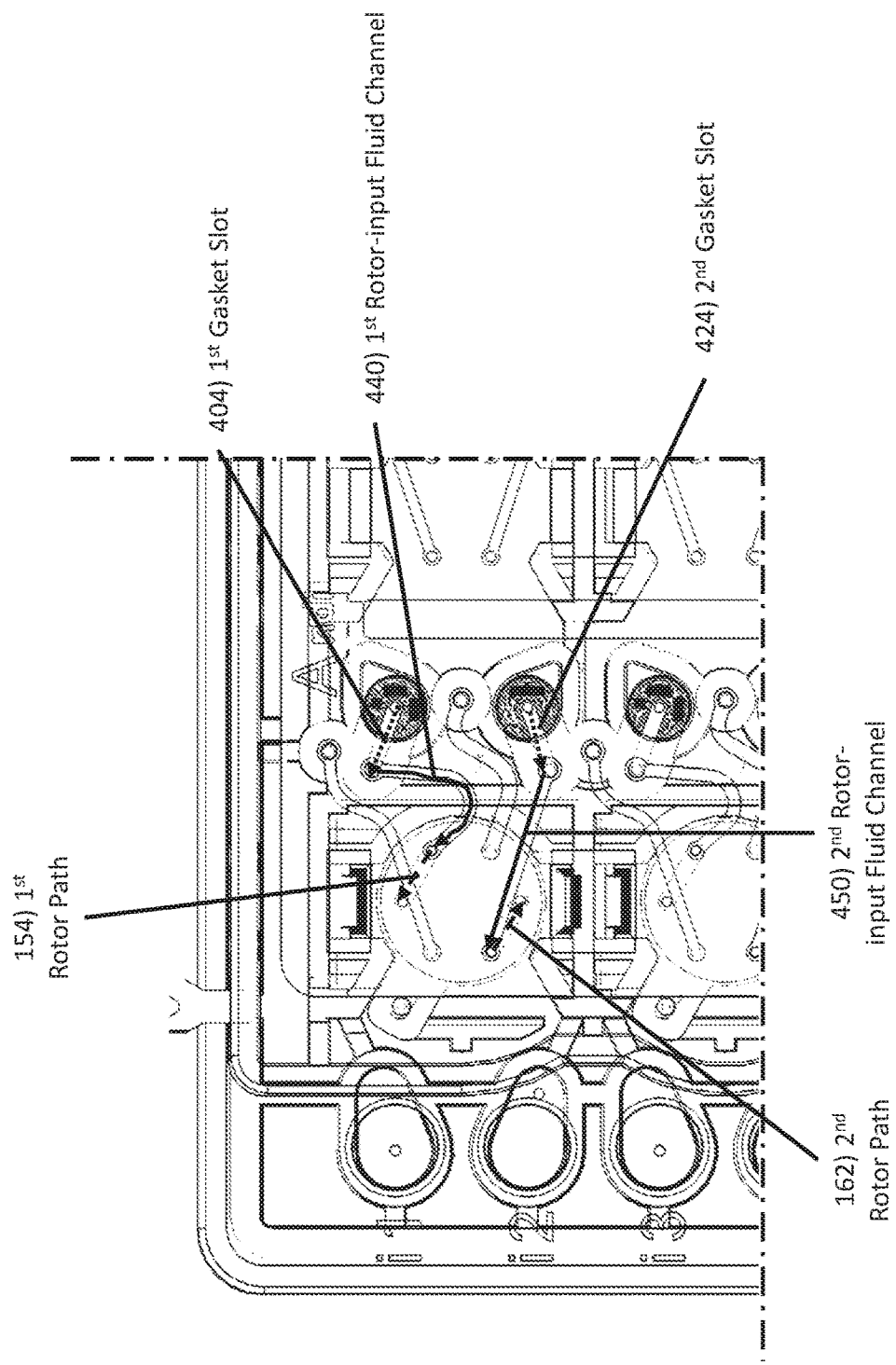
FIG. 29 shows a partial top plan view of top plate, including fluid channels and ports formed on the top of top plate with the top film removed and with the upper rotor in the first position and showing fluid movement by solid fluid path arrows, dashed fluid path arrows, and dotted fluid path arrows.
Figure 30:
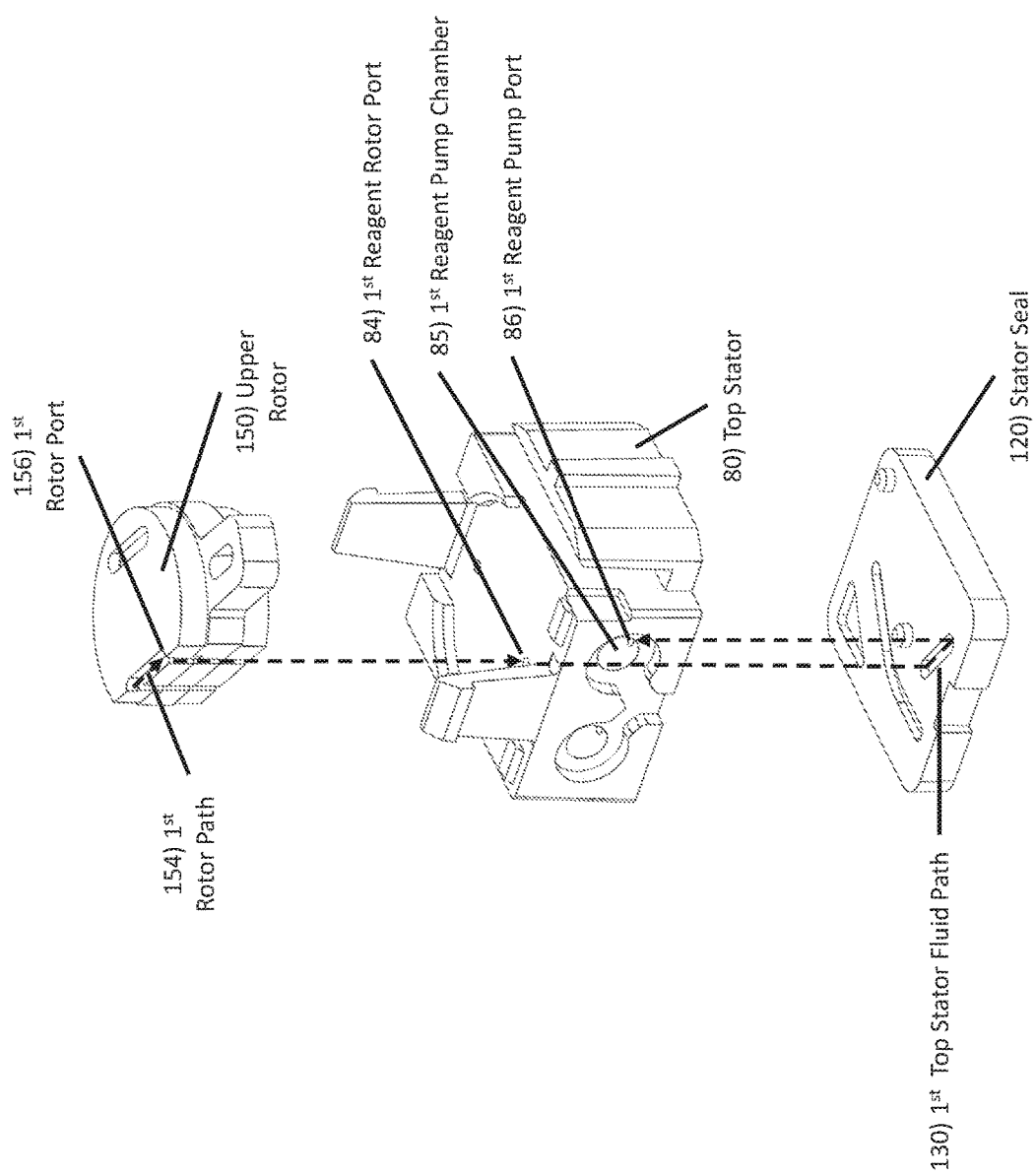
FIGS. 30-33 are exploded top perspective views of a top stator and rotor assembly of the fluid processing cassette showing different fluid movement paths through the top stator and the rotor assembly.

As shown by FIGS. 27-29, first reagent input well 400 is in fluid communication with first gasket slot 404 of gasket 403 via first reagent well port 402, and first gasket slot 404 is in fluid communication with first reagent-to-rotor port 406. Thus, a fluid can move from first reagent input well 400 to first reagent-to-rotor port 406 via first gasket slot 404, as shown by a dotted fluid path arrow in FIG. 29. The fluid can then move up through first reagent-to-rotor port 406 to first port 442 of first rotor-input fluid channel 440, of which the second port 444 is in fluid communication with the second rotor port 158 of upper rotor 150. Thus, a fluid can move from first reagent-to-rotor port 406 to second rotor port 158 of upper rotor 150 via first rotor-input fluid channel 440, as shown by a solid fluid path arrow in FIG. 29. The fluid can then move from second rotor port 158 to first rotor port 156 via first rotor path 154 of upper rotor 150, as shown by a dashed fluid path arrow in FIG. 29. Dashed fluid path arrows in FIG. 30 show that the fluid can then move down through first rotor port 156, then through first reagent rotor port 84 of top stator 80, then along first top stator fluid path 130 of stator seal 120, and then through first reagent pump port 86 into first reagent pump chamber 85 of top stator 80. Therefore, when upper rotor 150 is in its first position, fluid can be moved along a first fluid channel from first reagent input well 400 to first reagent pump chamber 85 by the process pump assembly associated with the first fluid channel.

Figure 31:
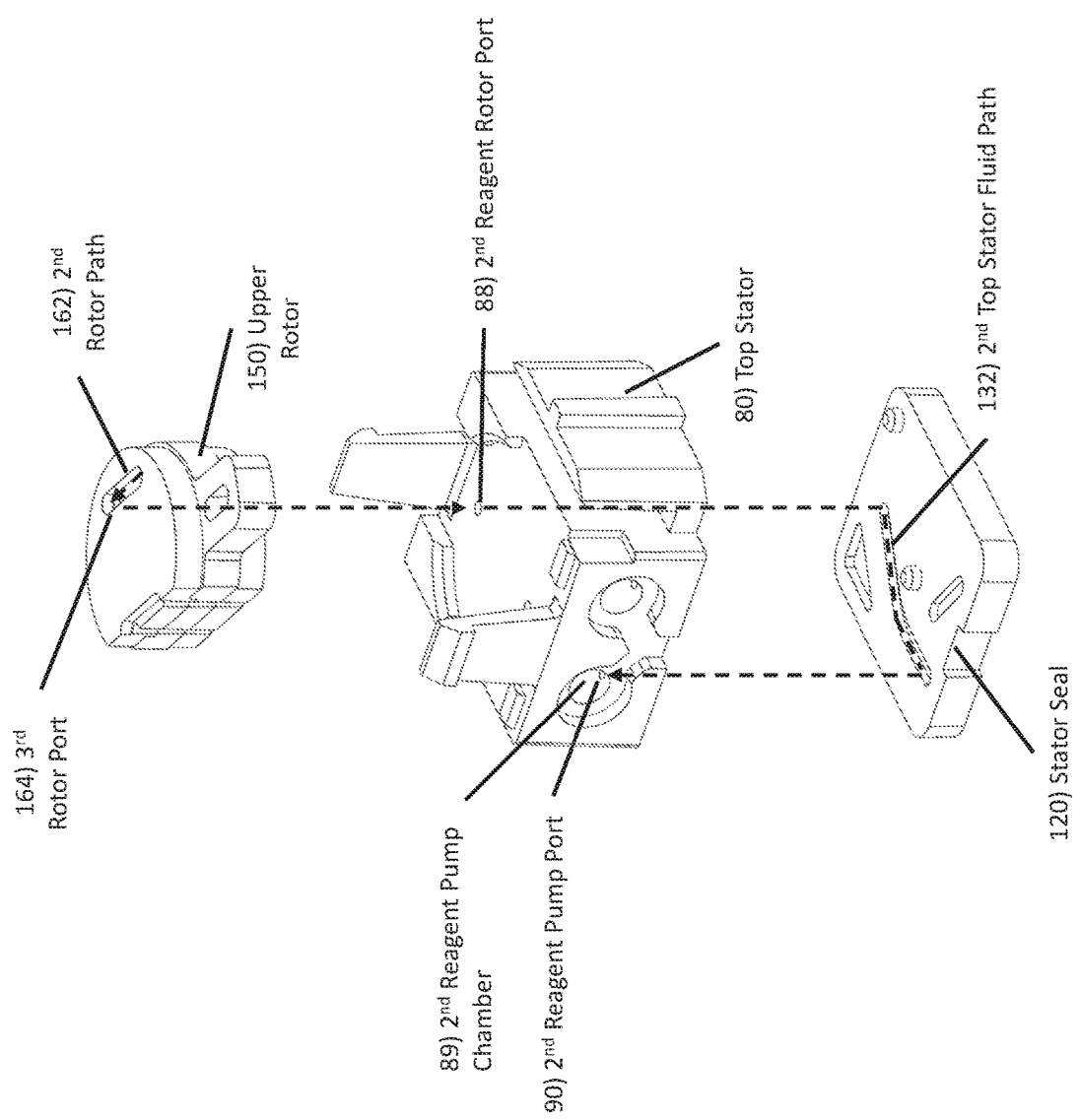

As shown by FIGS. 27-29, second reagent input well 420 is in fluid communication with second gasket slot 424 of gasket 403 via second reagent well port 422, and second gasket slot 424 is in fluid communication with second reagent-to-rotor port 426. Thus, a fluid can move from second reagent input well 420 to second reagent-to-rotor port 426 via second gasket slot 424, as shown by a dotted fluid path arrow in FIG. 29. The fluid can then move up through second reagent-to-rotor port 426 to first port 452 of second rotor-input fluid channel 450, of which the second port 454 is in fluid communication with the fourth rotor port 166 of upper rotor 150. Thus, a fluid can move from second reagent-to-rotor port 426 to fourth rotor port 166 of upper rotor 150 via second rotor-input fluid channel 450, as shown by a solid fluid path arrow in FIG. 29. The fluid can then move from fourth rotor port 166 to third rotor port 164 via second rotor path 162 of upper rotor 150, as shown by a dashed fluid path arrow in FIG. 29. Dashed fluid path arrows in FIG. 31 show that the fluid can then move down through third rotor port 164, then through second reagent rotor port 88 of top stator 80, then along second top stator fluid path 132 of stator seal 120, and then through second reagent pump port 90 into second reagent pump chamber 89 of top stator 80. Therefore, when upper rotor 150 is in its first position, fluid can be moved along a second fluid channel from second reagent input well 420 to second reagent pump chamber 89 by the process pump assembly associated with the second fluid channel.

In FIGS. 32-35, upper rotor 150 is in its second position, which fluidly connects reagent pump chambers defined by the top stator 80 to which upper rotor 150 is coupled to associated process chambers in the same processing station.

Figure 32:
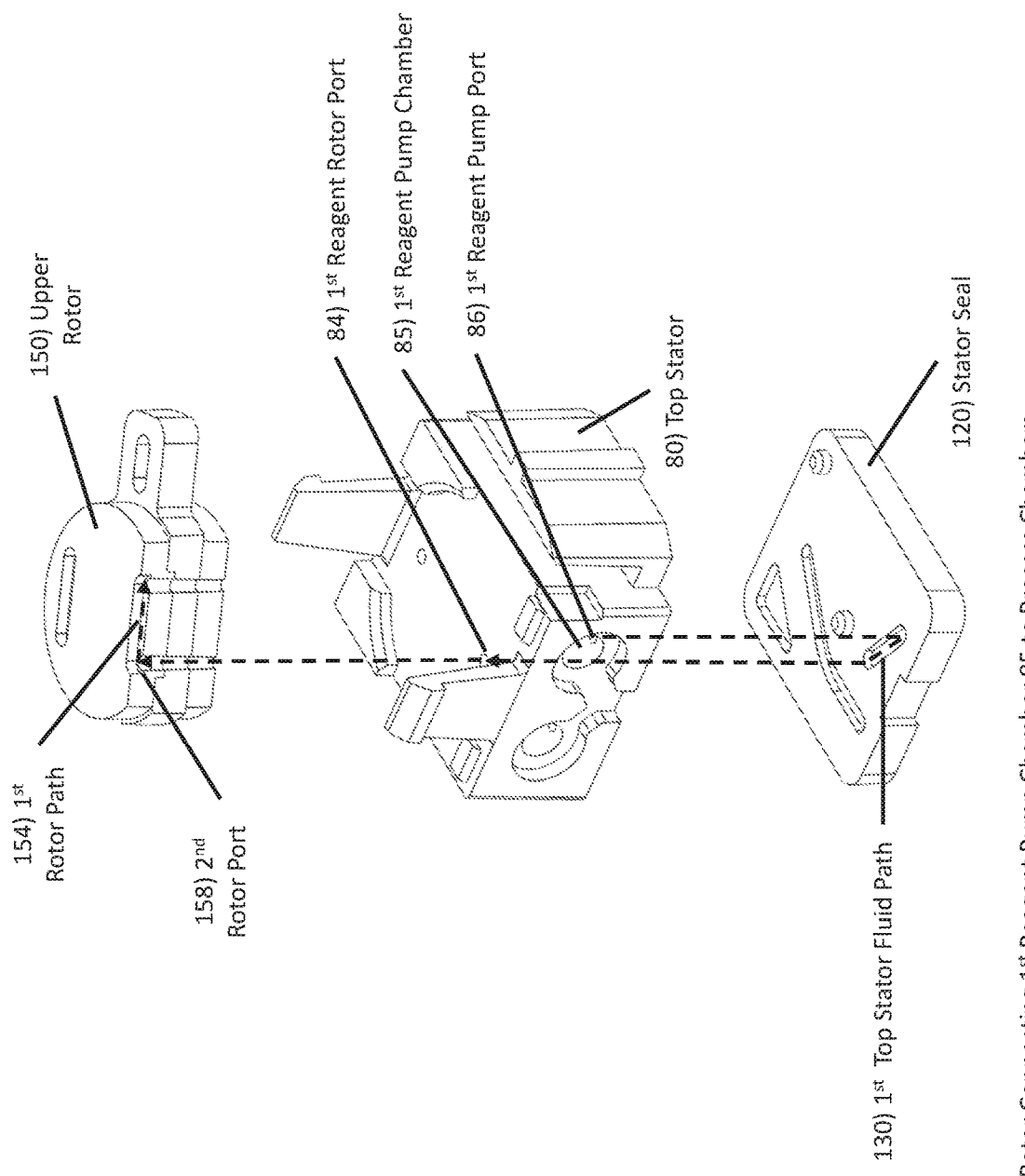
Figure 34:
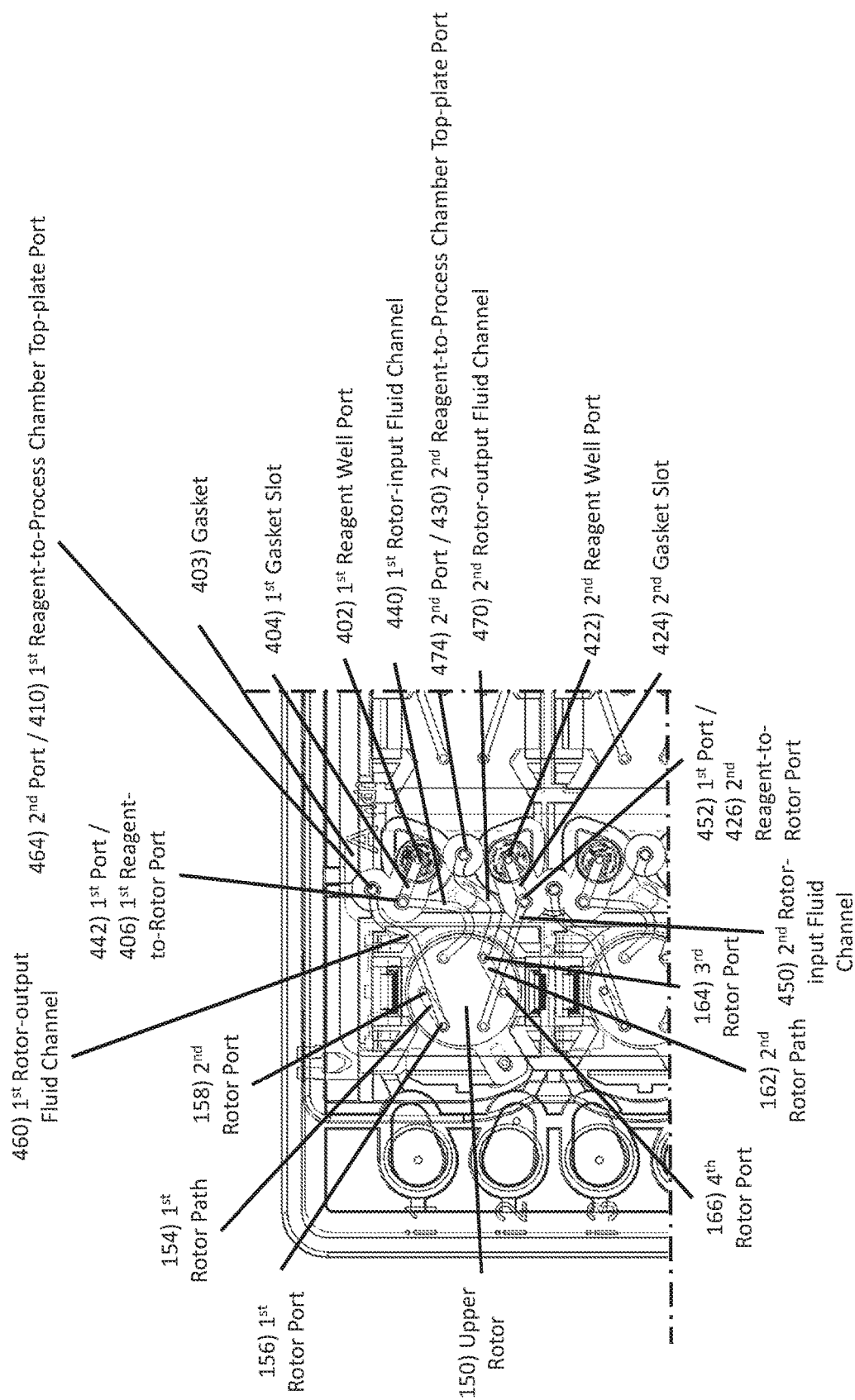
FIG. 34 shows a partial top plan view of top plate, including fluid channels and ports formed on the top of top plate with the top film removed and with the upper rotor in a second position.
Figure 35:
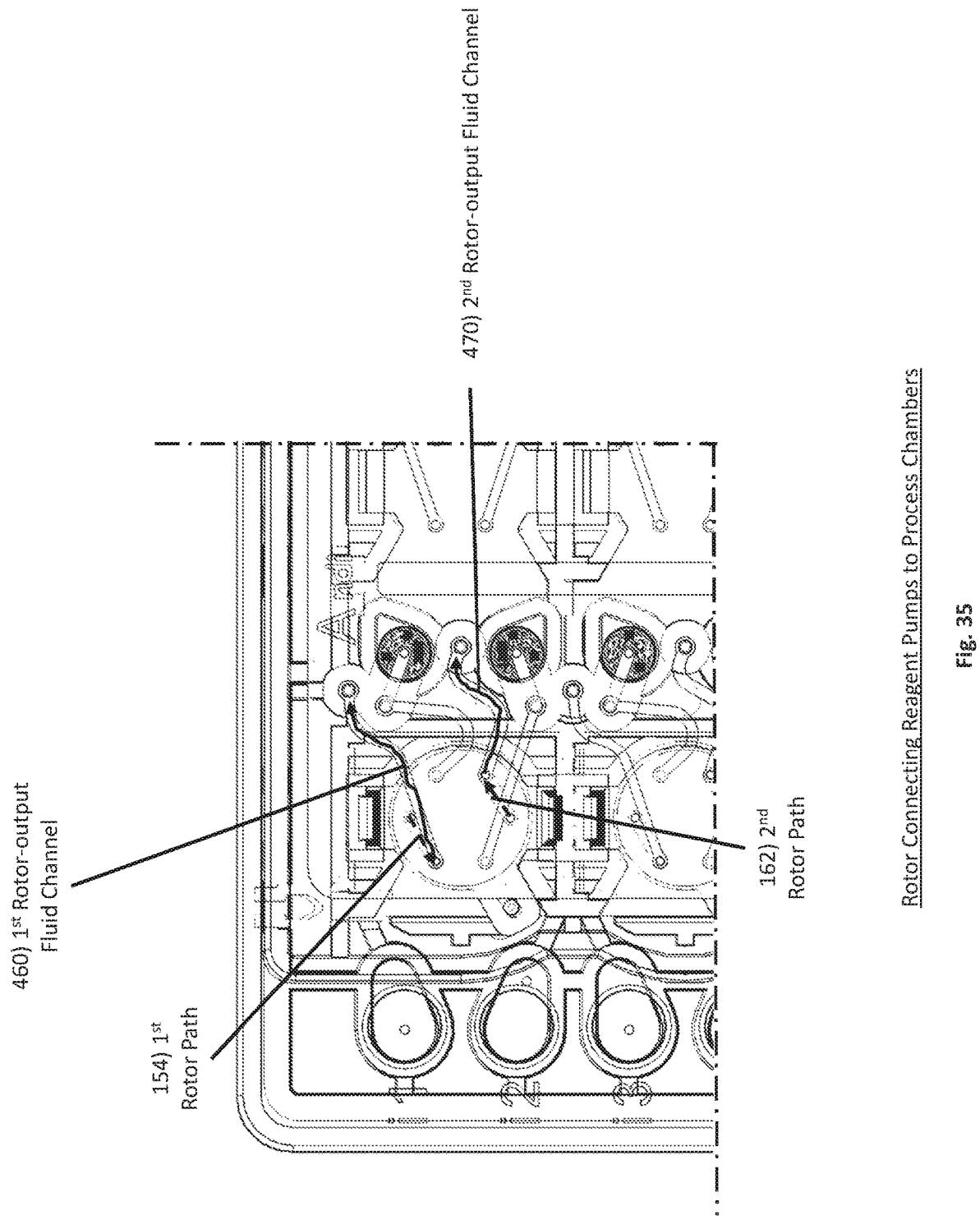
FIG. 35 shows a partial top plan view of top plate, including fluid channels and ports formed on the top of top plate with the top film removed and with the upper rotor in the second position and showing fluid movement by solid fluid path arrows and dashed fluid path arrows.

Dashed fluid path arrows in FIG. 32 show that a fluid in first reagent pump chamber 85 of top stator 80 can move through first reagent pump port 86, then along first top stator fluid path 130 of stator seal 120, then through first reagent rotor port 84 of top stator 80, and then through second rotor port 158 of upper rotor 150. As shown by FIGS. 34-35, the fluid can then move from second rotor port 158 to first rotor port 156 via first rotor path 154 of upper rotor 150, as shown by a dashed fluid path arrow in FIG. 35. As further shown by FIGS. 27 and 34-35, first rotor port 156 is in fluid communication with first port 462 of first rotor-output fluid channel 460, of which the second port 464 is in fluid communication with first reagent-to-process chamber top-plate port 410. Thus, the fluid can move from first rotor port 156 of upper rotor 150 to first reagent-to-process chamber top-plate port 410, as shown by a solid fluid path arrow in FIG. 35. Moreover, first reagent-to-process chamber top-plate port 410 is connected to a process chamber 38 of the first fluid channel via a reagent-to-process chamber gasket port 66 and reagent-to-process chamber base-plate port 42 (see FIG. 7). Therefore, when upper rotor 150 is in its second position, fluid can be moved along the first fluid channel from first reagent pump chamber 85 to an associated process chamber by the process pump assembly associated with the first fluid channel.

Figure 33:
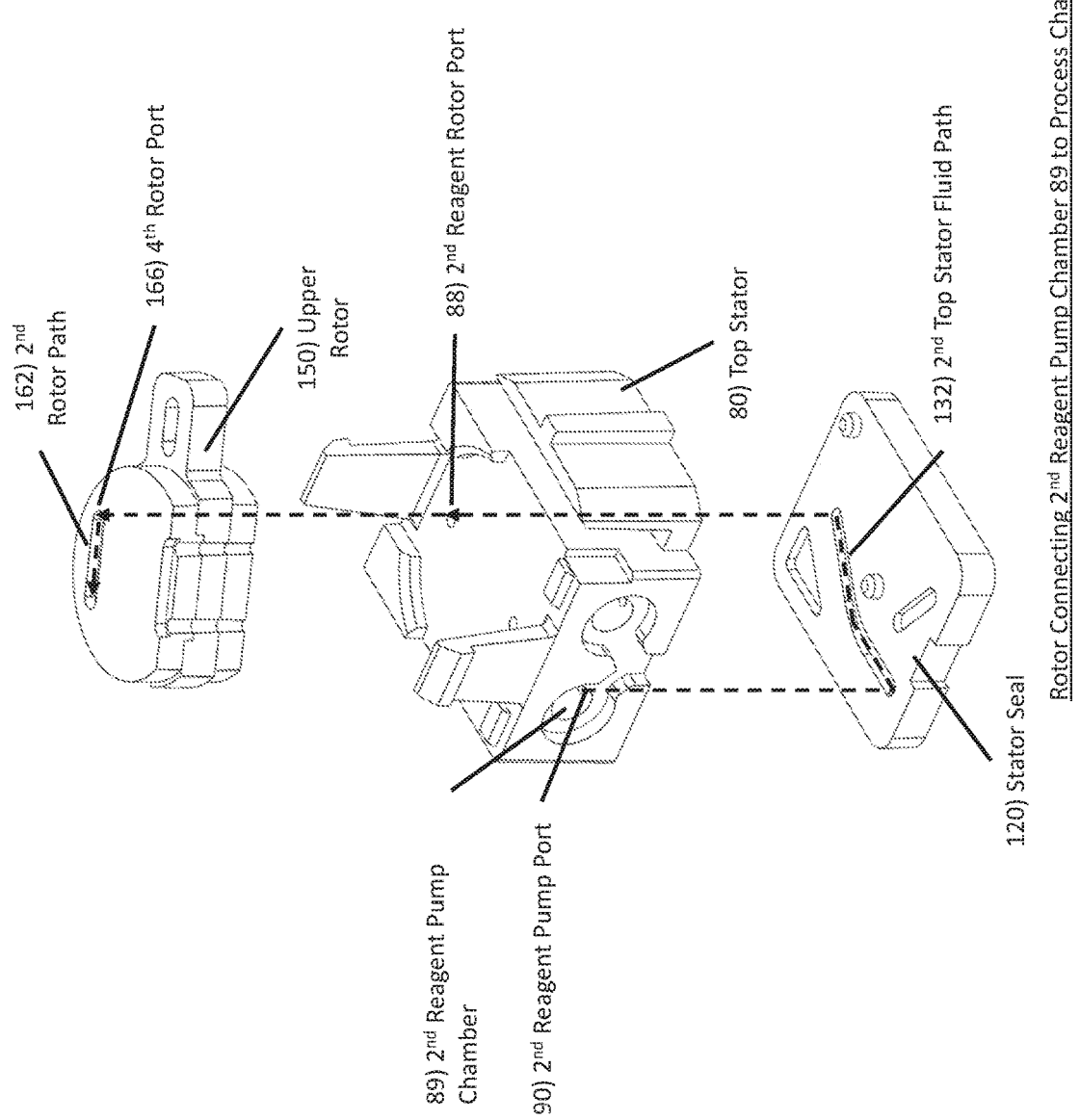

Dashed fluid path arrows in FIG. 33 show that a fluid in second reagent pump chamber 89 of top stator 80 can move through second reagent pump port 90, then along second top stator fluid path 132 of stator seal 120, then through second reagent rotor port 88 of top stator 80, and then through fourth rotor port 166 of upper rotor 150. As shown by FIGS. 34-35, the fluid can then move from fourth rotor port 166 to third rotor port 164 via second rotor path 162 of upper rotor 150, as shown by a dashed fluid path arrow in FIG. 35. As further shown by FIGS. 27 and 34-35, third rotor port 164 is in fluid communication with first port 472 of second rotor-output fluid channel 470, of which the second port 474 is in fluid communication with second reagent-to-process chamber top-plate port 430. Thus, the fluid can move from third rotor port 164 of upper rotor 150 to second reagent-to-process chamber top-plate port 430, as shown by a solid fluid path arrow in FIG. 35. Moreover, second reagent-to-process chamber top-plate port 430 is connected to a process chamber 38 of the second fluid channel via a reagent-to-process chamber gasket port 66 and reagent-to-process chamber base-plate port 42 (see FIG. 7). Therefore, when upper rotor 150 is in its second position, fluid can be moved along the second fluid channel from second reagent pump chamber 89 to an associated process chamber by the process pump assembly associated with the second fluid channel.

Figure 36:
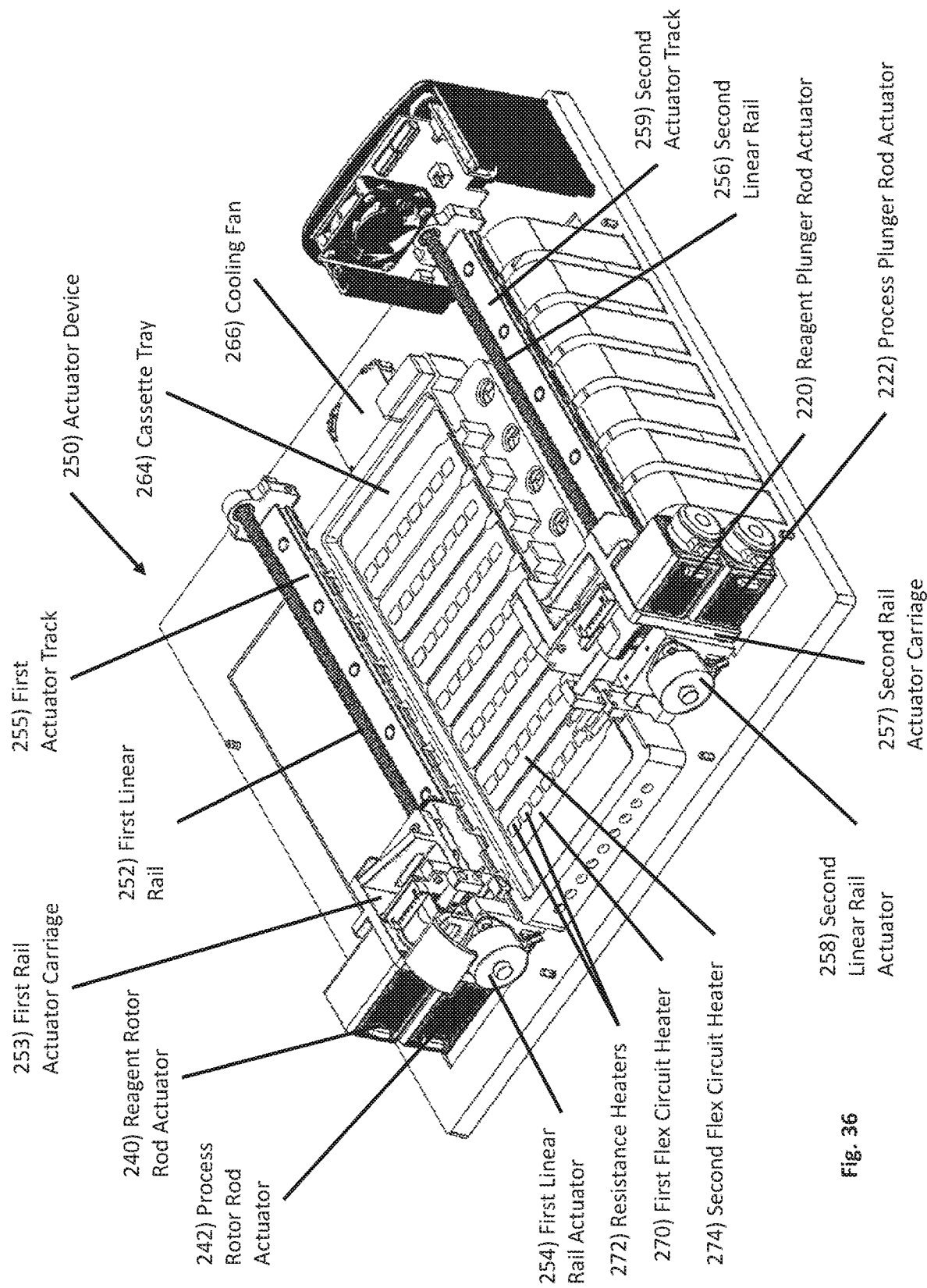
FIG. 36 is a top perspective view of an actuator device for actuating the fluid processing cassette.

FIG. 36 is a top perspective view of an actuator device 250 configured to actuate components of cassette 5 (discussed above). Cassette tray 264 is sized and configured to receive and retain base plate 30 of cassette 5. Reagent rotor rod actuator 240 is coupled to first linear rail 252 and configured to actuate reagent rotor rod 230 (see FIG. 15). Reagent rotor rod actuator 240 is configured to actuate a single reagent rotor rod 230 at a time, and first linear rail actuator 254 is configured to move reagent rotor rod actuator 240 along first linear rail 252 such that reagent rotor rod actuator 240 can be re-positioned to actuate the reagent rotor rod 230 of different processing stations of cassette 5 (e.g., first processing station 500, then each of first, second, third, fourth, and fifth intermediate processing stations 510, 520, 530, 540, 550, and then end processing station 560; see FIG. 1). Process rotor rod actuator 242 is coupled to first linear rail 252 and is configured to actuate process rotor rod 232 (see FIG. 15). Process rotor rod actuator 242 is configured to actuate a single process rotor rod 232 at a time, and first linear rail actuator 254 is configured to move process rotor rod actuator 242 along first linear rail 252 such that process rotor rod actuator 242 can be re-positioned to actuate the process rotor rod 232 of different processing stations of cassette 5 (e.g., first processing station 500, then each of first, second, third, fourth, and fifth intermediate processing stations 510, 520, 530, 540, 550, and then end processing station 560; see FIG. 1).

In an embodiment, first linear rail actuator 254 may comprise a rotary motor attached to a first rail actuator carriage 253 that is slidably coupled to a first actuator track 255 mounted to a base of the actuator device 250. First linear rail 252 may comprise a threaded rod (lead screw) operatively attached to the first linear rail actuator 254 and threadably coupled to the first rail actuator carriage 253. The reagent rotor rod actuator 240 and the process rotor rod actuator 242 are attached to the first rail actuator carriage 253. Operation of the first linear rail actuator 254 causes the first linear rail 252 to rotate, and the threaded coupling between the first linear rail 252 and the rail actuator carriage 253 causes linear translation of the first rail actuator carriage 253 across the first actuator track 255, thereby moving the reagent rotor rod actuator 240 and the process rotor rod actuator 242. Alternatively, translation of the first rail actuator carriage 253 can be effected by rotating a threaded nut within the carriage while first linear rail 252 remains fixed.

As also shown in FIG. 36, reagent plunger rod actuator 220 is coupled to second linear rail 256 and is configured to actuate first and second reagent plunger rods 200, 202 (see FIG. 11). Reagent plunger rod actuator 220 is configured to actuate a single set of first and second reagent plunger rods 200, 202 at a time, and second linear rail actuator 258 is configured to move reagent plunger rod actuator 220 along second linear rail 256 such that reagent plunger rod actuator 220 can be re-positioned to actuate the set of first and second reagent plunger rods 200, 202 of different processing stations of cassette 5 (e.g., first processing station 500, then each of first, second, third, fourth, and fifth intermediate processing stations 510, 520, 530, 540, 550, and then end processing station 560; see FIG. 1). Process plunger rod actuator 222 is coupled to second linear rail 256 and is configured to actuate first and second process plunger rods 204, 206 (see FIG. 11). Process plunger rod actuator 222 is configured to actuate a single set of first and second process plunger rods 204, 206 at a time, and second linear rail actuator 258 is configured to move process plunger rod actuator 222 along second linear rail 256 such that process plunger rod actuator 222 can be re-positioned to actuate the set of first and second process plunger rods 204, 206 of different processing stations of cassette 5 (e.g., first processing station 500, then each of first, second, third, fourth, and fifth intermediate processing stations 510, 520, 530, 540, 550, and then end processing station 560; see FIG. 1).

In an embodiment, second linear rail actuator 258 may comprise a rotary motor attached to a second rail actuator carriage 257 that is slidably coupled to a second actuator track 259 mounted to a base of the actuator device 250. Second linear rail 256 may comprise a threaded rod (lead screw) operatively attached to the second linear rail actuator 258 and threadably coupled to the second rail actuator carriage 257. The reagent plunger rod actuator 220 and the process plunger rod actuator 222, as well as magnet lift actuator 260 (see FIG. 41), are attached to the second rail actuator carriage 257. Operation of the second linear rail actuator 258 causes the second linear rail 256 to rotate, and the threaded coupling between the second linear rail 256 and the rail actuator carriage 257 causes linear translation of the first rail actuator carriage 257 across the second actuator track 259, thereby moving the reagent plunger rod actuator 220, the process plunger rod actuator 222, and the magnet lift actuator 260 (see FIG. 41). Alternatively, translation of the second rail actuator carriage 257 can be effected by rotating a threaded nut within the carriage while second linear rail 256 remains fixed.

As shown in FIG. 36, actuator device 250 comprises a plurality of flex circuit heaters, such as first flex circuit heater 270 and second flex circuit heater 274, which are substantially similar and are exemplary of all flex circuit heaters of actuator device 250. Each processing station of cassette 5 that comprises process chambers 38 (see FIG. 3) is associated with a separate flex circuit heater—for example, first processing station 500 and first intermediate processing station 510 (see FIG. 1) are associated with first and second flex circuit heaters 270, 274, respectively, when cassette 5 is installed in cassette tray 264 of actuator device 250. First flex circuit heater 270 comprises eight resistance heaters 272, and each of the other flex circuit heaters of actuator device 250 likewise comprises eight resistance heaters 272. The eight resistance heaters 272 of each flex circuit heater correspond to, and are associated with, the eight process chambers 38 of a processing station associated with the flex circuit heater. For example, each of the eight resistance heaters 272 of first flex circuit heater 270 corresponds to one of the eight process chambers 38 of first processing station 500, which is associated with first flex circuit heater 270. The process chambers 38 of cassette 5, specifically the bottom surfaces of process chambers 38 formed by portions of base film 32 (see FIGS. 3, 7), are in physical contact with resistance heaters 272 of the multiple flex circuit heaters (e.g., first and second flex circuit heaters 270, 274) when cassette 5 is installed in cassette tray 264 of actuator device 250. Each resistance heater 272 can be controlled independently such that actuator device 250 can maintain the same or different temperature independently in each process chamber 38 of each processing station of cassette 5. Actuator device 250 may further comprise a cooling fan 266 configured to draw air (e.g., ambient air) through a conduit or plenum under cassette tray 264 across the bottom of the flex circuit heaters (e.g., first and second flex circuit heaters 270, 274) to simultaneously lower the temperature in eight process chambers 38 of a given processing station. The temperature control components, such as first and second flex circuit heaters 270, 274 and cooling fan 266, can achieve and maintain a fixed elevated temperature or perform thermal cycling (e.g., for PCR purposes) within the process chambers 38 of a given processing station.

Figure 37:
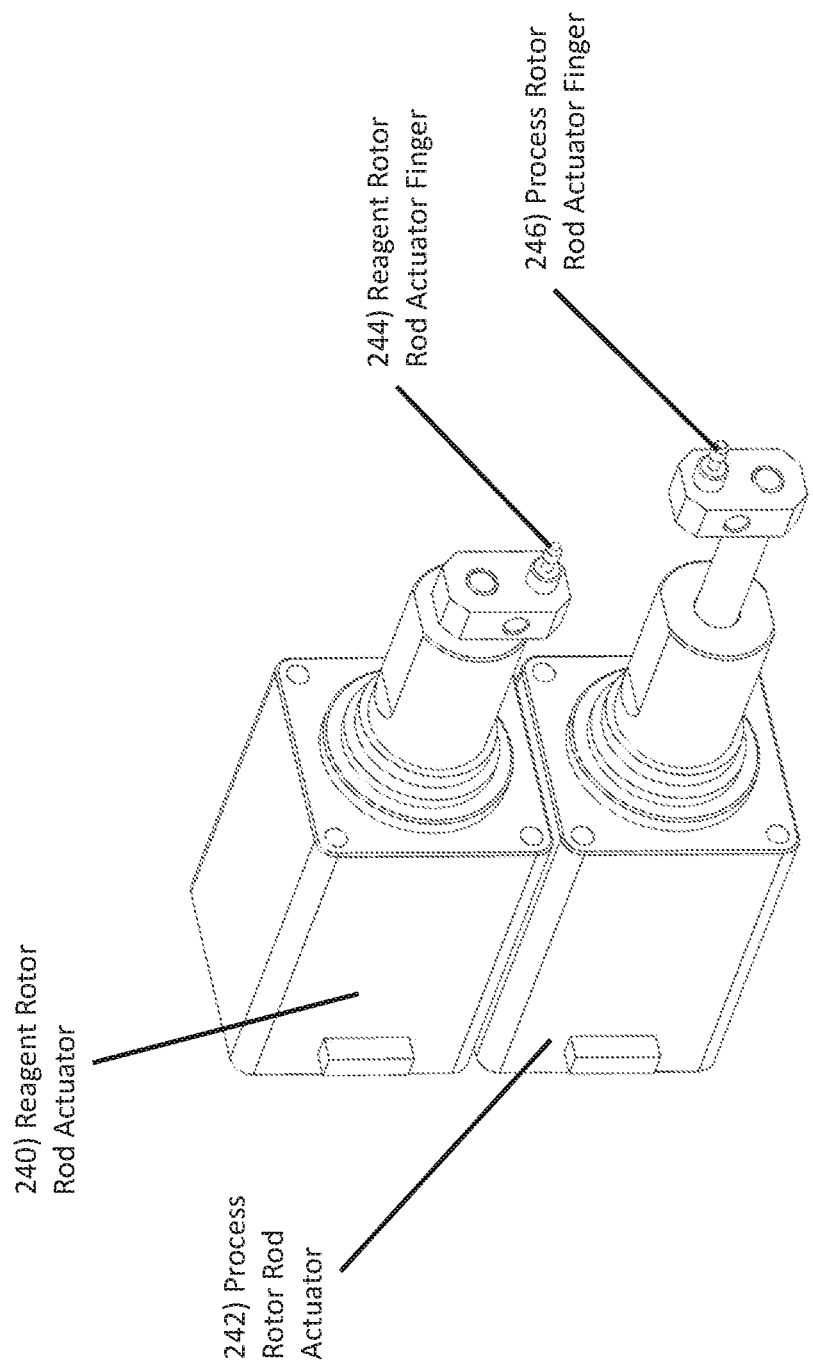
FIG. 37 is a perspective view of rotor rod actuators of the actuator device.

FIG. 37 is a perspective view of a reagent rotor rod actuator 240 and process rotor rod actuator 242 of actuator device 250. Reagent rotor rod actuator 240 comprises a reagent rotor rod actuator finger 244 that is (i) received and retained or (ii) released by reagent rotor rod yoke 231 of reagent rotor rod 230 (see FIG. 15) when reagent rotor rod actuator 240 is (i) coupled or (ii) de-coupled, respectively, to reagent rotor rod 230. Reagent rotor rod actuator finger 244 extends through top-plate rotor control port 236 (see FIGS. 3, 40) to access, couple to, and actuate reagent rotor rod 230. Process rotor rod actuator 242 comprises a process rotor rod actuator finger 246 that is (i) received and retained or (ii) released by process rotor rod yoke 233 of process rotor rod 232 (see FIG. 15) when process rotor rod actuator 242 is (i) coupled or (ii) de-coupled, respectively, to process rotor rod 232. Process rotor rod actuator finger 246 extends through base-plate rotor control port 238 (see FIGS. 3, 40) to access, couple to, and actuate process rotor rod 232.

As shown in FIG. 37, the process rotor rod actuator finger 246 of process rotor rod actuator 242 is linearly extended and reagent rotor rod actuator finger 244 of reagent rotor rod actuator 240 is not extended (i.e., comparatively retracted). Reagent rotor rod actuator 240 can actuate reagent rotor rod 230 (see FIG. 15) by (1) fully extending reagent rotor rod actuator finger 244 to couple to reagent rotor rod 230 and/or move reagent rotor rod 230 to a first position, (2) partially extending/retracting reagent rotor rod actuator finger 244 to move reagent rotor rod 230 to a second position, or (3) fully retracting reagent rotor rod actuator finger 244 to de-couple from reagent rotor rod 230, which is retained within cassette 5. Process rotor rod actuator 240 can actuate process rotor rod 232 (see FIG. 15) by (1) fully extending process rotor rod actuator finger 246 to couple to process rotor rod 232 and/or move process rotor rod 232 to a first position, (2) partially extending/retracting process rotor rod actuator finger 246 to move process rotor rod 232 to a second position, or (3) fully retracting process rotor rod actuator finger 246 to de-couple from process rotor rod 232, which is retained within cassette 5.

Figure 38:
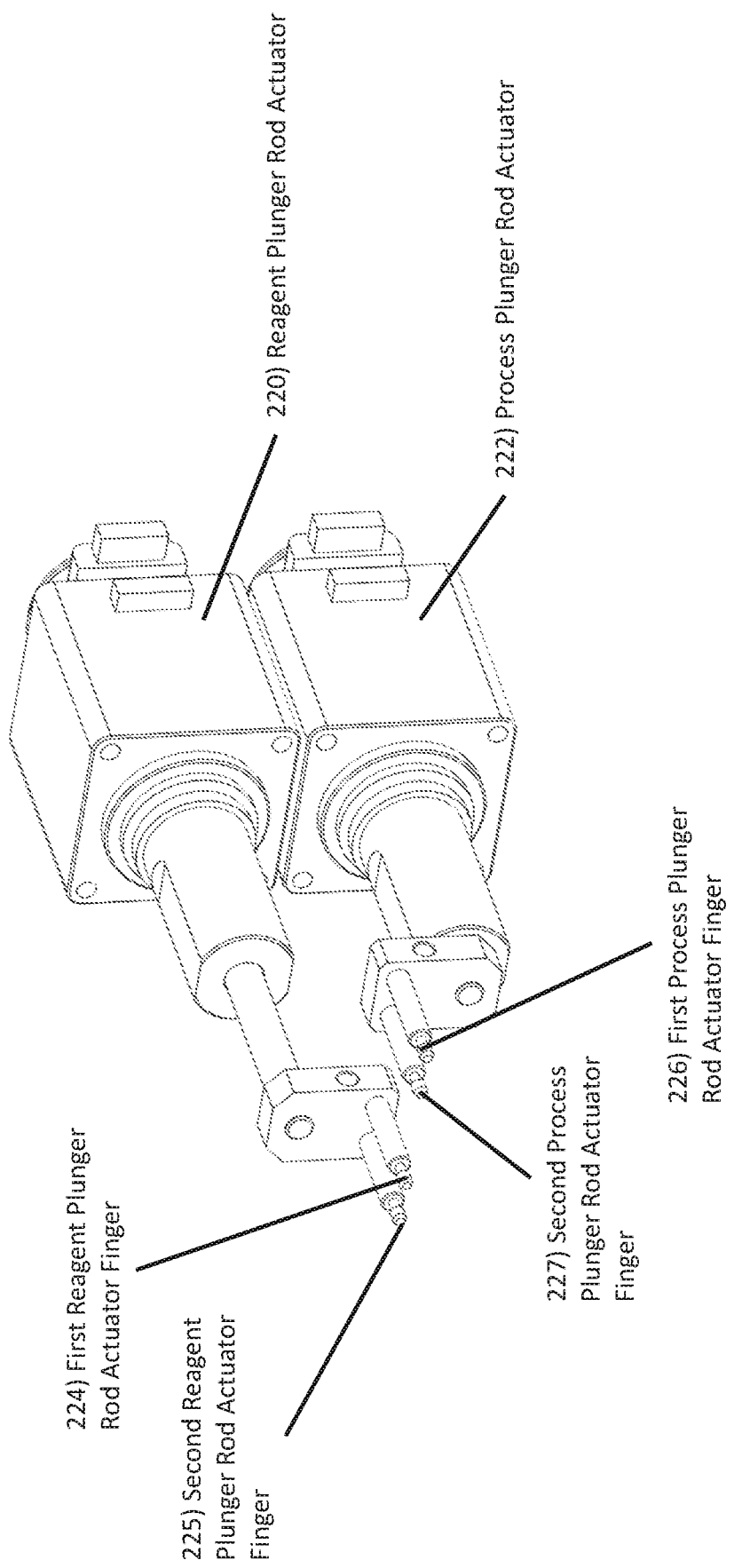
FIG. 38 is a perspective view of plunger rod actuators of the actuator device.

FIG. 38 is a perspective view of reagent plunger rod actuator 220 and process plunger rod actuator 222 of actuator device 250. Reagent plunger rod actuator 220 comprises a first reagent plunger rod actuator finger 224 that is (i) received and retained or (ii) released by first reagent plunger rod yoke 201 of first reagent plunger rod 200 (see FIG. 11) when reagent plunger rod actuator 220 is (i) coupled or (ii) de-coupled, respectively, to first reagent plunger rod 200. Reagent plunger rod actuator 220 comprises a second reagent plunger rod actuator finger 225 that is (i) received and retained or (ii) released by second reagent plunger rod yoke 203 of second reagent plunger rod 202 (see FIG. 11) when reagent plunger rod actuator 220 is (i) coupled or (ii) de-coupled, respectively, to second reagent plunger rod 202. First and second reagent plunger rod actuator fingers 224, 225 extend through top-plate pump control ports 212 (see FIGS. 2, 39) to access, couple to, and actuate first and second reagent plunger rods 200, 202. Process plunger rod actuator 222 comprises a first process plunger rod actuator finger 226 that is (i) received and retained or (ii) released by first process plunger rod yoke 205 of first process plunger rod 204 (see FIG. 11) when process plunger rod actuator 222 is (i) coupled or (ii) de-coupled, respectively, to first process plunger rod 204. Process plunger rod actuator 222 comprises a second process plunger rod actuator finger 227 that is (i) received and retained or (ii) released by second process plunger rod yoke 207 of second process plunger rod 206 (see FIG. 11) when process plunger rod actuator 222 is (i) coupled or (ii) de-coupled, respectively, to second process plunger rod 206. First and second process plunger rod actuator fingers 226, 227 extend through base-plate pump control ports 214 (see FIGS. 2, 39) to access, couple to, and actuate first and second process plunger rods 204, 206.

As shown in FIG. 38, the first and second reagent plunger rod actuator fingers 224, 225 are linearly extended and first and second process plunger rod actuator fingers 226, 227 are not extended (i.e., comparatively retracted). Reagent plunger rod actuator 220 can actuate first and second reagent plunger rods 200, 202 (see FIG. 11) by (1) fully extending first and second reagent plunger rod actuator fingers 224, 225 to couple to first and second reagent plunger rods 200, 202 and/or move first and second reagent plunger rods 200, 202 to a first position, (2) partially extending/retracting first and second reagent plunger rod actuator fingers 224, 225 to move first and second reagent plunger rods 200, 202 to a second position, or (3) fully retracting first and second reagent plunger rod actuator fingers 224, 225 to de-couple from first and second reagent plunger rods 200, 202, respectively, which are retained within cassette 5. Process plunger rod actuator 222 can actuate first and second process plunger rods 204, 206 (see FIG. 11) by (1) fully extending first and second process plunger rod actuator fingers 226, 227 to couple to first and second process plunger rods 204, 206 and/or move first and second process plunger rods 204, 206 to a first position, (2) partially extending/retracting first and second process plunger rod actuator fingers 226, 227 to move first and second process plunger rods 204, 206 to a second position, or (3) fully retracting first and second process plunger rod actuator fingers 226, 227 to de-couple from first and second process plunger rods 204, 206, respectively, which are retained within cassette 5.

Figure 39:
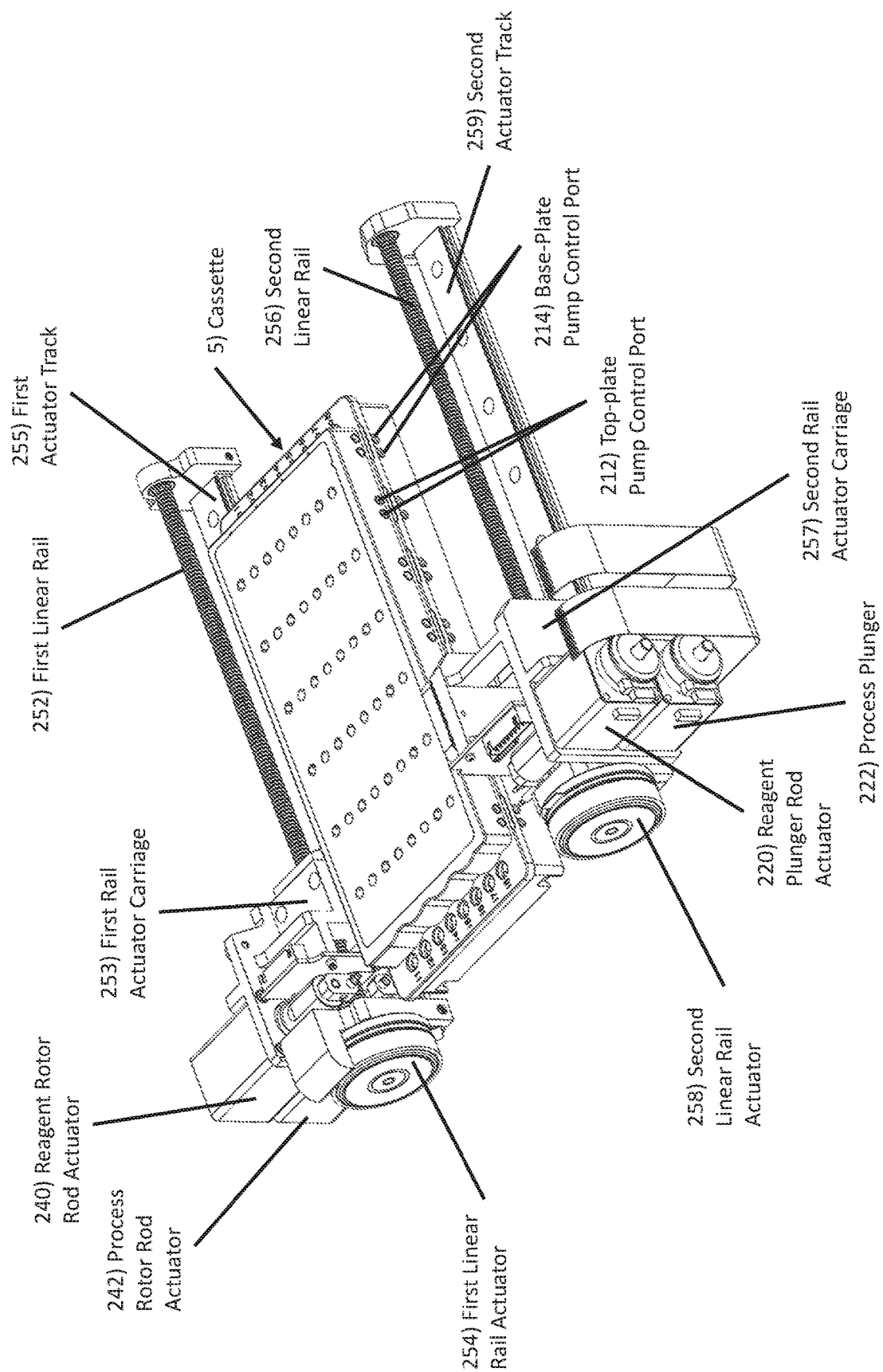
FIG. 39 is a top perspective view of the rail and actuator components of the actuator device positioned relative to the fluid processing cassette to actuate the internal components of the fluid processing cassette.

FIG. 39 is a top perspective view of cassette 5 positioned relative to reagent and process rotor rod actuators 240, 242, reagent and process plunger rod actuators 220, 222, and first and second linear rails 252, 256 of actuator device 250 such that these components of actuator device 250 are positioned to actuate the internal components of cassette 5. Cassette tray 264 of actuator device 250 is not shown in FIG. 39 (see FIG. 36). Reagent plunger rod actuator 220 actuates a set of first and second reagent plunger rods 200, 202 (see FIG. 11) of cassette 5 via a pair of top-plate pump control ports 212, and second linear rail actuator 258 moves second rail actuator carriage 257 along with reagent plunger rod actuator 220 to different positions along second linear rail 256 such that reagent plunger rod actuator 220 can actuate different sets of first and second reagent plunger rods 200, 202 via different pairs of top-plate pump control ports 212. Process plunger rod actuator 222 actuates a set of first and second process plunger rods 204, 206 (see FIG. 11) of cassette 5 via a pair of base-plate pump control ports 214, and second linear rail actuator 258 moves second rail actuator carriage 257 along with process plunger rod actuator 222 to different positions along second linear rail 256 such that process plunger rod actuator 222 can actuate different sets of first and second process plunger rods 204, 206 via different pairs of base-plate pump control ports 214. As shown in FIG. 39, reagent and process plunger rod actuators 220, 222 are located in a position on second linear rail 256 relative to cassette 5 so as to allow reagent and process plunger rod actuators 220, 222 to actuate first and second reagent plunger rods 200, 202 and first and second process plunger rods 204, 206 (see FIG. 11), respectively, of first processing station 500 (see FIG. 1) of cassette 5.

Reagent rotor rod actuator 240 actuates a reagent rotor rod 230 (see FIG. 15) of cassette 5 via a top-plate rotor control port 236 (see FIG. 40), and first linear rail actuator 254 moves first rail actuator carriage 253 along with reagent rotor rod actuator 240 to different positions along first linear rail 252 such that reagent rotor rod actuator 240 can actuate different reagent rotor rods 230 via different top-plate rotor control ports 236. Process rotor rod actuator 242 actuates a process rotor rod 232 (see FIG. 15) of cassette 5 via a base-plate rotor control port 238 (see FIG. 40), and first linear rail actuator 254 moves first rail actuator carriage 253 along with process rotor rod actuator 242 to different positions along first linear rail 252 such that process rotor rod actuator 242 can actuate different process rotor rods 232 via different base-plate rotor control ports 238. As shown in FIG. 39, reagent and process rotor rod actuators 240, 242 are located in a position on first linear rail 252 relative to cassette 5 so as to allow reagent and process rotor rod actuators 240, 242 to actuate reagent rotor rod 230 and process rotor rod 232 (see FIG. 15), respectively, of first processing station 500 (see FIG. 1) of cassette 5.

Figure 40:
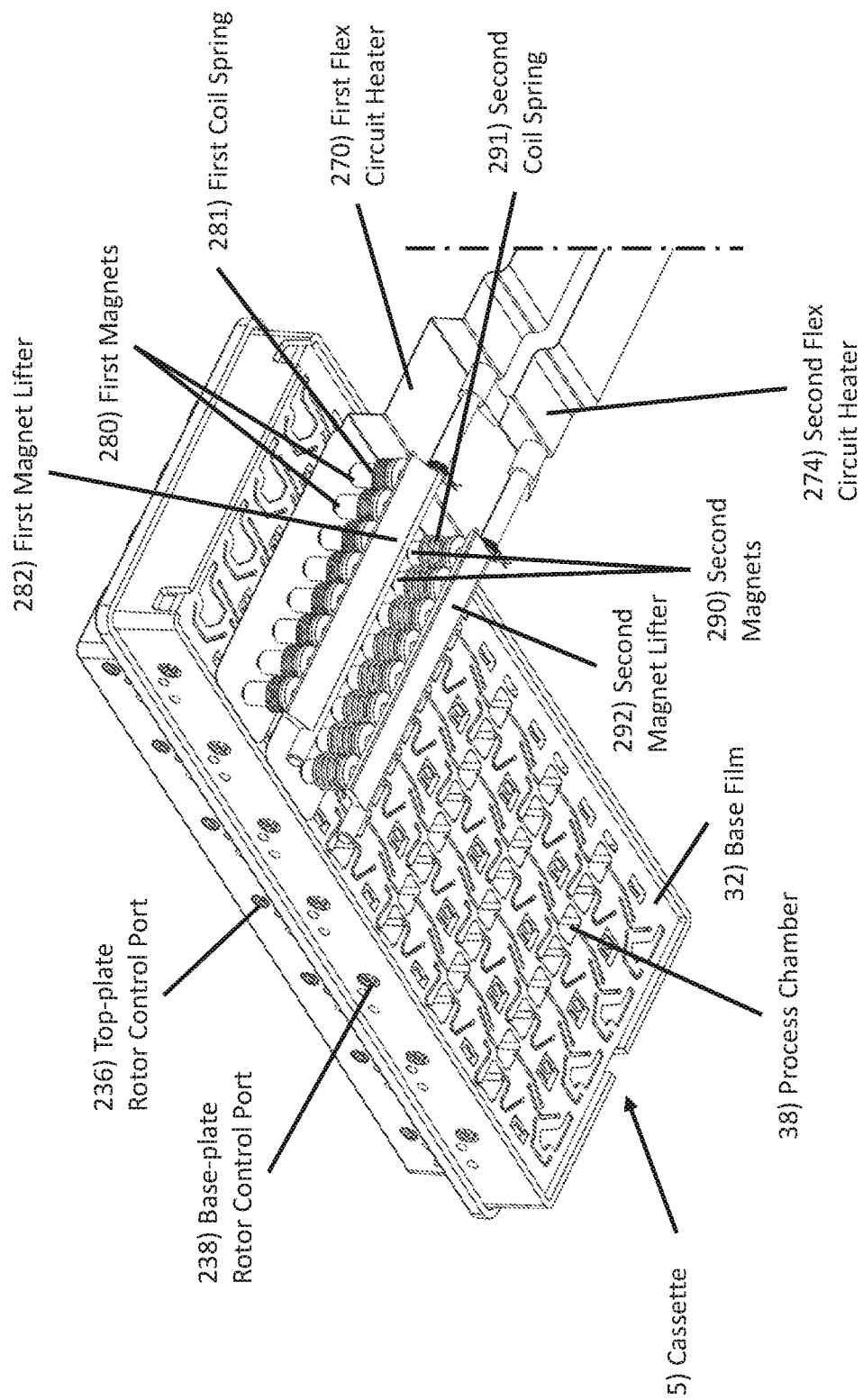
FIG. 40 is a bottom perspective view of two flex circuit heaters and two sets of magnets and magnet lifters of the actuator device positioned relative to the fluid processing cassette to perform temperature control and magnet control in two respective processing stations of the fluid processing cassette.

FIG. 40 is a bottom perspective view of cassette 5 positioned relative to first and second flex circuit heaters 270, 274, first and second magnets (magnet arrays) 280, 290, and first and second magnet lifters 282, 292 of actuator device 250, such that these components of actuator device 250 are positioned to perform temperature control and/or magnet control in process chambers 38 of first processing station 500 and first intermediate processing station 510 (see FIG. 1) of cassette 5. Cassette tray 264 of actuator device 250 is not shown in FIG. 40 (see FIG. 36). As described above, when cassette 5 is installed in actuator device 250, first processing station 500 and first intermediate processing station 510 are associated with first and second flex circuit heaters 270, 274, such that each of the eight process chambers 38 of first processing station 500 corresponds to and is proximate to one of the eight resistance heaters 272 (see FIG. 36) of first flex circuit heater 270, and such that each of the eight process chambers 38 of first intermediate processing station 510 corresponds to and is proximate to one of the eight resistance heaters (see FIG. 36) of second flex circuit heater 274. In this instance, "proximate" means that the portion of base film 32 (shown as translucent in FIG. 40) that forms the bottom surface of each process chamber 38 of first processing station 500 and first intermediate processing station 510 is in physical contact with the corresponding resistance heater 272 of the associated first and second flex circuit heaters 270, 274 (or at least sufficient physical proximity to permit efficient thermal transfer between the heater and the associated process chamber. As described above, first and second flex circuit heaters 270, 274 can perform temperature control of process chambers 38 in first processing station 500 and first intermediate processing station 510, respectively.

As shown in FIG. 40, when cassette 5 is installed in actuator device 250, each of the eight process chambers 38 of first processing station 500 (see FIG. 1) corresponds to one of the eight first magnets 280 of actuator device 250, and each of the eight process chambers 38 of first intermediate processing station 510 (see FIG. 1) corresponds to one of the eight second magnets 290 of actuator device 250. First magnets 280 are operatively associated with first magnet lifter 282 such that first magnet lifter 282 can be actuated to lift first magnets 280 into a first position or lower first magnets 280 into a second position. In the lifted first position (as shown in FIG. 40), first magnets 280 press against first flex circuit heater 270 and are proximate to process chambers 38 of first processing station 500 such that first magnets 280 apply a magnetic field to those process chambers 38 through the first flex circuit heater 270. In the lowered second position, first magnets 280 are relatively less proximate to those process chambers 38 such that first magnets 280 do not apply a magnetic field (or apply a weaker magnetic field) to those process chambers 38. Second magnets 290 are operatively associated with second magnet lifter 292 such that second magnet lifter 292 can be actuated to lift second magnets 290 into a first position or lower second magnets 290 into a second position. In the lifted first position, second magnets 290 press against second flex circuit heater 274 and are proximate to process chambers 38 of first intermediate processing station 510 such that second magnets 290 apply a magnetic field to those process chambers 38 through the second flex circuit heater 274. In the lowered second position (as shown in FIG. 40), second magnets 290 are relatively less proximate to those process chambers 38 such that second magnets 290 do not apply a magnetic field (or apply a weaker magnetic field) to those process chambers 38.

In FIG. 40, the first magnets 280 are shown in the first, or raised, position, and the second magnets 290 are shown in the second, or lowered, position. In an embodiment, a first coil spring 281 may be associated with each individual first magnet 280, and a second coil spring 291 may be associated with each individual second magnet 290 for biasing the associated magnet in the lowered position whereby the magnet lifter 282 or 292 overcomes the biasing spring force to push the magnets into the first, or raised, position.

As shown in FIG. 40, first flex circuit heater 270 and first magnets 280 are stacked and second flex circuit heater 274 and second magnets 290 are stacked in actuator device 250 such that when cassette 5 is installed in actuator device 250, process chambers 38 of first processing station 500 and process chambers 38 of first intermediate processing station 510, respectively, can be subjected to temperature control, magnet control, or both temperature and magnet control. Although not shown in FIG. 40, actuator device 250 comprises a flex circuit heater (such as first flex circuit heater 270) and a set of magnets and magnet lifter (such as first magnets 280 and first magnet lifter 282) associated with each processing station of cassette 5 that comprises process chambers 38 (e.g., first processing station 500). That is, actuator device 250 comprises a flex circuit heater and a set of magnets and magnet lifter to separately perform temperature and/or magnet control in each of first processing station 500 and first, second, third, fourth, and fifth intermediate processing stations 510, 520, 530, 540, 550 (see FIG. 1).

Figure 41:
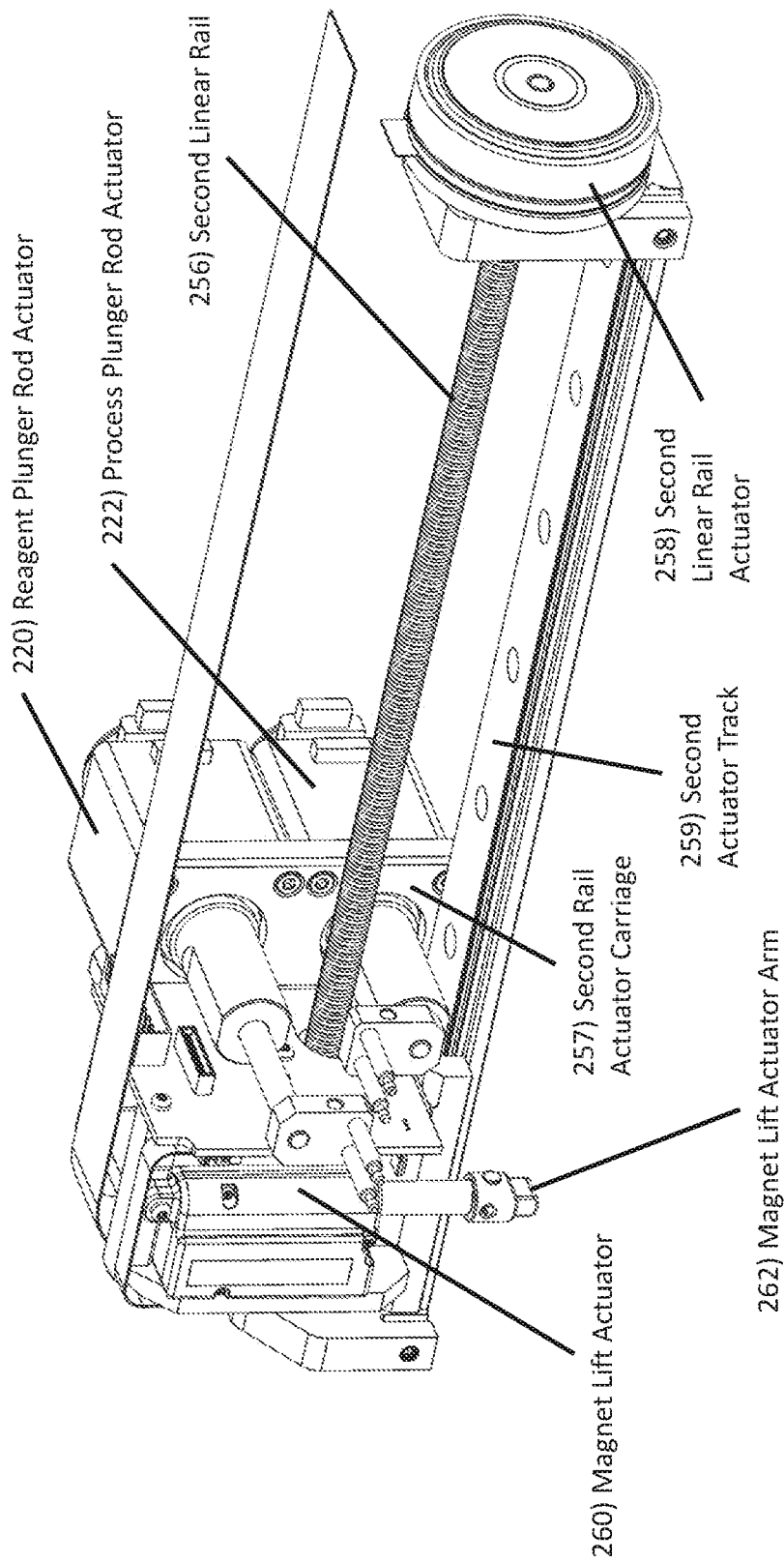
FIG. 41 is a perspective view of rail and actuator components of the actuator device, including a magnet lift actuator.

FIG. 41 is a perspective view of second linear rail 256 of actuator device 250. Coupled to second linear rail 256 via the second rail actuator carriage 257 are reagent plunger rod actuator 220, process plunger rod actuator 222, and a magnet lift actuator 260 of actuator device 250. Second linear rail actuator 258 is configured to move the second rail actuator carriage 257 along with the reagent plunger rod actuator 220, process plunger rod actuator 222, and magnet lift actuator 260 to different positions along second linear rail 256. Magnet lift actuator 260 is configured to actuate a magnet lifter to thereby lift or lower a set of magnets associated with the magnet lifter—for example, configured to actuate magnet lifter 282 to lift or lower first magnets 280 (see FIGS. 40, 42). For example, magnet lift actuator 260 extends magnet lift actuator arm 262 linearly downward to engage and downwardly rotate a first magnet lifter pedal 284 (see FIG. 42), which rotates first magnet lifter 282 and thereby lifts first magnets 280. Magnet lift actuator 260 retracts magnet lift actuator arm 262 linearly upward to allow upward rotation of first magnet lifter pedal 284, which rotates first magnet lifter 282 and thereby lowers first magnets 280, e.g., under the biasing force of first coil springs 281 (see FIG. 40) associated with the first magnets 280. Second linear rail actuator 258 is configured to move magnet lift actuator 260 along second linear rail 256 such that magnet lift actuator 260 can be re-positioned to actuate the magnet lifter (e.g., first magnet lifter 282) of different processing stations of cassette 5 (e.g., first processing station 500, and then each of first, second, third, fourth, and fifth intermediate processing stations 510, 520, 530, 540, 550; see FIG. 1)

Figure 42:
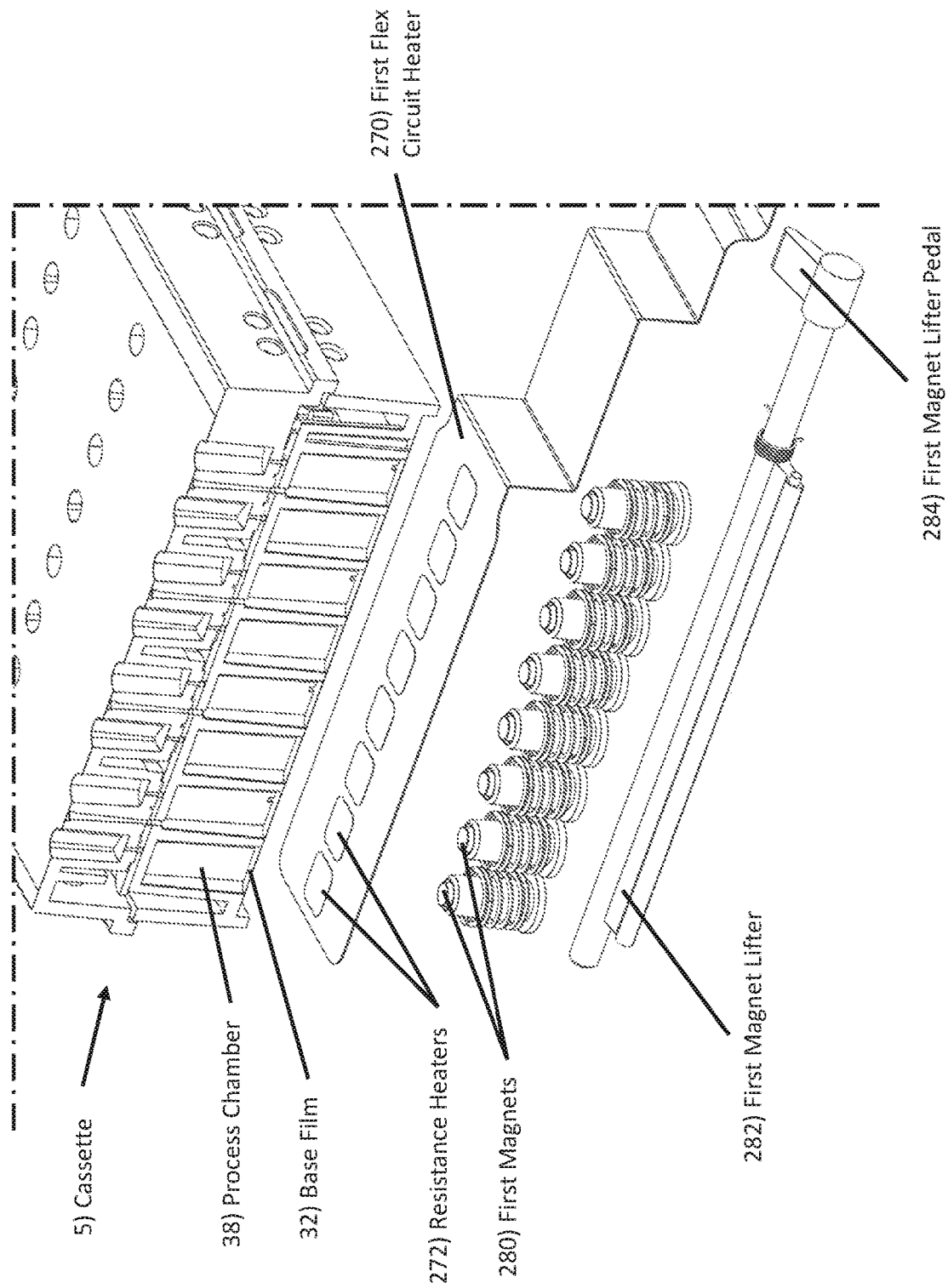
FIG. 42 is an exploded top perspective view of a flex circuit heater and set of magnets and magnet lifter of the actuator device positioned relative to a partial perspective, cross-sectional view of the fluid processing cassette along the line A-A in FIG. 2, similar to FIG. 7.

FIG. 42 shows an exploded top perspective view of first flex circuit heater 270, first magnets 280, and first magnet lifter 282 of actuator device 250 positioned relative to a partial perspective, cross-sectional view of cassette 5 taken along line A-A in FIG. 2, which exposes process chambers 38 of first processing station 500 (see FIG. 1). As discussed above, when cassette 5 is installed in actuator device 250, each process chamber 38 of first processing station 500 corresponds to a separate resistance heater 272 of first flex circuit heater 270, where each resistance heater 272 independently controls the temperature in a process chamber 38 and is in physical contact with the portion of base film 32 that forms the bottom surface of the process chamber 38. The physical contact is enhanced by pressurizing cassette 5, specifically the process chambers 38, which pushes the portions of base film 32 that form the bottom surfaces of process chambers 38 against the top surface of first flex circuit heater 270 and the resistance heaters 272 thereof. Also, as discussed above, when cassette 5 is installed in actuator device 250, each process chamber 38 of first processing station 500 corresponds to a first magnet 280, where rotating first magnet lifter pedal 284 downward or upward thereby rotates first magnet lifter 282, which lifts or lowers, respectively, first magnets 280 to perform magnet control of the process chambers 38. When first magnets 280 are lifted to apply a magnetic field to process chambers 38, first magnets 280 press against the bottom surface of first flex circuit heater 270. These aspects of first processing station 500 and the associated first flex circuit heater 270, first magnets 280, and first magnet lifter 282, as shown in FIG. 42, also apply to each of the other processing stations of cassette 5 (e.g., first, second, third, fourth, and fifth intermediate processing stations 510, 520, 530, 540, 550; see FIG. 1).

Figure 43:
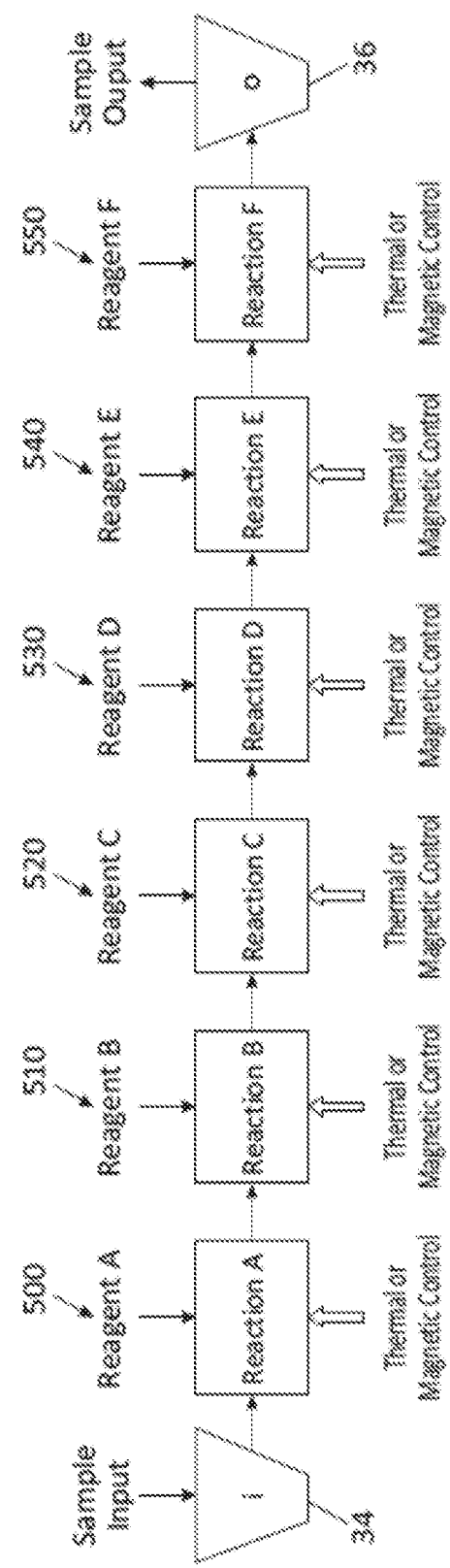
FIG. 43 is a schematic diagram illustrating a general overview of operation of the fluid processing cassette.

FIG. 43 is a schematic diagram illustrating a general overview of operation of a single fluid channel of the fluid processing cassette described above. As shown in FIG. 43, sample provided at the input well 34 progresses through each of the processing stations 500, 510, 520, 530, 540, 550 and then to the output well 36. FIG. 43 is exemplary; the cassette may include more or less than six processing stations. In addition, FIG. 43 shows only a single fluid channel. Each processing station and each process illustrated in FIG. 43 can simultaneously occur within one or more additional fluid channels, as described above.

At each processing station, a reagent is added to the sample, and a process, or reaction, involving the sample/reagent mix occurs within the process station. At first processing station 500, reagent "A" is added to the sample, and a process or reaction "A" occurs within the first processing station 500. In connection with process or reaction "A" occurring in the first processing station 500, thermal control, magnetic control, or both, is (are) applied to the sample/reagent mixture so as to effect one aspect of the process, such as promoting a reaction (e.g., an amplification or hybridization) or performing a magnetic separation procedure. Thermal, or temperature, control can be implemented to control an elevated reaction temperature or thermal cycling (e.g., for purposes of polymerase chain reaction (PCR)). Magnetic control can be performed using a permanent magnet, for example, by changing the distance between a permanent magnet and fluid in a fluid channel.

Following process or reaction "A", the resulting mixture is moved from first processing station 500 to first intermediate processing station 510. At first intermediate processing station 510, reagent "B" is added to the sample, and a process or reaction "B" occurs within the first intermediate processing station 510. In connection with process or reaction "B" occurring in the first intermediate processing station 510, thermal control, magnetic control, or both, is (are) applied to the sample/reagent mixture so as to effect one aspect of the process, such as promoting a reaction (e.g., an amplification or hybridization) or performing a magnetic separation procedure.

The mixture is successively moved to intermediate processing stations 520, 530, 540, 550. At each intermediate processing station 520, 530, 540, 550, reagent "C," "D," "E," and "F," respectively, is added to the sample, and a process or reaction "C," "D," "E," and "F" occurs within the intermediate processing station 520, 530, 540, 550, respectively. In connection with process or reaction "C," "D," "E,", and "F" occurring in the intermediate processing stations 520, 530, 540, 550, thermal control, magnetic control, or both, is (are) applied to the sample/reagent mixture so as to effect one aspect of the process, such as promoting a reaction (e.g., an amplification or hybridization) or performing a magnetic separation procedure.

End processing station 560 shown in FIG. 1 is not represented in FIG. 43. End processing station 560 does not involve the addition of reagent to the sample mixture or a process or reaction occurring at the end process station 560 or the associated thermal and/or magnetic control, but instead only involves the movement of mixture from the last intermediate processing station 550 to the output well 36.

Figure 44:
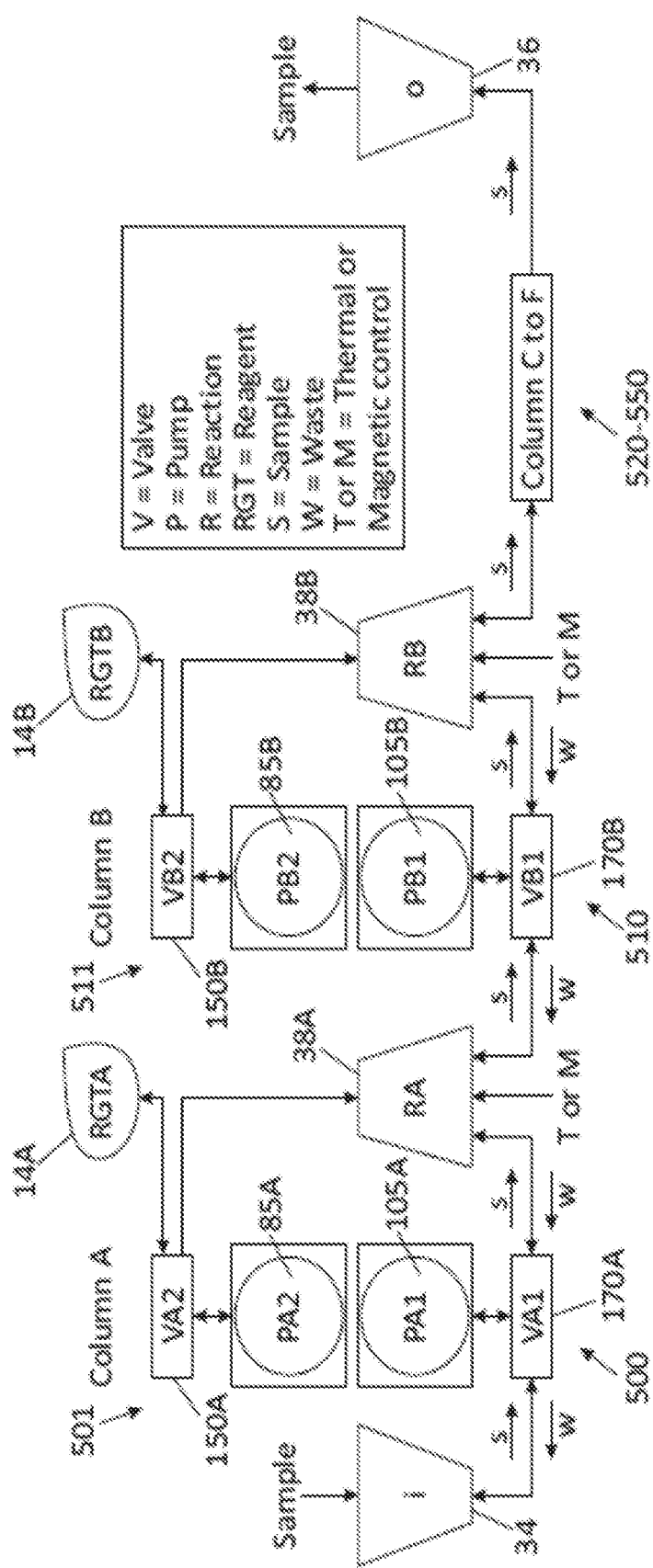
FIG. 44 is a schematic diagram illustrating operation of various processing stations within the fluid processing cassette.

FIG. 44 is a schematic diagram illustrating operation of various processing stations of a single fluid channel within the fluid processing cassette described above.

The schematically-represented fluid processing cassette in FIG. 44 shows the first pump assembly column 501 (column A) of first processing station 500 and the first intermediate pump assembly column 511 (column B) of the first intermediate process station 510.

First pump assembly column 501 (column A) includes a first valve VA1 (e.g., lower rotor valve 170A exemplary of lower rotor valve 170 described above), a process pump chamber PA1 (e.g., process pump chamber 105A exemplary of first process pump chamber 105 described above), a reagent pump chamber PA2 (e.g., reagent pump chamber 85A exemplary of first reagent pump chamber 85 described above), a second valve VA2 (e.g., upper rotor valve 150A exemplary of upper rotor valve 150 described above), reagent input well RGTA (e.g., reagent input well 14A exemplary of reagent well 14 described above), and reaction chamber RA (e.g., process chamber 38A exemplary of process chamber 38 described above).

First intermediate pump assembly column 511 (column B) includes a first valve VB1 (e.g., lower rotor valve 170B exemplary of lower rotor valve 170 described above), a process pump chamber PB1 (e.g., process pump chamber 105B exemplary of first process pump chamber 105 described above), a reagent pump chamber PB2 (e.g., reagent pump chamber 85B exemplary of first reagent pump chamber 85 described above), a second valve VB2 (e.g., upper rotor valve 150B exemplary of upper rotor valve 150 described above), reagent input well RGTB (e.g., reagent input well 14B exemplary of reagent well 14 described above), and reaction chamber RB (e.g., process chamber 38B exemplary of process chamber 38 described above).

The remaining intermediate process processing stations 520, 530, 540, 550 (columns C to F) would each be configured in substantially the same manner as first intermediate pump assembly column 511 of first intermediate processing station 510 and are not shown in detail in FIG. 44.

FIG. 44 shows processing stations and associated pump assembly columns for only a single fluid processing channel. Each of the processing stations and associated pump assembly columns illustrated in FIG. 44 can be provided, and the associated functions can be performed simultaneously, at one or more additional fluid channels as described above.

Sample material is placed in the sample input well 34. First valve VA1 of column A is configured to connect the input well 34 to the process pump chamber PA1 of column A. A process pump operable within the process pump chamber PA1 is activated to move an amount of sample material from the input well 34 to the process pump chamber PA1, as represented by arrow "S" between the input well 34 and the first valve VA1. First valve VA1 is next configured to connect the process pump chamber PA1 to the reaction chamber RA of first processing station 500, and the process pump is activated to move sample material from the process pump chamber PA1 to the reaction chamber RA, as represented by arrow "S" between the first valve VA1 and the reaction chamber RA.

A first reagent, reagent "A," is placed, or contained, in the reagent input well RGTA of first processing station 500. Second valve VA2 of column A is configured to connect the reagent input well RGTA to the reagent pump chamber PA2 of column A. A reagent pump operable within the reagent pump chamber PA2 is activated to move an amount of reagent "A" from the reagent input well RGTA to the reagent pump chamber PA2. Second valve VA2 is next configured to connect the reagent pump chamber PA2 to the reaction chamber RA, and the reagent pump is activated to move reagent "A" from the reagent pump chamber PA2 to the reaction chamber RA, thereby forming a mixture of sample and reagent "A" in reaction chamber RA.

In an alternate embodiment, the order of adding sample and reagent to reaction chamber RA may be reversed.

A process or reaction "A" occurs in reaction chamber RA in the first processing station 500 as thermal control, magnetic control, or both (as represented by arrow "T or M"), is (are) applied to the sample/reagent mixture within reaction mixture RA so as to effect one aspect of the process, such as promoting a reaction (e.g., an amplification or hybridization) or performing a magnetic separation procedure. Thermal, or temperature, control can be implemented, e.g., by resistance heater 272 of first flex circuit heater 270 and/or cooling fan 266 described above (see FIG. 36), to control an elevated reaction temperature or thermal cycling (e.g., for purposes of polymerase chain reaction (PCR)). Magnetic control can be performed using a permanent magnet, for example, by changing the distance between a permanent magnet and fluid in a fluid channel, e.g., by first magnet lifter 282 lifting a first magnet 280 as described above (see FIGS. 40, 42).

To effect a magnetic wash procedure on the mixture contained in the reaction chamber RA, first valve VA1 is configured to connect reaction chamber RA to process pump chamber PA1, and the process pump is activated while a magnetic field is applied to the contents of the reaction chamber RA (e.g., by first magnet lifter 282 lifting a first magnet 280) to move material that is not immobilized by the magnetic field from reaction chamber RA to the process pump chamber PA1, as represented by arrow "W" between reaction chamber RA and first valve VA1. First valve VA1 can then be configured to connect process pump chamber PA1 to input well 34, and the process pump can be activated to move material from the process pump chamber PA1 to the input well 34, as represented by arrow "W" between first valve VA1 and input well 34, to thereby sequester waste material within the input well 34.

Next, the material in reaction chamber RA is moved from first processing station 500 to first intermediate processing station 510. First valve VB1 of column B is configured to connect the reaction chamber RA of first processing station 500 to the process pump chamber PB1 of column B. A process pump operable within the process pump chamber PB1 is activated to move an amount of sample mixture from the reaction chamber RA to the process pump chamber PB1, as represented by arrow "S" between the reaction chamber RA and the first valve VB1. First valve VB1 is next configured to connect the process pump chamber PB1 to the reaction chamber RB of first intermediate processing station 510, and the process pump is activated to move material from the process pump chamber PB1 to the reaction chamber RB, as represented by arrow "S" between the first valve VB1 and the reaction chamber RB.

A second reagent, reagent "B," is placed, or contained, in the reagent input well RGTB of first intermediate processing station 510. Second valve VB2 of column B is configured to connect the reagent input well RGTB to the reagent pump chamber PB2 of column B. A reagent pump operable within the reagent pump chamber PB2 is activated to move an amount of reagent "B" from the reagent input well RGTB to the reagent pump chamber PB2. Second valve VB2 is next configured to connect the reagent pump chamber PB2 to the reaction chamber RB, and the reagent pump is activated to move reagent "B" from the reagent pump chamber PB2 to the reaction chamber RB, thereby forming a mixture including sample and reagent "B" in reaction chamber RB.

In an alternate embodiment, the order of adding sample mixture and reagent to reaction chamber RB may be reversed.

A process or reaction "B" occurs in reaction chamber RB in the first intermediate processing station 510 as thermal control, magnetic control, or both (as represented by arrow "T or M"), is (are) applied to the sample/reagent mixture within reaction chamber RB so as to effect one aspect of the process, such as promoting a reaction (e.g., an amplification or hybridization) or performing a magnetic separation procedure. Thermal, or temperature, control can be implemented, e.g., by resistance heater 272 of second flex circuit heater 274, described above (see FIG. 36), to control an elevated reaction temperature or thermal cycling (e.g., for purposes of polymerase chain reaction (PCR)). Magnetic control can be performed using a permanent magnet, for example, by changing the distance between a permanent magnet and fluid in a fluid channel, e.g., by second magnet lifter 292 lifting a second magnet 290, as described above (see FIGS. 40, 42).

To effect a magnetic wash procedure on the mixture contained in the reaction chamber RB, first valve VB1 is configured to connect reaction chamber RB to process pump chamber PB1, and the process pump is activated while a magnetic field is applied to the contents of the reaction chamber RB (e.g., by second magnet lifter 292 lifting a second magnet 290) to move material that is not immobilized by the magnetic field from reaction chamber RB to the process pump chamber PB1, as represented by arrow "W" between reaction chamber RB and first valve VB1. First valve VB1 can then be configured to connect process pump chamber PB1 to reaction chamber RA of first processing station 500, and the process pump can be activated to move material from the process pump chamber PB1 to the reaction chamber RA, as represented by arrow "W" between first valve VB1 and reaction chamber RA, to sequester waste material in the reaction chamber RA.

One or more of the above-described processes can be performed at each of intermediate processing stations 520, 530, 540, 550 (columns C to F).

To move the finally-processed mixture (e.g., purified sample) to the output well 36 from the penultimate processing station, a first valve of end processing station 560 (see FIG. 1) is configured to connect the reaction chamber of the penultimate processing station to the process pump chamber of end processing station 560. A process pump operable within the process pump chamber is activated to move an amount of sample mixture from the reaction chamber of the penultimate processing station to the process pump chamber of end processing station 560. The first valve of end processing station 560 is next configured to connect the process pump chamber of end processing station 560 to the output well 36, and the process pump is activated to move sample mixture from the process pump chamber to the output well 36.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A fluid processing device comprising:
   a plurality of fluid channels comprising a first set of two or more fluid channels and a second set of two or more fluid channels;
   a sample input well associated with each of the plurality of fluid channels;
   a sample output well associated with each of the plurality of fluid channels;
   at least an initial processing station comprising:
      a first initial process pump assembly associated with each of the two or more fluid channels of the first set and a second initial process pump assembly associated with each of the two or more fluid channels of the second set;
      an initial process chamber associated with each of the plurality of fluid channels,
      wherein the first initial process pump assemblies of the initial processing station are configured to be operable in unison to simultaneously move a fluid sample from each sample input well of the associated fluid channel of the first set through a portion of each associated fluid channel of the first set and into each associated initial process chamber, and the second initial process pump assemblies are configured to be operable in unison to simultaneously move a fluid sample from each sample input well of the associated fluid channel of the second set through a portion of each associated fluid channel of the second set and into each associated initial process chamber;
      a first initial reagent pump assembly associated with each of the two or more fluid channels of the first set and a second initial reagent pump assembly associated with each of the two or more fluid channels of the second set;
      an initial reagent input well associated with each of the plurality of fluid channels; and
      an initial reagent channel associated with each initial reagent input well connecting the initial reagent input well to the initial process chamber of the associated fluid channel,
      wherein the first initial reagent pump assemblies are configured to be operable in unison to simultaneously move a reagent from each initial reagent input well of the associated fluid channel of the first set through the associated initial reagent channel and into each initial process chamber of the associated fluid channel of the first set, and the second initial reagent pump assemblies are configured to be operable in unison to simultaneously move a reagent from each initial reagent input well of the associated fluid channel of the second set through the associated initial reagent channel and into each initial process chamber of the associated fluid channel of the second set;
   a terminal processing station comprising:
      a first terminal process pump assembly associated with each of the two or more fluid channels of the first set; and a second terminal process pump assembly associated with each of the two or more fluid channels of the second set, wherein the first terminal process pump assemblies of the terminal processing station are configured to be operable in unison to simultaneously move a fluid through a portion of each associated fluid channel of the first set and into each sample output well of the associated fluid channel of the first set, and the second terminal process pump assemblies of the terminal processing station are configured to be operable in unison to simultaneously move a fluid through a portion of each associated fluid channel of the second set and into each sample output well of the associated fluid channel of the second set; and one or more intermediate processing stations disposed between the initial processing station and the terminal processing station, wherein each intermediate processing station comprises:

a first intermediate process pump assembly associated with each of the two or more fluid channels of the first set, and a second intermediate process pump assembly associated with each of the two or more fluid channels of the second set;

an intermediate process chamber associated with each of the plurality of fluid channels, wherein the first intermediate process pump assemblies of each intermediate processing station are configured to be operable in unison to simultaneously move a fluid from a process chamber of a preceding one of the processing stations through a portion of each associated fluid channel of the first set and into each associated intermediate process chamber of the first set, and wherein the second intermediate process pump assemblies of each intermediate processing station are configured to be operable in unison to simultaneously move a fluid from a process chamber of the preceding processing station through a portion of each associated fluid channel of the second set and into each associated intermediate process chamber of the second set;

a first intermediate reagent pump assembly associated with each of the two or more fluid channels of the first set and a second intermediate reagent pump assembly associated with each of the two or more fluid channels of the second set;

an intermediate reagent input well associated with each of the plurality of fluid channels; and an intermediate reagent channel associated with each intermediate reagent input well connecting the intermediate reagent input well to the intermediate process chamber of the associated fluid channel, wherein the first intermediate reagent pump assemblies of the intermediate processing station are configured to be operable in unison to simultaneously move a reagent from each intermediate reagent input well of the associated fluid channel of the first set through the associated intermediate reagent channel and into each intermediate process chamber of the associated fluid channel of the first set, and the second intermediate reagent pump assemblies of the intermediate processing station are configured to be operable in unison to simultaneously move a reagent from each intermediate reagent input well of the associated fluid channel of the second set through the associated intermediate reagent channel and into each intermediate process chamber of the associated fluid channel of the second set.

2. The fluid processing device of claim 1, comprising five intermediate processing stations disposed between the initial processing station and the terminal processing station.

3. The fluid processing device of claim 1, wherein each of the first and second process pump assemblies of each of the initial, intermediate, and terminal processing stations comprises:

two or more process stators, wherein each process stator defines first and second process pump chambers and first and second process chamber ports in fluid communication with the first and second process pump chambers, respectively;

a process plunger disposed within each first and second process pump chamber, wherein the process plungers disposed within the first process pump chambers are connected to a first process plunger rod, and the process plungers disposed within the second process pump chambers are connected to a second process plunger rod, wherein the process plungers disposed within the first process pump chambers are movable via the first process plunger rod in a first direction to simultaneously draw fluid into the first process pump chambers through the associated first process chamber ports or a second direction to simultaneously expel fluid from the first process pump chambers through the associated first process chamber ports, and wherein the process plungers disposed within the second process pump chambers are movable via the second process plunger rod in a first direction to simultaneously draw fluid into the second process pump chambers through the associated second process chamber ports or a second direction to simultaneously expel fluid from the second process pump chambers through the associated second process chamber ports; and a process valve coupled to each process stator and movable between a first position fluidly connecting the first and second process chamber ports to an upstream portion of each associated fluid channel and a second position fluidly connecting the first and second process chamber ports to a downstream portion of each associated fluid channel, wherein the downstream portion of the associated fluid channel is in fluid communication with the associated process chamber or the associated sample output well.

4. The fluid processing device of claim 3, wherein the process valve comprises a rotor that is rotatably mounted with respect to the process stator for rotational movement between the first position and the second position.

5. The fluid processing device of claim 1, wherein each of the first and second process pump assemblies of each of the initial and intermediate processing stations comprises:

two or more reagent stators, wherein each reagent stator defines first and second reagent pump chambers and first and second reagent chamber ports in fluid communication with the first and second reagent pump chambers, respectively;

a reagent plunger disposed within each first and second reagent pump chamber, wherein the reagent plungers disposed within the first reagent pump chambers are connected to a first reagent plunger rod, and the reagent plungers disposed within the second reagent pump chambers are connected to a second reagent plunger rod, wherein the reagent plungers disposed within the first reagent pump chambers are movable via the first reagent plunger rod in a first direction drawing fluid into the first reagent pump chambers through the first reagent chamber ports or a second direction expelling fluid from the first reagent pump chambers through the first reagent chamber ports, and the reagent plungers disposed within the second reagent pump chambers are movable via the second reagent plunger rod in a first direction drawing fluid into the second reagent pump chambers through the second reagent chamber ports or a second direction expelling fluid from the second reagent pump chambers through the second reagent chamber ports; and a reagent valve coupled to the reagent stator and movable between a first position fluidly connecting the first and second reagent chamber ports to the associated first and second reagent input wells and a second position fluidly connecting the first and second reagent chamber ports to the associated process chambers.

6. The fluid processing device of claim 5, wherein the reagent valve comprises a rotor that is rotatably mounted with respect to the reagent stator for rotational movement between the first position and the second position.

7. The fluid processing device of claim 3, wherein the first and second process pump assemblies of each of the initial, intermediate, and terminal processing stations comprise a process valve rod, and all of the process valves of the process pump assemblies of each processing station are coupled to the process valve rod, so that movement of the process valve rod effects simultaneous movement of the process valves between their respective first and second positions.

8. The fluid processing device of claim 3, wherein the reagent pump assemblies of each of the initial and intermediate processing stations comprise a reagent valve rod, and all of the reagent valves of the reagent pump assemblies of each processing station are coupled to the reagent valve rod, so that movement of the reagent valve rod effects simultaneous movement of the reagent valves between their respective first and second positions.

9. The fluid processing device of claim 1, comprising eight fluid channels.

* * * * *